United States Patent
Auterio et al.

(10) Patent No.: US 9,220,985 B1
(45) Date of Patent: *Dec. 29, 2015

(54) PROVIDING VIRTUAL ITEMS BASED ON LOCATION-BASED ACTIONS

(75) Inventors: Kathleen Auterio, San Francisco, CA (US); Deniz Ersever, San Francisco, CA (US); Nathan Arthur Etter, San Jose, CA (US); Hardik Kheskani, San Francisco, CA (US); Serena Lam, San Francisco, CA (US); Amitt Mahajan, San Francisco, CA (US); Christopher Joseph Makarsky, San Francisco, CA (US); Jay Monahan, San Francisco, CA (US); Donald C. Mosites, San Francisco, CA (US); Benjamin Mullin, San Francisco, CA (US); Matthew Adam Ocko, San Francisco, CA (US); Brian Reynolds, Lutherville, MD (US); Shantanu Talapatra, San Francisco, CA (US); Justin Waldron, San Francisco, CA (US); Ian Wang, San Francisco, CA (US); Jackson Wang, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/174,717

(22) Filed: Jun. 30, 2011

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |

(Continued)

(52) U.S. Cl.
CPC ............... *A63F 13/216* (2014.09); *A63F 13/00* (2013.01); *A63F 13/85* (2014.09); *A63F 2300/57* (2013.01); *A63F 2300/575* (2013.01)

(58) Field of Classification Search
CPC .................... A63F 2300/69; A63F 2300/5573; A63F 2300/205
USPC ..................................................... 463/1, 9, 42
See application file for complete search history.

(56) References Cited

U.S. PATENT DOCUMENTS

| | | | |
|---|---|---|---|
| 6,040,783 | A | 3/2000 | Houvener et al. |
| 6,299,534 | B1 | 10/2001 | Breeding et al. |
| 6,325,292 | B1 | 12/2001 | Sehr |

(Continued)

FOREIGN PATENT DOCUMENTS

WO    WO-2012021305 A1    2/2012

OTHER PUBLICATIONS

"About Foursquare", Search Results [retrieved on Jan. 17, 2012]. Retrieved from <http://wayback.archive.org/web/20100615000000*/http://aboutfoursquare.com/foursquare-101>, (Dec. 12, 2010), 1 pg.

(Continued)

*Primary Examiner* — Kevin Y Kim
(74) *Attorney, Agent, or Firm* — Schwegman Lundberg & Woessner, P.A.

(57) ABSTRACT

A method of providing virtual items based on location-based action is disclosed. An indication is received of a performance of a location-based action by a player of a computer-implemented game. A virtual item is provided based on the receiving of the indication of the performance of the location-based action by the player of the computer-implemented game. The virtual item may be usable within the computer-implemented game.

19 Claims, 37 Drawing Sheets

(51) Int. Cl.
*A63F 13/216* (2014.01)
*A63F 13/85* (2014.01)

(56) References Cited

U.S. PATENT DOCUMENTS

| | | | |
|---|---|---|---|
| 6,569,011 B1 | 5/2003 | Lynch et al. | |
| 7,026,984 B1 | 4/2006 | Thandu et al. | |
| 7,343,317 B2 | 3/2008 | Jokinen et al. | |
| 7,493,267 B1 | 2/2009 | Walker et al. | |
| 7,689,452 B2 | 3/2010 | Lam et al. | |
| 7,716,053 B2 * | 5/2010 | Shimoda et al. | 704/270 |
| 7,783,183 B2 | 8/2010 | Garg et al. | |
| 7,856,360 B2 | 12/2010 | Kramer et al. | |
| 7,895,076 B2 | 2/2011 | Kutaragi et al. | |
| 7,955,175 B1 | 6/2011 | Holloway et al. | |
| 8,029,359 B2 | 10/2011 | Cheng | |
| 8,226,472 B2 | 7/2012 | Van Luchene | |
| 8,282,491 B2 | 10/2012 | Auterio et al. | |
| 8,287,383 B1 | 10/2012 | Etter et al. | |
| 8,287,384 B2 | 10/2012 | Auterio et al. | |
| 8,292,743 B1 | 10/2012 | Etter et al. | |
| 8,348,768 B2 | 1/2013 | Auterio et al. | |
| 8,388,451 B2 | 3/2013 | Auterio et al. | |
| 8,388,452 B2 | 3/2013 | Auterio et al. | |
| 8,444,491 B2 | 5/2013 | Bethke et al. | |
| 8,454,441 B2 | 6/2013 | Auterio et al. | |
| 8,491,395 B2 | 7/2013 | Auterio et al. | |
| 8,496,532 B1 | 7/2013 | Bethke et al. | |
| 8,506,409 B2 | 8/2013 | Bethke et al. | |
| 8,556,719 B1 | 10/2013 | Mahajan et al. | |
| 8,574,076 B2 | 11/2013 | Mahajan et al. | |
| 8,608,570 B1 | 12/2013 | Mahajan et al. | |
| 8,727,887 B2 | 5/2014 | Mahajan et al. | |
| 8,812,356 B1 | 8/2014 | Mahajan et al. | |
| 8,858,338 B2 | 10/2014 | Bethke et al. | |
| 8,874,466 B2 | 10/2014 | Bethke et al. | |
| 9,033,803 B1 | 5/2015 | Etter et al. | |
| 2001/0049304 A1 | 12/2001 | Orui | |
| 2002/0006825 A1 | 1/2002 | Suzuki | |
| 2002/0026321 A1 | 2/2002 | Faris et al. | |
| 2002/0090985 A1 | 7/2002 | Tochner et al. | |
| 2002/0111201 A1 | 8/2002 | Lang | |
| 2003/0032476 A1 | 2/2003 | Walker et al. | |
| 2003/0060247 A1 | 3/2003 | Goldberg et al. | |
| 2004/0243468 A1 | 12/2004 | Cohagan et al. | |
| 2005/0049022 A1 | 3/2005 | Mullen | |
| 2005/0055115 A1 | 3/2005 | Gerrard et al. | |
| 2005/0137015 A1 | 6/2005 | Rogers et al. | |
| 2005/0148377 A1 | 7/2005 | Goldberg et al. | |
| 2005/0177428 A1 | 8/2005 | Ganz | |
| 2006/0073809 A1 | 4/2006 | Juetten et al. | |
| 2006/0105838 A1 | 5/2006 | Mullen | |
| 2006/0128469 A1 | 6/2006 | Willis et al. | |
| 2006/0235747 A1 | 10/2006 | Hammond et al. | |
| 2007/0018952 A1 | 1/2007 | Arseneau | |
| 2007/0021166 A1 | 1/2007 | Mattila | |
| 2007/0149286 A1 | 6/2007 | Bemmel | |
| 2007/0190494 A1 | 8/2007 | Rosenberg | |
| 2008/0059304 A1 | 3/2008 | Kimsey | |
| 2008/0086261 A1 | 4/2008 | Robinson et al. | |
| 2008/0096665 A1 | 4/2008 | Cohen | |
| 2008/0133336 A1 | 6/2008 | Altman et al. | |
| 2008/0146338 A1 | 6/2008 | Bernard et al. | |
| 2008/0163055 A1 | 7/2008 | Ganz et al. | |
| 2008/0167129 A1 | 7/2008 | Aaron et al. | |
| 2009/0005140 A1 | 1/2009 | Rose et al. | |
| 2009/0017913 A1 | 1/2009 | Bell et al. | |
| 2009/0137323 A1 | 5/2009 | Fiegener et al. | |
| 2009/0248544 A1 | 10/2009 | Ganz | |
| 2010/0009758 A1 | 1/2010 | Twitchell, Jr. | |
| 2010/0016080 A1 | 1/2010 | Garden et al. | |
| 2010/0062840 A1 | 3/2010 | Herrmann | |
| 2010/0106580 A1 | 4/2010 | Etheredge et al. | |
| 2010/0125525 A1 | 5/2010 | Inamdar | |
| 2010/0151940 A1 | 6/2010 | Borge | |
| 2010/0160038 A1 | 6/2010 | Youm et al. | |
| 2010/0203933 A1 | 8/2010 | Eyzaguirre et al. | |
| 2010/0203963 A1 | 8/2010 | Allen et al. | |
| 2010/0216553 A1 | 8/2010 | Chudley et al. | |
| 2010/0223115 A1 | 9/2010 | Chodosh et al. | |
| 2010/0227675 A1 | 9/2010 | Luxton et al. | |
| 2010/0279764 A1 | 11/2010 | Allen et al. | |
| 2010/0287011 A1 | 11/2010 | Muchkaev | |
| 2010/0304804 A1 | 12/2010 | Spivack | |
| 2010/0317392 A1 | 12/2010 | Davis et al. | |
| 2010/0317419 A1 | 12/2010 | Osborne | |
| 2010/0331089 A1 | 12/2010 | Priebatsch et al. | |
| 2010/0332301 A1 | 12/2010 | Higgins et al. | |
| 2011/0039622 A1 | 2/2011 | Levenson | |
| 2011/0039623 A1 | 2/2011 | Levenson | |
| 2011/0053559 A1 | 3/2011 | Klein | |
| 2011/0053692 A1 | 3/2011 | Farr-Jones et al. | |
| 2011/0055927 A1 | 3/2011 | Hamilton, II et al. | |
| 2011/0093349 A1 | 4/2011 | Drescher et al. | |
| 2011/0112892 A1 | 5/2011 | Tarantino | |
| 2011/0124399 A1 | 5/2011 | Dutilly et al. | |
| 2011/0145137 A1 | 6/2011 | Driemeyer et al. | |
| 2011/0148061 A1 | 6/2011 | Johnson et al. | |
| 2011/0207531 A1 | 8/2011 | Gagner et al. | |
| 2011/0212762 A1 | 9/2011 | Ocko et al. | |
| 2011/0212783 A1 | 9/2011 | Dale et al. | |
| 2011/0223895 A1 | 9/2011 | Wagda et al. | |
| 2011/0238476 A1 | 9/2011 | Carr et al. | |
| 2011/0238755 A1 | 9/2011 | Khan et al. | |
| 2011/0275441 A1 | 11/2011 | Wilson | |
| 2011/0300923 A1 | 12/2011 | Van Luchene | |
| 2011/0300944 A1 | 12/2011 | Raynal | |
| 2011/0312344 A1 | 12/2011 | Mccahill et al. | |
| 2011/0312423 A1 | 12/2011 | Mosites et al. | |
| 2011/0313840 A1 | 12/2011 | Mason et al. | |
| 2012/0015717 A1 | 1/2012 | Mosites et al. | |
| 2012/0015730 A1 | 1/2012 | Watkins, Jr. et al. | |
| 2012/0040743 A1 | 2/2012 | Auterio et al. | |
| 2012/0040745 A1 | 2/2012 | Auterio et al. | |
| 2012/0040746 A1 | 2/2012 | Auterio et al. | |
| 2012/0040747 A1 | 2/2012 | Auterio et al. | |
| 2012/0040760 A1 | 2/2012 | Auterio et al. | |
| 2012/0040761 A1 | 2/2012 | Auterio et al. | |
| 2012/0040763 A1 | 2/2012 | Auterio et al. | |
| 2012/0066040 A1 | 3/2012 | Farraro et al. | |
| 2012/0123867 A1 | 5/2012 | Hannan | |
| 2012/0124176 A1 | 5/2012 | Curtis et al. | |
| 2012/0142429 A1 | 6/2012 | Muller | |
| 2012/0203619 A1 | 8/2012 | Lutnick et al. | |
| 2012/0215617 A1 | 8/2012 | Shah et al. | |
| 2012/0215667 A1 | 8/2012 | Ganz et al. | |
| 2012/0232971 A1 | 9/2012 | Pabst et al. | |
| 2012/0233158 A1 | 9/2012 | Braginsky et al. | |
| 2013/0004932 A1 | 1/2013 | Mahajan et al. | |
| 2013/0005437 A1 | 1/2013 | Bethke et al. | |
| 2013/0005466 A1 | 1/2013 | Mahajan et al. | |
| 2013/0005473 A1 | 1/2013 | Bethke et al. | |
| 2013/0005474 A1 | 1/2013 | Bethke et al. | |
| 2013/0005475 A1 | 1/2013 | Mahajan et al. | |
| 2013/0005480 A1 | 1/2013 | Bethke et al. | |
| 2013/0006735 A1 | 1/2013 | Koenigsberg et al. | |
| 2013/0006736 A1 | 1/2013 | Bethke et al. | |
| 2013/0117086 A1 | 5/2013 | Mesaros | |
| 2013/0296042 A1 | 11/2013 | Auterio et al. | |
| 2014/0057725 A1 | 2/2014 | Mahajan et al. | |

OTHER PUBLICATIONS

"U.S. Appl. No. 12/856,508, Non Final Office Action mailed Apr. 10, 2012", 7 pgs.

"U.S. Appl. No. 12/856,508, Response filed Jul. 10, 2012 to Non Final Office Action mailed Apr. 10, 2012", 11 pgs.

"U.S. Appl. No. 12/856,508, Response filed Aug. 24, 2012 to Restriction Requirement mailed 07-24-12-12", 13 pgs.

"U.S. Appl. No. 12/856,508, Restriction Requirement mailed Mar. 7, 2012", 7 pgs.

"U.S. Appl. No. 12/856,508, Restriction Requirement mailed Jul. 24, 2012", 6 pgs.

(56) References Cited

OTHER PUBLICATIONS

"U.S. Appl. No. 12/856,508, Response filed Mar. 30, 2012 to Restriction Requirement mailed Mar. 7, 2012", 14 pgs.
"U.S. Appl. No. 13/174,715, Response filed Aug. 8, 2012 to Non Final Office Action mailed May 8, 2012", 10 pgs.
"U.S. Appl. No. 13/174,715, Final Office Action mailed Aug. 27, 2012", 7 pgs.
"U.S. Appl. No. 13/174,715, Non Final Office Action mailed May 8, 2012", 8 pgs.
"U.S. Appl. No. 13/174,720, Non Final Office Action mailed Jan. 20, 2012", 13 pgs.
"U.S. Appl. No. 13/174,720, Response filed Apr. 20, 2012 to Non Final Office Action mailed Jan. 20, 2012", 11 pgs.
"U.S. Appl. No. 13/174,724, Examiner Interview Summary mailed Feb. 8, 2012", 3 pgs.
"U.S. Appl. No. 13/174,724, Non Final Office Action mailed Jan. 9, 2012", 6 pgs.
"U.S. Appl. No. 13/174,724, Notice of Allowability mailed Aug. 30, 2012", 2 pgs.
"U.S. Appl. No. 13/174,724, Notice of Allowance mailed May 1, 2012", 9 pgs.
"U.S. Appl. No. 13/174,724, Response filed Apr. 9, 2012 to Non Final Office Action mailed Jan. 9, 2012", 8 pgs.
"U.S. Appl. No. 13/174,729, Final Office Action mailed Jun. 7, 2012", 11 pgs.
"U.S. Appl. No. 13/174,729, Non Final Office Action mailed Jan. 4, 2012", 10 pgs.
"U.S. Appl. No. 13/174,729, Response filed Apr. 4, 2012 to Non Final Office Action mailed Jan. 4, 2012", 10 pgs.
"U.S. Appl. No. 13/174,735, Non Final Office Action mailed Apr. 6, 2012", 12 pgs.
"U.S. Appl. No. 13/174,735, Response filed Aug. 6, 2012 to Non Final Office Action mailed Apr. 6, 2012", 11 pgs.
"U.S. Appl. No. 13/174,737, Non Final Office Action mailed Feb. 29, 2012", 8 pgs.
"U.S. Appl. No. 13/174,737, Response filed Jun. 29, 2012 to Non Final Office Action mailed Feb. 29, 2012", 9 pgs.
"U.S. Appl. No. 13/174,741, Examiner Interview Summary mailed Feb. 8, 2012", 3 pgs.
"U.S. Appl. No. 13/174,741, Examiner Interview Summary mailed Jul. 31, 2012", 4 pgs.
"U.S. Appl. No. 13/174,741, Final Office Action mailed Jun. 12, 2012", 18 pgs.
"U.S. Appl. No. 13/174,741, Non Final Office Action mailed Dec. 23, 2011", 16 pgs.
"U.S. Appl. No. 13/174,741, Response filed Mar. 23, 2012 to Non Final Office Action mailed Dec. 23, 2011", 15 pgs.
"U.S. Appl. No. 13/174,747, Non Final Office Action mailed Jan. 30, 2012", 7 pgs.
"U.S. Appl. No. 13/174,747, Notice Non-Compliant Amendment mailed Jun. 19, 2012", 9 pgs.
"U.S. Appl. No. 13/174,747, Response filed May 30, 2012 to Non Final Office Action mailed Jan. 30, 2012", 10 pgs.
"U.S. Appl. No. 13/244,681, Non Final Office Action mailed Mar. 14, 2012", 17 pgs.
"U.S. Appl. No. 13/244,681, Response filed Jun. 14, 2012 to Non Final Office Action mailed Mar. 14, 2012", 13 pgs.
"U.S. Appl. No. 13/244,726, Non Final Office Action mailed Jan. 31, 2012", 16 pgs.
"U.S. Appl. No. 13/244,726, Response filed Apr. 30, 2012 to Non Final Office Action mailed Jan. 31, 2012", 11 pgs.
"U.S. Appl. No. 13/244,763 Response filed May 17, 2012 to Non Final Office Action mailed Feb. 17, 2012", 9 pgs.
"U.S. Appl. No. 13/244,763, Final Office Action mailed Jun. 21, 2012", 8 pgs.
"U.S. Appl. No. 13/244,763, Non Final Office Action mailed Feb. 17, 2012", 8 pgs.
"U.S. Appl. No. 13/244,773, Non Final Office Action Mailed Jan. 31, 2012", 16 pgs.
"U.S. Appl. No. 13/244,773, Response filed Apr. 30, 2012 to Non Final Office Action mailed Jan. 31, 2012", 13 pgs.
"U.S. Appl. No. 13/244,780, Non Final Office Action mailed Jan. 25, 2012", 15 pgs.
"U.S. Appl. No. 13/244,780, Response filed Apr. 25, 2012 to Non Final Office Action mailed Jan. 25, 2012", 13 pgs.
"U.S. Appl. No. 13/244,801, Examiner Interview Summary mailed Feb. 10, 2012", 3 pgs.
"U.S. Appl. No. 13/244,801, Examiner Interview Summary mailed Apr. 16, 2012", 1 pg.
"U.S. Appl. No. 13/244,801, Non Final Office Action mailed Jan. 9, 2012", 6 pgs.
"U.S. Appl. No. 13/244,801, Notice of Allowability mailed Sep. 5, 2012", 2 pgs.
"U.S. Appl. No. 13/244,801, Notice of Allowance mailed May 1, 2012", 9 pgs.
"U.S. Appl. No. 13/244,801, Response filed Apr. 9, 2012 to Non Final Office Action mailed Jan. 9, 2012", 9 pgs.
"U.S. Appl. No. 13/244,809, Final Office Action mailed Jun. 18, 2012", 11 pgs.
"U.S. Appl. No. 13/244,809, Non Final Office Action mailed Jan. 3, 2012", 9 pgs.
"U.S. Appl. No. 13/244,809, Response filed Apr. 3, 2012 to Non Final Office Action mailed Jan. 3, 2012", 9 pgs.
"U.S. Appl. No. 13/244,814, Response filed Jul. 9, 2012 to Non Final Office Action mailed Apr. 9, 2012", 10 pgs.
"U.S. Appl. No. 13/244,814, Non Final Office Action mailed Apr. 9, 2012", 9 pgs.
"U.S. Appl. No. 13/244,826, Non Final Office Action mailed Feb. 29, 2012", 7 pgs.
"U.S. Appl. No. 13/244,826, Response filed May 29, 2012 to Non Final Office Action mailed Feb. 29, 2012", 10 pgs.
"U.S. Appl. No. 13/244,924, Final Office Action mailed Jun. 6, 2012", 17 pgs.
"U.S. Appl. No. 13/244,924, Non Final Office Action mailed Feb. 29, 2012", 8 pgs.
"U.S. Appl. No. 13/244,924, Notice of Allowance mailed Aug. 17, 2012", 8 pgs.
"U.S. Appl. No. 13/244,924, Response filed Feb. 13, 2012 to Restriction Requirement mailed Jan. 13, 2012", 9 pgs.
"U.S. Appl. No. 13/244,924, Response filed May 29, 2012 to Non Final Office Action mailed Feb. 29, 2012", 12 pgs.
"U.S. Appl. No. 13/244,924, Response filed Aug. 6, 2012 to Final Office Action mailed Jun. 6, 2012", 9 pgs.
"U.S. Appl. No. 13/244,924, Restriction Requirement mailed Jan. 13, 2012", 6 pgs.
"U.S. Appl. No. 13/244,926, Examiner Interview Summary mailed Feb. 8, 2012", 3 pgs.
"U.S. Appl. No. 13/244,926, Examiner Interview Summary mailed Aug. 1, 2012", 3 pgs.
"U.S. Appl. No. 13/244,926, Final Office Action mailed May 30, 2012", 15 pgs.
"U.S. Appl. No. 13/244,926, Non Final Office Action Mailed Dec. 21, 2011", 16 pgs.
"U.S. Appl. No. 13/244,926, Response filed Mar. 21, 2012 to Non Final Office Action mailed Dec. 21, 2011", 14 pgs.
"U.S. Appl. No. 13/244,932, Non Final Office Action mailed Apr. 11, 2012", 9 pgs.
"U.S. Appl. No. 13/244,932, Notice of Allowance mailed Aug. 16, 2012", 9 pgs.
"U.S. Appl. No. 13/244,932, Response filed Mar. 30, 2012 to Restriction Requirement mailed Mar. 1, 2012", 7 pgs.
"U.S. Appl. No. 13/244,932, Response filed Jul. 10, 2012 to Non Final Office Action mailed Apr. 11, 2012", 10 pgs.
"U.S. Appl. No. 13/244,932, Restriction Requirement mailed Mar. 1, 2012", 6 pgs.
"U.S. Appl. No. 13/244,934, Final Office Action mailed May 16, 2012", 7 pgs.
"U.S. Appl. No. 13/244,934, Non Final Office Action Mailed Feb. 7, 2012", 7 pgs.
"U.S. Appl. No. 13/244,934, Non Final Office Action mailed Aug. 31, 2012", 7 pgs.

(56) References Cited

OTHER PUBLICATIONS

"U.S. Appl. No. 13/244,934, Response filed Jan. 30, 2012 to Restriction Requirement mailed Dec. 29, 2011", 14 pgs.
"U.S. Appl. No. 13/244,934, Response filed May 7, 2012 to Non Final Office Action mailed Feb. 7, 2012", 7 pgs.
"U.S. Appl. No. 13/244,934, Response filed Aug. 16, 2012 to Final Office Action mailed May 16, 2012", 10 pgs.
"U.S. Appl. No. 13/244,934, Restriction Requirement mailed Dec. 29, 2011", 6 pgs.
"U.S. Appl. No. 13/244,937, Final Office Action mailed Jun. 29, 2012", 9 pgs.
"U.S. Appl. No. 13/244,937, Non Final Office Action mailed Mar. 21, 2012", 9 pgs.
"U.S. Appl. No. 13/244,937, Response filed Mar. 7, 2012 to Restriction Requirement mailed Feb. 6, 2012", 8 pgs.
"U.S. Appl. No. 13/244,937, Response filed Jun. 21, 2012 to Non Final Office Action mailed Mar. 21, 2012", 12 pgs.
"U.S. Appl. No. 13/244,937, Restriction Requirement mailed Feb. 6, 2012", 6 pgs.
"U.S. Appl. No. 13/244,939, Final Office Action mailed Jun. 28, 2012", 8 pgs.
"U.S. Appl. No. 13/244,939, Non Final Office Action mailed Mar. 21, 2012", 9 pgs.
"U.S. Appl. No. 13/244,939, Response filed Mar. 7, 2012 to Restriction Requirement mailed Feb. 7, 2012", 8 pgs.
"U.S. Appl. No. 13/244,939, Response filed Jun. 19, 2012 to Non Final Office Action mailed Mar. 21, 2012", 14 pgs.
"U.S. Appl. No. 13/244,939, Restriction Requirement mailed Feb. 7, 2012", 6 pgs.
"Axis and Allies", 'Axis and Allies: Pacific' Gameplay Manual, retrieved from <http://www.wizards.com/>, Hasbro, Pawtucket, RI, (2000), 36 pgs.
"Earning badges", [Online]. Retrieved from the Internet: <URL: http://support.foursquare.com/entries/214581-i-think-o-should-have-earned-a-badge-but-it-s-not-showing-up-on-my-account-what-gives>, (Accessed Jun. 6, 2012), 2 pgs.
"Foursquare Badges", [Online]. Retrieved from the Internet: <URL: 20101112164048/http://thekruser.com/foursquare/badges/, (Accessed Jun. 6, 2012), 47 pgs.
"How Do I Check in on Foursquare?", [Online}. Retrieved from the Internet: <URL: http://support.foursquare.com/entries/188252-how-do-I-check-in-on-foursquare>, (Accessed Jan. 17, 2012), 2 pgs.
"How Do I Earn Badges?", [Online]. Retrieved from the Internet: <URL: http://support.foursquare.com/entries/215406-how-do-I-earn badges>, (2010), 1 pg.
"International Application Serial No. PCT/US2011/045782, International Search Report mailed Dec. 23, 2011", 2 pgs.
"International Application Serial No. PCT/US2011/045782, Written Opinion mailed Dec. 23, 2011", 5 pgs.
"Itunes Preview: Turf Wars", [Online] Retrieved from Internet:<http://web.archive.org/web/20100328171725/http://itunes.apple.com/app/turf-wars/id332185049?mt=8>, (Accessed Dec. 16, 2011), 4 pgs.
"Monster Hunter Freedom", Game Manual Capcom. 2006, [Online]. Retrieved from the Internet: <http://www.replacementdocs.com/download/php?view.6299>, (Accessed Mar. 28, 2012), 14 pgs.
"Monster Hunter Freedom", Product Page. Amazon.com. 2006, [Online]. Retrieved from the Internet: <http://www.amazon.com/Monster-Hunter-Freedom-Sony-PSP/dp/B000CBCVEU>, (Retrieved Mar. 28, 2012), 9 pgs.
"New Bigger Swarm Badges", [Onine]. Retrieved from the Internet: <URL: http://blog.foursquare .com/2010/ 10/29/new-bigger-swarm-badges>, (Accessed Jan. 17, 2012), 9 pgs.
"Official Risk Board Game Rules", [Online Retrieved from <http://www.hasbro.com/common/instruct/risk.pdf>, (Accessed Dec. 31, 1993), 16 pgs.
"Scvngr gamers can check in by bumping phones together", [Online]. Retrieved from the Internet: <http://venturebeat.com/2010/07/20/scvngr-checkin-bump/>, (Accessed Feb. 13, 2012), 5 pgs.
"Turfwarsapp", turfwarsapp.com, [Online]. Retrieved from the Internet: <URL: http://turfwarsapp.com/>, (Accessed Dec. 15, 2011), 57 pgs.
"Unofficial Turf Wars FAQ", [Online]. Retrieved from the Internet: <http://www.turfwarsfaq.com/ >, (Accessed Dec. 15, 2011), 38 pgs.
Cutler, Kim-Mai, "CrowdMob's Mafia Location Game Harnesses Facebook Places to Drive Downloads", [Online] Retrieved from Internet: <http://www.insidemobileapps.com/2011/06/08/crowdmob/>, (Accessed Dec. 14, 2011), 3 pgs.
Haynes, Jeff, "Mushroom Wars Review", [Online]. Retrieved from Internet: <http://web.archive.org/web/20091024082655/http://ps3.ign.com/articles/103/1038151p1.html>, (Accessed Dec. 14, 2011), 3 pgs.
Jones, Michael, "Own This World: iPhone App Review", [Online]. Retrieved from Internet: <http://chealion.ca/2010/03/own-this-world-iphone-app-review/>, (Accessed Dec. 15, 2011), 6 pgs.
Siegler, MG, "My Town 2.0 Evolves the Gaming and Monetization of Location", [Online] Retrieved from Internet: <http://techcrunch.com/2010/01/20/mytown-2-location/>, (Accessed Jan. 20, 2010), 12 pgs.
Thompson, Chris, "How to create your first foursquare special", Copyright © 2012 About Foursquare., [Online]. Retrieved from the Internet: <URL: http://aboutfoursquare.com/how-to-create-your-first-foursquare-special/>, (Mar. 16, 2011), 5 pgs.
Thompson, Chris, "What is a shout?", Copyright © 2012 About Foursquare, [Online]. Retrieved from the Internet: <URL: http://aboutfoursquare.com/what-is-a-shout/>, (May 10, 2010), 1 pg.
Van Grove, Jennifer, "FourSquare + Google Maps = FourWhere", retrieved from URL<http://mashable.com/2010/03/09/fourwhere/>, (Mar. 9, 2010), 2 pgs.
Van Grove, Jennifer, "FourSquare and Starbucks Team Up to Offer Customer Rewards", retrieved from URL<ttp://web.archive.org/web/20100314033814/http://mashable.com/2010/03/11/toursquare-starbucks/>, (Mar. 14, 2010), 1 pg.
Zamora, Al, "Turf Wars Review", [Online]. Retrieved from Internet:<http://web.archive.org/web/20100304043316/http://dualshockers.com/2010/01/21/turf-wars-review/>, (Accessed Dec. 14, 2011), 6 pgs.
Zhephree, "Foursquare and Your Phone's GPS", [Online]. Retrieved from the Internet: <http://blog.zhephree.com/post/595855963/foursquare-and-your-phones-gps>, (Accessed Feb. 13, 2012), 4 pgs.
"U.S. Appl. No. 12/856,508, Examiner Interview Summary mailed Oct. 11, 2012", 2 pgs.
"U.S. Appl. No. 12/856,508, Notice of Allowance mailed Jan. 24, 2013", 5 pgs.
"U.S. Appl. No. 12/856,508, Notice of Allowance mailed Oct. 15, 2012", 8 pgs.
"U.S. Appl. No. 13/174,715, Non Final Office Action mailed Dec. 13, 2012", 6 pgs.
"U.S. Appl. No. 13/174,715, Response filed Nov. 27, 2012 to Final Office Action mailed Aug. 27, 2012", 10 pgs.
"U.S. Appl. No. 13/174,720, Final Office Action mailed Jan. 25, 2013", 10 pgs.
"U.S. Appl. No. 13/174,729, Response filed Sep. 21, 2012 to Final Office Action mailed Jun. 7, 2012", 11 pgs.
"U.S. Appl. No. 13/174,735, Final Office Action mailed Nov. 20, 2012", 12 pgs.
"U.S. Appl. No. 13/174,741, Notice of Allowance mailed Dec. 10, 2012", 20 pgs.
"U.S. Appl. No. 13/174,741, Response filed Oct. 12, 2012 to Final Office Action mailed Jun. 12, 2012", 17 pgs.
"U.S. Appl. No. 13/174,747, Final Office Action mailed Feb. 8, 2013", 20 pgs.
"U.S. Appl. No. 13/174,747, Response filed Oct. 19, 2012 to Non Final Office Action mailed Jan. 30, 2012", 9 pgs.
"U.S. Appl. No. 13/174,747, Response filed Oct. 19, 2012 to Non-Final Office Action mailed Jan. 30, 2012", 9 pgs.
"U.S. Appl. No. 13/244,681 , Response filed Feb. 5, 2013 to Final Office Action mailed Oct. 2, 2012", 11 pgs.
"U.S. Appl. No. 13/244,681, Final Office Action mailed Oct. 2, 2012", 16 pgs.
"U.S. Appl. No. 13/244,726, Final Office Action mailed Jan. 7, 2013", 27 pgs.

(56) References Cited

OTHER PUBLICATIONS

"U.S. Appl. No. 13/244,726, Notice of Non-Compliant Amendment mailed Aug. 16, 2012", 9 pgs.
"U.S. Appl. No. 13/244,726, Response filed Sep. 17, 2012 to Non Final Office Action mailed Jan. 31, 2012", 11 pgs.
"U.S. Appl. No. 13/244,763, Non Final Office Action mailed Jan. 28, 2013", 14 pgs.
"U.S. Appl. No. 13/244,763, Response filed Sep. 19, 2012 Final Office Action mailed Jun. 21, 2012", 9 pgs.
"U.S. Appl. No. 13/244,773, Final Office Action mailed Jan. 3, 2013", 19 pgs.
"U.S. Appl. No. 13/244,773, Notice of Non-Compliant Amendment mailed Aug. 14, 2012", 9 pgs.
"U.S. Appl. No. 13/244,773, Response filed Sep. 14, 2012 to Non Final Office Action mailed Jan. 13, 2012", 12 pgs.
"U.S. Appl. No. 13/244,780, Final Office Action mailed Sep. 13, 2012", 10 pgs.
"U.S. Appl. No. 13/244,780, Response filed Jan. 14, 2013 to Final Office Action mailed Sep. 13, 2012", 11 pgs.
"U.S. Appl. No. 13/244,809, Response filed Sep. 17, 2012 to Final Office Action mailed Jun. 18, 2012", 11 pgs.
"U.S. Appl. No. 13/244,814, Final Office Action mailed Nov. 2, 2012", 12 pgs.
"U.S. Appl. No. 13/244,826, Final Office Action mailed Nov. 26, 2012", 10 pgs.
"U.S. Appl. No. 13/244,926 , Response filed Oct. 1, 2012 to Final Office Action mailed May 30, 2012", 11 pgs.
"U.S. Appl. No. 13/244,926, Notice of Allowance mailed Jan. 22, 2013", 9 pgs.
"U.S. Appl. No. 13/244,926, Notice of Allowance mailed Nov. 29, 2012", 11 pgs.
"U.S. Appl. No. 13/244,934, Notice of Allowance mailed Dec. 17, 2012", 8 pgs.
"U.S. Appl. No. 13/244,934, Response filed Nov. 30, 2012 to Non Final Office Action mailed Aug. 31, 2012", 9 pgs.
"U.S. Appl. No. 13/244,937, Notice of Allowance mailed Oct. 2, 2012", 7 pgs.
"U.S. Appl. No. 13/244,937, Response filed Aug. 30, 2012 to Final Office Action mailed Jun. 29, 2012", 8 pgs.
"U.S. Appl. No. 13/244,939, Non Final Office Action mailed Sep. 14, 2012", 8 pgs.
"U.S. Appl. No. 13/244,939, Notice of Allowance mailed Jan. 10, 2013", 7 pgs.
"U.S. Appl. No. 13/244,939, Response filed Aug. 30, 2012 to Final Office Action mailed Jun. 28, 2012", 8 pgs.
"U.S. Appl. No. 13/244,939, Response filed Dec. 14, 2012 to Non Final Office Action mailed Sep. 14, 2012", 9 pgs.
"U.S. Appl. No. 13/174,735, Notice of Allowance mailed Aug. 13, 2013", 9 pgs.
"U.S. Appl. No. 13/174,747, Non Final Office Action mailed Jul. 15, 2013", 24 pgs.
"U.S. Appl. No. 13/244,773, Appeal Brief filed Aug. 5, 2013", 19 pgs.
"U.S. Appl. No. 13/244,809, Response filed Jul. 29, 2013 to Non Final Office Action mailed Mar. 29, 2013", 11 pgs.
"U.S. Appl. No. 13/244,814, Notice of Allowance mailed Jul. 24, 2013", 10 pgs.
"U.S. Appl. No. 13/244,826, Non Final Office Action mailed Jul. 30, 2013", 11 pgs.
"U.S. Appl. No. 13/435,627, Response filed Jul. 22, 2013 to Non Final Office Action mailed Mar. 22, 2013", 12 pgs.
"U.S. Appl. No. 13/936,661, Preliminary Amendment filed Jul. 9, 2013", 6 pgs.
"U.S. Appl. No. 13/174,729, Notice of Allowance mailed Sep. 3, 2013", 9 pgs.
"U.S. Appl. No. 13/174,737, Notice of Allowance mailed Oct. 11, 2013", 13 pgs.
"U.S. Appl. No. 13/174,737, Response filed Sep. 3, 2013 to Final Office Action mailed May 3, 2013", 12 pgs.

"20 Foursquare Apps That Show How It Could Become a Platform", Business Insider, [Online] Retrieved From Internet: <http://www.businessinsider.com/foursquare-app s-2010-8?op=1>, (Aug. 12, 2010).
"U.S. Appl. No. 13/174,715, Notice of Allowance mailed Mar. 21, 2013", 8 pgs.
"U.S. Appl. No. 13/174,715, Response filed Mar. 12, 2013 to Non Final Office Action mailed Dec. 12, 2012", 9 pgs.
"U.S. Appl. No. 13/174,720 , Response filed Jun. 25, 2013 to Final Office Action mailed Jan. 25, 2013", 10 pgs.
"U.S. Appl. No. 13/174,729, Non Final Office Action mailed Mar. 28, 2013", 14 pgs.
"U.S. Appl. No. 13/174,729, Response filed Jun. 18, 2013 to Non Final Office Action mailed Mar. 28, 2013", 11 pgs.
"U.S. Appl. No. 13/174,735, Notice of Allowance mailed Apr. 11, 2013", 10 pgs.
"U.S. Appl. No. 13/174,735, Response filed Mar. 20, 2013 to Final Office Action mailed Nov. 20, 2012", 7 pgs.
"U.S. Appl. No. 13/174,737, Final Office Action mailed May 3, 2013", 12 pgs.
"U.S. Appl. No. 13/174,741, Notice of Allowance mailed Feb. 27, 2013", 7 pgs.
"U.S. Appl. No. 13/174,741, Notice of Allowance mailed Jun. 7, 2013", 9 pgs.
"U.S. Appl. No. 13/174,747, Response filed Jun. 10, 2013 to Final Office Action mailed Jan. 8, 2013", 10 pgs.
"U.S. Appl. No. 13/244,681, Notice of Allowance mailed Mar. 15, 2013", 9 pgs.
"U.S. Appl. No. 13/244,681, Notice of Allowance mailed Jun. 19, 2013", 9 pgs.
"U.S. Appl. No. 13/244,726 , Appeal Brief filed Jul. 5, 2013", 18 pgs.
"U.S. Appl. No. 13/244,726, Advisory Action mailed Jun. 13, 2013", 3 pgs.
"U.S. Appl. No. 13/244,726, Response filed May 31, 2013 to Final Office Action mailed Jan. 1, 2013", 9 pgs.
"U.S. Appl. No. 13/244,763, Non Final Office Action mailed May 22, 2013", 16 pgs.
"U.S. Appl. No. 13/244,763, Response filed Apr. 29, 2013 to Non Final Office Action mailed Jan. 28, 2013", 10 pgs.
"U.S. Appl. No. 13/244,773, Decision on Pre-Appeal Brief Request mailed May 3, 2013", 2 pgs.
"U.S. Appl. No. 13/244,773, Pre-Appeal Brief Request filed Apr. 3, 2013", 5 pgs.
"U.S. Appl. No. 13/244,809, Non Final Office Action mailed Mar. 29, 2013", 13 pgs.
"U.S. Appl. No. 13/244,814, Notice of Allowance mailed Apr. 2, 2013", 9 pgs.
"U.S. Appl. No. 13/244,814, Preliminary Amendment filed Dec. 12, 2011", 3 pgs.
"U.S. Appl. No. 13/244,814, Response filed Mar. 4, 2013 to Final Office Action mailed Nov. 2, 2012", 9 pgs.
"U.S. Appl. No. 13/244,826, Response filed Mar. 26, 2013 to Final Office Action mailed Nov. 26, 2012", 9 pgs.
"U.S. Appl. No. 13/435,627, Non Final Office Action mailed Mar. 22, 2013", 11 pgs.
"International Application Serial No. PCT/US2011/045782, International Preliminary Report on Patentability mailed Feb. 28, 2013", 7 pgs.
Kingpin, "Every game has rules. Even this one", [Online] Retrieved From Internet: <http://web.archive.Org/web/20110220065257/http://kingpingame.com/rules>, (Feb. 20, 2011).
"U.S. Appl. No. 13/174,720, Non Final Office Action mailed Oct. 7, 2014", 14 pgs.
"U.S. Appl. No. 13/174,720, Response filed Jan. 7, 2015 to Non-Final Office Action dated Oct. 7, 2014", 17 pgs.
"U.S. Appl. No. 13/174,737, 312 Amendment filed Mar. 31, 2014", 7 pgs.
"U.S. Appl. No. 13/174,737, Notice of Allowance mailed Mar. 6, 2014", 10 pgs.
"U.S. Appl. No. 13/174,737, Notice of Allowance mailed Jun. 30, 2014", 10 pgs.
"U.S. Appl. No. 13/174,737, PTO Response to 312 Amendment mailed Apr. 8, 2014", 2 pgs.

(56) References Cited

OTHER PUBLICATIONS

"U.S. Appl. No. 13/174,747, Advisory Action mailed Jun. 16, 2014", 3 pgs.
"U.S. Appl. No. 13/174,747, Appeal Brief filed Oct. 6, 2014", 14 pgs.
"U.S. Appl. No. 13/174,747, Decision on Pre-Appeal Brief Request mailed Jun. 24, 2014", 2 pgs.
"U.S. Appl. No. 13/174,747, Final Office Action mailed Feb. 6, 2014", 23 pgs.
"U.S. Appl. No. 13/174,747, Response filed Jun. 6, 2014 to Final Office Action dated Feb. 6, 2014", 8 pgs.
"U.S. Appl. No. 13/174,747, Response filed Oct. 15, 2013 to Non Final Office Action mailed Jul. 15, 2013", 11 pgs.
"U.S. Appl. No. 13/244,763, Examiner Interview Summary mailed Nov. 7, 2013", 3 pgs.
"U.S. Appl. No. 13/244,763, Notice of Allowance mailed Feb. 20, 2014", 8 pgs.
"U.S. Appl. No. 13/244,763, Notice of Allowance mailed Jun. 24, 2014", 6 pgs.
"U.S. Appl. No. 13/244,763, Response filed Oct. 22, 2013 to Non Final Office Action mailed May 22, 2013", 11 pgs.
"U.S. Appl. No. 13/244,773, Examiner's Answer to Appeal Brief mailed Nov. 7, 2013", 11 pgs.
"U.S. Appl. No. 13/244,773, Reply Brief filed Jan. 6, 2014", 10 pgs.
"U.S. Appl. No. 13/244,780, 312 Amendment filed Sep. 10, 2014", 7 pgs.
"U.S. Appl. No. 13/244,780, Notice of Allowance mailed Aug. 5, 2014", 10 pgs.
"U.S. Appl. No. 13/244,809, Notice of Allowance mailed Oct. 21, 2013", 13 pgs.
"U.S. Appl. No. 13/244,826, Final Office Action mailed Mar. 26, 2014", 11 pgs.
"U.S. Appl. No. 13/244,826, Response filed Aug. 25, 2014 to Final Office Action dated Mar. 26, 2014", 12 pgs.
"U.S. Appl. No. 13/244,826, Response filed Nov. 22, 2013 to Non Final Office Action mailed Jul. 30, 2013", 10 pgs.
"U.S. Appl. No. 13/435,627, Appeal Brief filed Jun. 18, 2014", 14 pgs.
"U.S. Appl. No. 13/435,627, Decision on Pre-Appeal Brief Request mailed Apr. 4, 2014", 2 pgs.
"U.S. Appl. No. 13/435,627, Final Office Action mailed Nov. 19, 2013", 10 pgs.
"U.S. Appl. No. 13/435,627, Non Final Office Action mailed Jul. 23, 2014", 15 pgs.
"U.S. Appl. No. 13/435,627, Pre-Appeal Brief Request filed Mar. 19, 2014", 5 pgs.
"U.S. Appl. No. 13/435,627, Response filed Dec. 23, 2014 to Non Final Office Action mailed Jul. 23, 2014", 23 pgs.
"U.S. Appl. No. 13/651,929, Final Office Action mailed Aug. 25, 2014", 7 pgs.
"U.S. Appl. No. 13/651,929, Non Final Office Action mailed Apr. 17, 2014", 7 pgs.
"U.S. Appl. No. 13/651,929, Response filed Aug. 18, 2014 to Non-Final Office Action dated Apr. 17, 2014", 9 pgs.
"U.S. Appl. No. 13/651,929, Response filed Dec. 29, 2014 to Final Office Action mailed Aug. 25, 2014", 15 pgs.
"U.S. Appl. No. 14/070,090, Non Final Office Action mailed Dec. 22, 2014", 16 pgs.
"U.S. Appl. No. 14/070,090, Preliminary Amendment filed Jan. 29, 2014", 6 pgs.
"Bump (application)", [Online]. Retrieved from the Internet: <http://en.wikipedia.org/wiki/Bump_(application)>, (Accessed Dec. 15, 2014), 7 pgs.
Nintendo, "Mario Party", [Online]. Retrieved from the Internet: <http://www.mariowiki.com/Mario_Party>, (Feb. 8, 1999), 14 pgs.
"U.S. Appl. No. 13/174,720, Final Office Action mailed Feb. 12, 2015", 6 pgs.
"U.S. Appl. No. 13/174,747, Examiner's Answer mailed Feb. 5, 2015", 13 pgs.
"U.S. Appl. No. 13/435,627, Appeal Brief filed Mar. 3, 2015", 36 pgs.
"U.S. Appl. No. 13/435,627, Final Office Action mailed Jan. 9, 2015", 12 pgs.
"U.S. Appl. No. 13/651,929, Corrected Notice of Allowance mailed Mar. 3, 2015", 2 pgs.
"U.S. Appl. No. 13/651,929, Notice of Allowance mailed Jan. 20, 2015", 5 pgs.
"U.S. Appl. No. 14/070,090, Response filed Feb. 26, 2015 to Non Final Office Action mailed Dec. 22, 2014", 9 pgs.
"U.S. Appl. No. 13/174,720, Non Final Office Action mailed May 21, 2015", 7 pgs.
"U.S. Appl. No. 13/174,720, Response filed Apr. 10, 2015 to Final Office Action mailed Feb. 12, 2015", 25 pgs.
"U.S. Appl. No. 13/244,726, Non Final Office Action mailed May 12, 2015", 35 pgs.
"U.S. Appl. No. 13/244,826, Non-Final Office Action received", 13 pgs.
"U.S. Appl. No. 13/936,661, Non Final Office Action mailed Jul. 9, 2015", 10 pgs.
"U.S. Appl. No. 14/070,090, Non Final Office Action mailed Apr. 28, 2015 U.S. Appl. No. 14/070,090, Non Final Office Action mailed Apr. 28, 2015", 13 pgs.
"U.S. Appl. No. 14/070,090, Response filed Jul. 28, 2015 to Non Final Office Action mailed Apr. 28, 2015", 26 pgs.
"Inventory", Terraria.wiki.com.Online, [Online]. Retrieved from the Internet:<URL: http://terraria.wikia.com/wiki/Inventory>, (Apr. 20, 2015).
"Potions", Terraria.wiki.com, [Online]. Retrieved from the Internet: <URL:https://web.archive.org/web/20110522051527/http://terraria.wikia.com/wiki/Potions>, (Apr. 20, 2015).
"Terraria", wikipedia.org, [Online]. Retrieved from the Internet:<URL: http://en.wikipedia.org/wiki/Terraria>, (Apr. 20, 2015).

\* cited by examiner

200U

```
A GAME NETWORKING SYSTEM IDENTIFIES A
TARGETED ADVERTISING OPPORTUNITY
BASED ON A TRACKING OF IN-GAME          — 2080
ACTIONS, LOCATION-BASED ACTIONS, OR
OTHER DATA PERTAINING TO A PLAYER
```

```
THE GAME NETWORKING SYSTEM OFFERS
THE TARGETED ADVERTISING OPPORTUNITY    — 2082
FOR SALE TO ONE OR MORE OPERATORS OF
ONE OR MORE LOCATIONS
```

PROVIDING VIRTUAL ITEMS BASED ON LOCATION-BASED ACTIONS

The present disclosure generally relates to games and applications and in particular to computer-implemented or processor-implemented online games, such as online role-playing games (RPGs), playable by one or more people from one or more locations.

BACKGROUND

In many games, there is a virtual world or some other imagined playing space where a player of the game controls one or more player characters (herein "characters," "player characters," or "PCs"). Player characters can be considered in-game representations of the controlling player. As used here, the terms player, user, entity, and friend may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating what happened. In some games, there are multiple players, wherein each player controls one or more player characters.

In many computer games, there are various types of in-game assets aka "rewards" or "loot") that a player character can obtain within the game. For example, a player character may acquire game points, gold coins, experience points, character levels, character attributes, virtual cash, or other in-game items of value. In some games, the goal of the game may be to acquire in-game rewards. For example, a player may strive to achieve a high score by accumulating points that are granted for performing in-game tasks or overcoming in-game obstacles.

Many online computer games are operated on an online social network. Such a network allows both users and other parties to interact with the computer games directly, whether to play the games or to retrieve game- or user-related information.

Many operators of physical (i.e., "real-world") locations allow users to conduct a variety of actions on their property, such as visiting the location, performing certain tasks or actions at the location, purchasing goods and services at the location, and the like. Goods can include items that are physical and tangible, items that are delivered electronically to the user over the Internet, and items that are delivered through conventional distribution channels (e.g., a common carrier).

As used herein, a user is a player of an online computer game. Additionally, as used herein, an item can include a good or service offered by a location operator. Similarly, as used herein, a purchase (or order) can include buying, renting, or licensing an item from a location operator.

Internet users may maintain one or more accounts with various service providers, including online gaming systems, online social networking systems, online merchant systems, physical location systems, and the like. Online systems can typically be accessed using browser clients (e.g., Firefox, Chrome, Internet Explorer). Locations may also include network addressable systems that can communicate over a wide area network environment, such as the Internet.

BRIEF DESCRIPTION OF THE DRAWINGS

FIG. 2I shows a flowchart illustrating an example method of providing an in-game asset to a user based on a detection that the user performed a location-based action at a first location and a location-based action at a second location.

FIG. 2O shows a flowchart illustrating an example method of associating location-based actions with votes on a matter.

FIG. 2U shows a flowchart illustrating an example method of offering a targeted advertising opportunity for sale.

DESCRIPTION OF EXAMPLE EMBODIMENTS

In various embodiments, a method of providing virtual items based on location-based actions is disclosed. An indication is received of a performance of a location-based action by a player of a computer-implemented game. A virtual item is provided based on the receiving of the indication of the performance of the location-based action by the player of the computer-implemented game. The virtual item may be usable within the computer-implemented game.

Figure 1A:
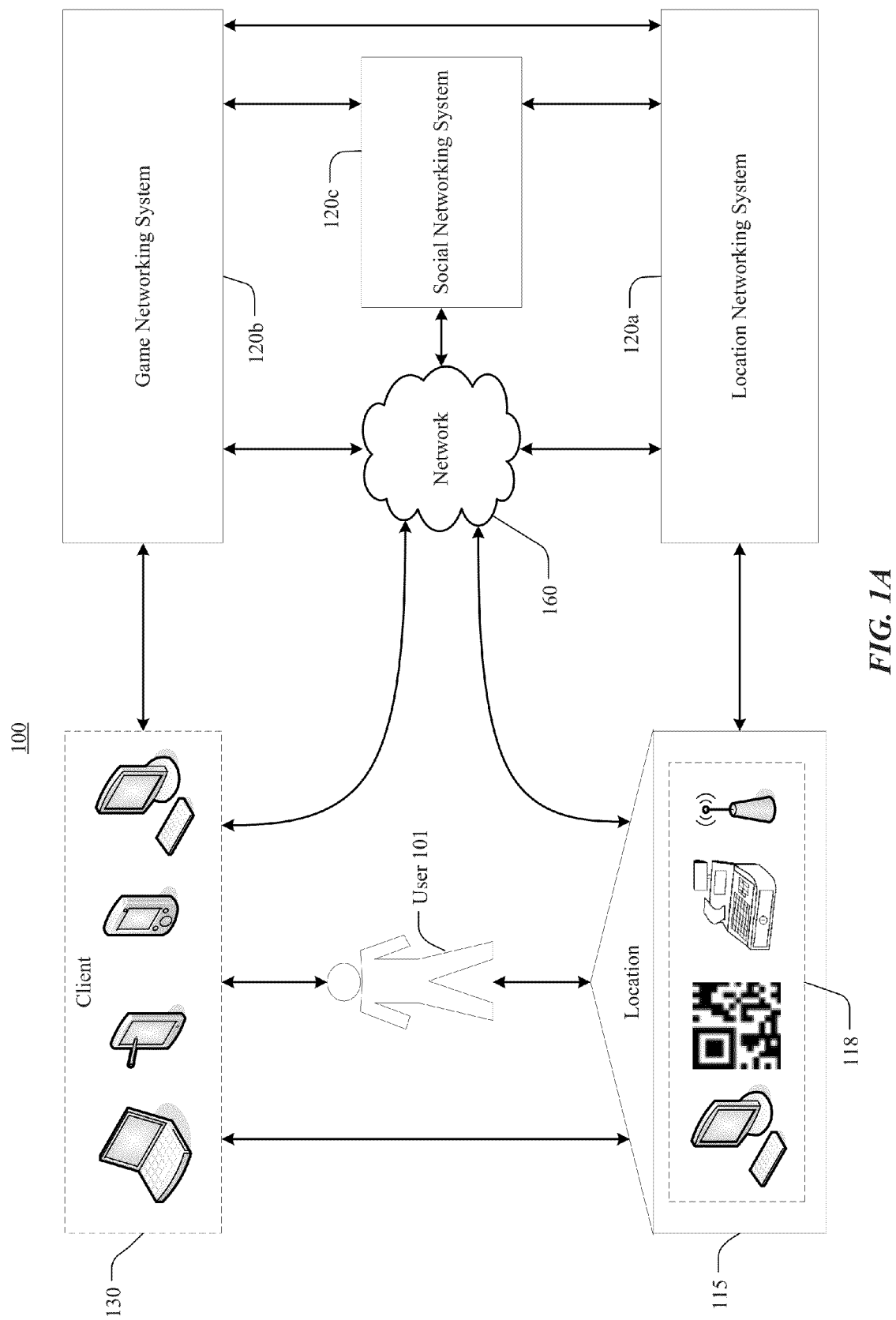
FIG. 1A shows a block diagram illustrating an example of a system for implementing various disclosed embodiments.

FIG. 1A illustrates an example of a system for implementing various disclosed embodiments. In various embodiments, system 100 comprises user 101, location 115, verification system 118, location networking system 120a, game networking system 120b, client system 130, and network 160. The components of system 100 can be connected to each other in any suitable configuration, using any suitable type of connection. The components may be connected directly or over a network 160, which may be any suitable network (e.g., the Internet).

User 101 is a player of one or more online computer games. Game networking system 120b is a network-addressable computing system that hosts the one or more online games. Game networking system 120b can generate, store, and transmit game account data and game state data associated with one or more users. An online game can be accessed by client system 130 directly, via network 160, or via a third-party system (e.g., a social networking site). Client system 130 can be any suitable computing device, such as a personal computer, laptop, cellular phone, smart phone, computing tablet, and the like. Location 115 is a physical place that has one or more location attributes associated with it. User 101 can visit location 115 and perform one or more location-based actions there. Location 115 can contain one or more verification systems 118, which can verify if and when user 101 has performed a location-based action at location 115. Location 115 may also be a "logical" place that has one or more location attributes associated with it. For example, a location may be a chain coffee shop (e.g., Starbucks) that has many physical places (e.g., Moscow, Johannesburg, San Francisco, etc.) Thus, a user may perform a location-based action at a logical Starbucks location by performing the location-based action at any one of the physical places where "real-world" Starbucks shops exist. Verification system 118 can generate, store, and transmit action verification data, which is data comprising information on one or more users and one or more location-based actions associated with the users.

Location networking system 120a is a network-addressable computing system that can receive, store, and transmit location attribute data, action verification data, and other data associated with location 115 and verification system 118. Location networking system 120a can be accessed by the other components in system 100 either directly or via network 160. In some embodiments, user 101 can physically bring his client system 130 to location 115 (e.g., if client system 130 is a smart phone). Client system 130 may then be able to interact directly with location 115 or verification system 118.

Social networking system 120c is a network-addressable computing system that maintains social graphs. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120c or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120c managed by a third party (e.g., Facebook, Friendster, Myspace). In yet other embodiments, user 101 has a social network on both game networking system 120b and social networking system 120c, wherein user 101 can have a social network on the game networking system 120b that is a subset, superset, or independent of the player's social network on social networking system 120c. In such combined systems, game networking system 120b can maintain social graph information with edge type attributes that indicate whether a given friend is an "in-game friend," an "out-of-game friend," or both. The various embodiments disclosed herein are operable when the social graph is managed by social networking system 120c, game networking system 120b, or both.

Figure 1B:
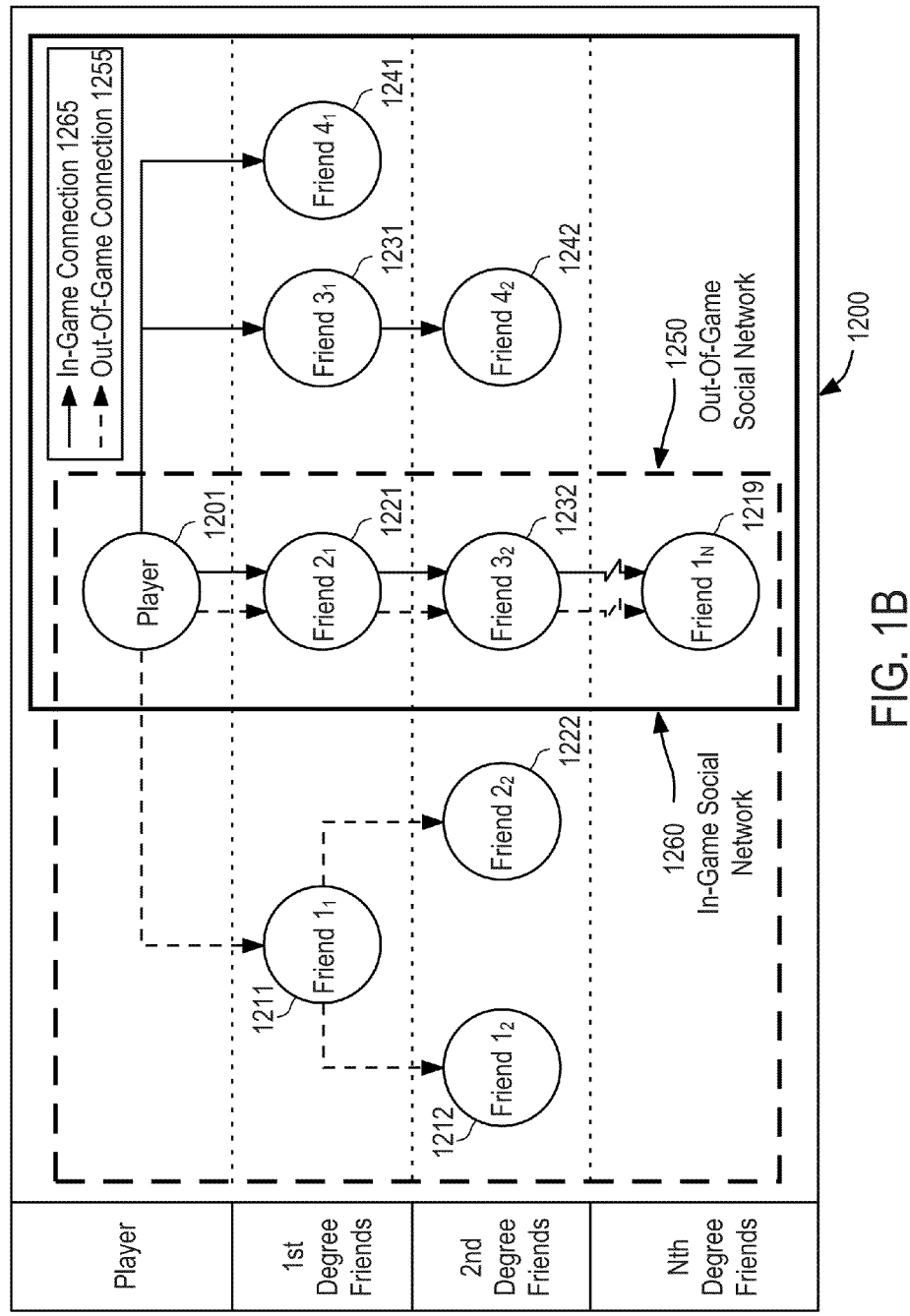
FIG. 1B shows a block diagram illustrating an example of a social network within a social graph.

FIG. 1B is a block diagram illustrating an example of a social network 1200 within a social graph. As shown, Player 1201 can be associated, connected or linked to various other users, or "friends," within the out-of-game social network 1250. These associations, connections or links can track relationships between users within the out-of-game social network 1250 and are commonly referred to as online "friends" or "friendships" between users. Each friend or friendship in a particular user's social network within a social graph is commonly referred to as a "node." For purposes of illustration and not by way of limitation, the details of out-of-game social network 1250 will be described in relation to Player 1201. As used herein, the terms "player" and "user" can be used interchangeably and can refer to any user or character in an online multiuser game system or social networking system. As used herein, the term "friend" can mean any node within a player's social network.

As shown in FIG. 1B, Player 1201 has direct connections with several friends. When Player 1201 has a direct connection with another individual, that connection is referred to as a first-degree friend. In out-of-game social network 1250, Player 1201 has two first-degree friends. That is, Player 1201 is directly connected to Friend $1_1$ 1211 and Friend $2_1$ 1221. In a social graph, it is possible for individuals to be connected to other individuals through their first-degree friends (i.e., friends of friends). As described above, each edge required to connect a player to another user is considered the degree of separation. For example, FIG. 1B shows that Player 1201 has three second-degree friends to whom he is connected via his connection to his first-degree friends. Second-degree Friend $1_2$ 1212 and Friend $2_2$ 1222 are connected to Player 1201 via his first-degree Friend $1_1$ 1211. The limit on the depth of friend connections, or the number of degrees of separation for associations, that Player 1201 is allowed is typically dictated by the restrictions and policies implemented by social network 1200.

In various embodiments, Player 1201 can have Nth-degree friends connected to him through a chain of intermediary degree friends, as indicated in FIG. 1B. For example, Nth-degree Friend $1_N$ 1219 is connected to Player 1201 via second-degree Friend $3_2$ 1232 and one or more other higher-degree friends. Various embodiments may utilize the distinction between the various degrees of friendship relative to Player 1201.

In particular embodiments, a player (or player character) can have a social graph within an online multiplayer game that is maintained by the game engine and another social graph maintained by a separate social networking system. FIG. 1B depicts an example of in-game social network 1260 and out-of-game social network 1250. In this example, Player 1201 has out-of-game connections 1255 to a plurality of friends, forming out-of-game social network 1250. Here, Friend $1_1$ 1211 and Friend $2_1$ 1221 are first-degree friends with Player 1201 in his out-of-game social network 1250.

Player 1201 also has in-game connections 1265 to a plurality of players, forming in-game social network 1260. Here, Friend $2_1$ 1221, Friend $3_1$ 1231, and Friend $4_1$ 1241 are first-degree friends with Player 1201 in his in-game social network 1260, and friend $4_2$ 1242 is a second-degree friend with Player 1201 in his in-game social network 1260. In some embodiments, it is possible for a friend to be in both the out-of-game social network 1250 and the in-game social network 1260. Here, Friend $2_1$ 1221 has both an out-of-game connection 1255 and an in-game connection 1265 with Player 1201, such that Friend $2_1$ 1221 is in both Player 1201's in-game social network 1260 and Player 1201's out-of-game social network 1250.

As with other social networks, Player 1201 can have second-degree and higher-degree friends in both his in-game and out-of-game social networks. In some embodiments, it is possible for Player 1201 to have a friend connected to him both in his in-game and out-of-game social networks, wherein the friend is at different degrees of separation in each network. For example, if Friend $2_2$ 1222 had a direct in-game connection with Player 1201, Friend $2_2$ 1222 would be a second-degree friend in Player 1201's out-of-game social network, but a first-degree friend in Player 1201's in-game social network. In particular embodiments, a game engine can access an in-game social network 1260, out-of-game social network 1250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

The game networking system 120b may determine information related to a social network of a user or an aggregation of the social networks of a user. Such information may include measurements pertaining to the social graphs, such as the size, width, or depth of the social graphs. For example, such information may include how many people are in the social graph, how fast the social graph is growing, or how many branches of a master social graph (e.g., a graph of all Facebook users) are covered in the social graph. Such information may also include a level of participation in a computer-implemented game of the people in the social graph, such as a level of success of the people at completing game-related quests or how much the people have helped others complete game-related quests. A measurement of the value of the social graph may depend on weighted measurements pertaining to information about the people in the social graph. Thus, the game networking system 120b may consider a first social graph to be more valuable than a second social graph based on the members of the first social graph having higher levels of participation in a computer-implemented game than members of the second social graph, even if the second social graph has more members. The game networking system 120b may incorporate measurements pertaining to the social graphs of a user into any of its decisions, such as the size of an incentive reward to offer to a player or a location-based action to propose to a player.

Game Systems

In an online game, a game engine manages the game state of the game. Game state comprises all in-game parameters, including player character state, non-player character (NPC) state, in-game assets and other virtual items, in-game obstacles, game parameters (e.g., internal game clocks, game environments), and other in-game elements or features. Each player controls one or more player characters (PCs). The game engine controls all other aspects of the game, including non-player characters (NPCs), in-game obstacles, and other game elements. The game engine also manages game state, including player character state, for currently active (online) and inactive (offline) players.

A player character can have a set of attributes associated with the player character. As used herein, player character state can refer to one or more in-game attributes of a player character, such as in-game location, assets, levels, condition, health, status, inventory, skill set, name, orientation, affiliation, specialty, and so on. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

In various embodiments, an online game can provide a mechanism for player characters to acquire in-game assets, which are a type of virtual item or thing that provides some type of in-game benefit to a player character. In some embodiments, an in-game asset can provide an in-game benefit for the player character by improving the player character's state. The improved player character state could increase the player character's likelihood or ability to advance in the game, or otherwise improve game play. For example, in-game assets could be character levels, ability points, skill points, hit points, mana points, combat bonuses, and the like. In-game assets can also be virtual representations of real life things such as cash, chattel, precious valuables, personal property, real property, weapons, vehicles, titles, jobs, and the like. In-game assets can also include mythical and fantasy things, such as manna, magical items, potions, relics, artifacts, and the like.

An online game can be hosted by game networking system 120b, which can be accessed using any suitable connection with an appropriate client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player of an online game hosted on game networking system 120b. Game networking system 120b can determine that user 101 is accessing the online game by reading the user 101's cookies, which may be appended to Hypertext Transfer Protocol (HTTP) requests transmitted by client system 130, and/or by the user 101 logging onto the online game.

Locations

As used herein, a location is a specific physical place in the real world. For example, location 115 could be a store, restaurant, mall, business office, building, park, street venue, library, or the like. Location 115 can have various systems associated with it, including verification system 118 and location networking system 120a. As used herein, the operator of location 115 is the person or entity that owns, possesses, operates, or otherwise controls location 115. Furthermore, as used herein, a user 101 of location 115 is a person who can enter, visit, use, purchase, or perform some other action at location 115. This can include past, present, and future users of location 115. In various embodiments, a player of an online game may also be a user 101 of location 115.

In various embodiments, location 115 can have one or more devices for communicating with game networking system 120b. Verification system 118 or location networking system 120a can communicate with game networking system 120b, either directly or via network 160. In some embodiments, verification system 118 and location networking system 120a are part of the same computing system.

Location Attributes

In various embodiments, location 115 can have one or more attributes associated with it. These location attributes include a variety of details about location 115. Location attributes can include, for example: details regarding goods and services available at the location 115, such as the type, price, quantity, quality, brand, size, description, and other details of the goods and services available at the location 115; the purchase history of goods and services at the location 115; corporate and intellectual property information of the location 115, such as any brands, trademarks, logos, and other such information associated with the location 115; the location-based action history of players of one or more online games at the location 115, such as the type of location-based actions, proposed location-based actions, performed location-based actions, and other information regarding location-based actions associated with the location 115; personal and demographic information of any users 101 of the location 115, such as name, sex, race, ethnicity, age, income, education, employment status, address, credit information, purchase history, and other personal or demographic information of the users 101 of the location 115; geographic information of the location, such as the position, elevation, size, orientation, global position system (GPS) coordinates, relation to other locations, local terrain, weather, and other geographic information of the location 115; and other descriptive information associated with the location.

In various embodiments, the location attributes of location 115 can be stored in a location account. The examples described herein assume that the location account is stored on location networking system 120a; however, this is not intended to be limiting. The location account can be stored on any suitable data store, including location networking system 120a, game networking system 120b, a third-party system, a distributed data store, or any combination of two or more of the above.

In some embodiments, the location attributes of location 115 can be determined by accessing a website or other network-addressable system that contains details about location 115. For example, a computing system can access a website associated with location 115, such as a corporate website or an online shopping catalog, and analyze the website for text, keywords, prices, concepts, meta tags, and other details associated with location 115.

User Identification

In various embodiments, location networking system 120a can identify users of location 115 by a variety of methods. The methods described below are not intended to be limiting, and one of ordinary skill in the art would recognize that other methods can be used to identify a user 101.

In some embodiments, location networking system 120a can identify a user 101 when the user 101 purchases an item at location 115. When a user 101 purchases an item at location 115, location networking system 120a may collect purchase information from the user 101, including the user 101's name, credit card number, billing address, shipping address, email address, and so forth. For example, if user 101 visits a store and purchases an item with a credit card, location networking system 120a could use the information contained on the credit card to identify user 101.

In some embodiments, location networking system 120a can identify a user 101 based on some form of identification presented by the user 101 at location 115. A user 101 could present a membership card, discount card, coupon, ticket, code, driver's license, passport, or other item that contains identifying information about the user 101 at location 115. For example, user 101 may have a ticket with a scannable code (e.g., a Quick Response (QR) code) that contains identifying information. The ticket can be scanned at location 115, thereby allowing location networking system 120a to identify user 101.

In some embodiments, location networking system 120a can identify a user 101 based on the user 101's proximity to location 115. A user 101's proximity can be determined using various devices or applications, such as a GPS device, a social networking site (e.g., Facebook, Twitter), a location tracking site (e.g., Foursquare, Google Latitude), a location reservation site (e.g., OpenTable, Expedia), and the like. Location networking system 120a could then access this proximity information to identify the user 101. For example, if user 101 enters a store, he could access Foursquare via any suitable computing device to indicate that he is at the store, and Foursquare could transmit this information to location networking system 120a, thereby informing location networking system 120a that user 101 is at the store. In another example, location 115 could have a QR code printed inside the location, which user 101 could photograph with a mobile client system 130 (e.g., a smart phone) and transmit to location networking system 120a. In yet another example, if user 101 makes a reservation to dine at a restaurant on OpenTable, location networking system 120a could identify user 101 when he checks in with the maître d' at the restaurant.

In some embodiments, location networking system 120a can identify a user 101 when the user 101 provides an indication of the user 101's presence at location 115. User 101 could check-in with a host, log in to a computing device, activate a button or switch, or perform some other type of action to indicate the user 101's presence at location 115, which could then be transmitted to location networking system 120a. For example, if user 101 visits a hotel, location networking system 120a could identify user 101 when he checks in with the hotel clerk. In another example, if user 101 accesses a computing system at location 115, location networking system 120a could identify user 101 when he logs into the computing system.

In some embodiments, location networking system 120a or game networking system 120b can identify user 101 based on a search engine query made by the user 101. For example, if user 101 queries a search engine (e.g., Google or Yahoo) that has information that identifies user 101, that information can be transmitted to location networking system 120a or game networking system 120b along with any other relevant information (e.g., the search query made by user 101) that either system could use to identify user 101.

In some embodiments, while identifying a user 101, location networking system 120a may also collect information related to one or more game accounts associated with the user 101, including any unique game account identifiers assigned to the user 101. For example, user 101 may gain entrance to location 115 by presenting a ticket with a scannable QR code, which contains information identifying user 101 and information about user 101's unique identifier on an online game. After this ticket is scanned at location 115, the identifying information can be transmitted to location networking system 120a.

In some embodiments, location networking system 120a can assign a unique identifier to each user 101 of location 115. Location networking system 120a can assign a name, identification number, or other unique identifier to user 101. Location networking system 120a can also utilize any unique identifier assigned to the user 101 by game networking system 120b.

Offering Incentive Rewards for Performing Location-Based Actions

A user of an online game hosted by game networking system 120b can also be user 101 of location 115. Location operators may find it desirable to provide some type of incentive to encourage these users to perform one or more location-based actions. Some users may be incentivized to perform certain location-based actions when offered an in-game asset for an online game. As used herein, an incentive reward is an in-game asset in an online game that is offered to a user of the online game for completing one or more location-based actions. For example, the incentive reward could be a specific in-game asset (e.g., a Sword of Destruction +5) that provides a particular in-game benefit (e.g., increasing a player character's ability to defeat in-game opponents). As used herein, a location-based action is a type of action that can be performed at one or more locations by a user of an online game, wherein the action is proposed to the user as part of an offer for an incentive reward. For example, a location-based action could be entering, visiting, using, purchasing, or performing some other action at location 115.

In some embodiments, a distributor or manufacturer of an item can incentivize users of an online game to purchase the item from a location. For example, the distributor or manufacturer of a specific soft drink may offer (e.g., via an interface of the game networking system 120b) an in-game incentive for purchasing a can of the soft drink from any location. While this disclosure generally discusses location-based actions with respect to a location, the embodiments disclosed herein are also applicable to location-based actions with respect to a distributor or manufacturer of an item, unless context suggests otherwise.

Incentive Rewards

An incentive reward may include a providing of an in-game asset, a changing of an attribute of an in-game asset, or an enabling of a feature of an online game hosted by game networking system 120b. An incentive reward could be, for example, game points, virtual currency, experience points, character levels, character attributes, virtual items, or other in-game assets. Or an incentive reward could be, for example, a changing of an attribute (e.g., a visual characteristic) of an in-game asset. Or an incentive reward could be, for example, an enabling of an in-game feature, such as a dead drop for virtual items (described below) or a trading post for virtual items (described below).

Or an incentive reward may include an out-of-game asset. For example, an incentive reward may be a real-world item, such as money or a coupon. Or an incentive reward may be reward points (e.g., airline miles), such as reward points associated with a credit card. Or an incentive reward may be a real-world item that corresponds to a virtual item. For example, an incentive reward may be a plastic ring corresponding to a virtual ring purchased by a player character of a user within a virtual world of a computer-implemented game.

Incentive Offer Search Systems

In various embodiments, game networking system 120b can include an incentive offer search system, which is a network-addressable computing system that is operative to generate and/or select an incentive reward in response to a request from another computing system, such as location networking system 120a, game networking system 120b, or client system 130. The incentive offer search system may be a central system accessible to one or more systems over a wide area network, or a local system accessible to a single domain. The present disclosure assumes the incentive offer search system is a subsystem of game networking system 120b; however, it is possible that the incentive offer search system is part of location networking system 120a or even an independent remote system.

In one embodiment, the incentive offer search system includes one or more physical servers and an incentive offer data store. The incentive offer data store can store content information containing incentive offer creative content and Uniform Resource Locators (URLs) or identifiers to content or other resources hosted by game networking system 120b or location networking system 120a. The content may be stored in association with a game engine or game account information on game networking system 120b.

In various embodiments, the incentive offer search system determines an appropriate incentive reward to offer to a user 101 for performing one or more location-based actions. In various embodiments, the incentive offer search system determines an appropriate reward to offer to groups (or cohorts) of people, either to each individual member of the group, or to the group collectively. Such groups of people may include in-game groups (e.g., a party existing within a role-playing game) or out-of-game groups (e.g., a "clan" of players that exists independently of a particular game). In some embodiments, the incentive offer search system determines an appropriate reward to offer to groups of people regardless of whether the group is associated with the computer-implemented game. For example, the incentive offer search system may determine an appropriate reward to offer to a church group or members of a Zynga Mafia Wars clan. The incentive reward can be determined by a variety of methods (e.g., statically, randomly, or dynamically).

In some embodiments, the incentive reward can be determined statically, such that the incentive reward offered is the same for all users. For example, user 101 might be offered an incentive reward of $20,000 in virtual poker chips for purchasing a lawnmower at location 115, and this same incentive reward would be offered to all other users.

In some embodiments, the incentive reward can be determined dynamically, such that the incentive reward offered may vary based on a variety of factors. For example, the incentive reward can be determined based on location attributes, game state, or other parameters.

Determining Incentive Rewards Based on Game State

In various embodiments, the incentive offer search system can determine an appropriate incentive reward based on game state data stored on game networking system 120b. The incentive offer search system can access the user 101's game account to retrieve various game state data (e.g., the games played by the user 101, the user 101's player character state) and then identify an incentive reward appropriate for user 101 based on that data.

In some embodiments, the incentive offer search system can consider thematic, topical, or categorical relationships between a possible incentive reward and a game state variable to determine an appropriate incentive reward. For example, the incentive offer search system may query game networking system 120b to determine that user 101 is a player in Zynga Dragon Wars and that user 101's player character is a 5th-level elf. The incentive offer search system may then determine that an Elven Invisibility Cloak is an appropriate incentive reward for a 5th-level elf based on the thematic relationship between the player character's race and the incentive reward.

In some embodiments, the incentive offer search system can consider player character state, such as in-game assets and other attributes of a player character, to determine an appropriate incentive reward. For example, if user 101 has $25,000 in virtual poker chips in Zynga Poker, the incentive offer search system may determine that an incentive reward of $10,000 in virtual poker chips is appropriate, but if user 101 has $100,000 in virtual poker chips, an incentive reward of $30,000 may be determined appropriate based on his current in-game assets, wherein the incentive reward is scaled to user 101's current in-game assets. In another example, if user 101 has five purple gems and zero orange gems in Zynga Treasure Isle, the incentive offer search system may determine that two orange gems is an appropriate incentive reward for user 101 based on his current in-game assets, wherein the incentive reward is selected so that user 101 is not offered a redundant in-game asset.

In some embodiments, where user 101 plays more than one game hosted by game networking system 120b, the incentive offer search system can generate incentive rewards corresponding to one or more of the games. Game networking system 120b can host a plurality of online games, and a particular user may play one or more of these games and control one or more player characters in each game. If the user 101 plays more than one game on game networking system 120b, the incentive offer search system may generate an incentive reward corresponding to one or more of these games. The incentive offer search system can determine which games to generate incentive rewards for by examining the user 101's game account information with respect to each game and analyzing a variety of factors (e.g., the user 101's frequency of play, duration of play, play preferences, social network information). In a particular embodiment, the incentive offer search system can generate an incentive reward for one game from the plurality of games. For example, if user 101 plays Zynga Poker on average ten hours a week, but only plays Zynga Mafia Wars on average five hours per week, the incentive offer search system may determine that user 101 prefers playing Zynga Poker and may only generate an incentive reward for that game. Alternatively, the incentive offer search system may generate an incentive reward for Zynga Mafia Wars instead as a means of encouraging user 101 to increase his game play time in that game. The offer search system may also consider a user 101's social network information for multiuser online games that interface with social networking systems. For example, if user 101 has twenty friends who play Zynga Poker but fifty friends who play Zynga Mafia Wars, the incentive offer search system may determine that user 101 prefers playing Zynga Mafia Wars and only generate an incentive reward for that game.

In some embodiments, the incentive offer search system can generate incentive rewards for two or more games. In one embodiment, the incentive offer search system can generate incentive rewards for a plurality of games. For example, if user 101 plays both Zynga Poker and Zynga Mafia Wars, the incentive offer search system may offer an incentive reward of $10,000 in virtual poker chips (for Zynga Poker) and a virtual submachine gun (for Zynga Mafia Wars). In another embodiment, the incentive offer search system can generate incentive rewards for a plurality of games, but the offer requires the user 101 to choose which game he wants to receive the incentive reward in. For example, using the previous example, the incentive offer search system might offer user 101 an incentive reward of $10,000 in virtual poker chips and a virtual machine gun, but require user 101 to choose which of the two rewards he wants. In yet another embodiment, the incentive offer search system can generate a single incentive reward that can be used in a plurality of games. For example, in a variation of the previous example, the incentive offer search system might offer user 101 an incentive reward of $10,000 in virtual cash, wherein this cash can be used in either Zynga Poker or Zynga Mafia Wars.

In some embodiments, the incentive offer search system can generate an incentive reward for a game hosted by game networking system 120b that user 101 has never played or that has no game account associated with the user 101. An incentive reward for an unplayed game can be generated even if the user 101 plays other games on game networking system 120b. For example, if user 101 has only played Zynga Poker on game networking system 120b, the incentive offer search system may generate an incentive reward for another game hosted by game networking system 120b (e.g., Zynga Mafia Wars, Zynga YoVille) to encourage user 101 to try a new game.

Figure 2A:
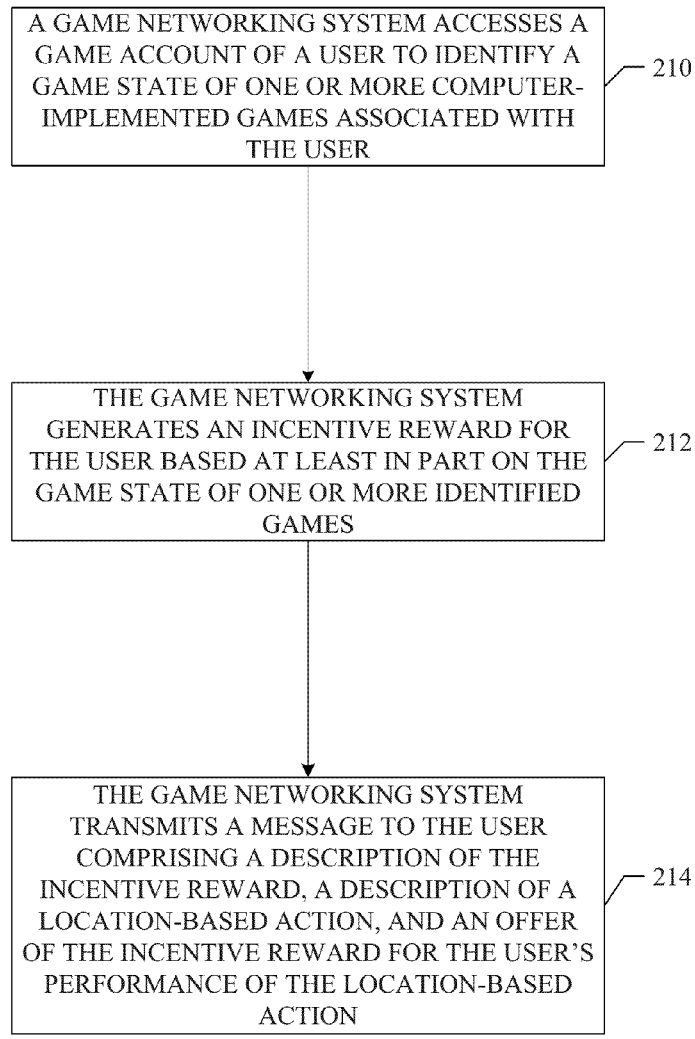
FIG. 2A shows a flowchart illustrating an example method for generating an incentive reward based on game state.

FIG. 2A shows a flowchart illustrating an example method 200A for generating an incentive reward based on game state. In various embodiments, game networking system 120b accesses a game account of user 101 to identify one or more computer-implemented games associated with the user 101 at step 210. Game networking system 120b then generates an incentive reward for the user 101 based at least in part on the game state of the one or more identified games at step 212. The game networking system 120b then transmits a message to the user 101 comprising a description of the incentive reward, a description of a location-based action, and an offer of the incentive reward for the user 101's performance of the location-based action at step 214. The example method illustrated in FIG. 2A and described above is provided for illustration purposes only and is not meant to be limiting. One of ordinary skill in the art would appreciate that the steps described above can be performed in any reasonable order, and that various steps can be reordered, added, and removed.

Determining Incentive Rewards Based on Location Attributes

In various embodiments, the incentive offer search system can determine an appropriate incentive reward based on location attribute data. The location attributes of location 115 can be stored in a location account, which can be stored and accessed on any suitable computing system, including location networking system 120a, game networking system 120b, a third-party system, a distributed computing system, or any combination of two or more of the above. The incentive offer search system can access location 115's location account to retrieve various location attribute data (e.g., the goods and services available at the location, personal and demographic information of users of the location) and then identify an incentive reward appropriate for a user based on that data.

In some embodiments, the incentive offer search system can consider thematic, topical, or categorical relationships between a possible incentive reward and a location attribute to determine an appropriate incentive reward. For example, the incentive offer search system may query the location account associated with location 115 to determine that location 115 is a grocery store with organic strawberries on sale. The incentive offer search system may then determine that 100 servings of virtual strawberry shortcake in Zynga Café World is an appropriate incentive reward for performing a location-based action at location 115 based on the thematic relationship between and goods available at location 115 and the incentive reward.

In some embodiments, the incentive offer search system can consider details of the goods or services available at the location to determine an appropriate incentive reward to offer. This can include the type, price, quantity, quality, brand, size, description, and other details of the goods and services available at location 115. For example, the incentive reward for purchasing a toaster from a particular appliance store might be a virtual toaster in Zynga YoVille. In one embodiment, the incentive reward may improve based on the price of the item. For example, the incentive reward for a $50 boombox may be $5000 in virtual poker chips in Zynga Poker, but the incentive reward for a $1000 home stereo system may be $200,000 in virtual poker chips.

In some embodiments, the incentive offer search system can consider any brands, trademarks, logos, and other corporate or intellectual property information associated with the location to determine an appropriate incentive reward. For example, if location 115 is a Sears department store, the incentive offer search system may determine that a virtual item affixed with the Sears logo is an appropriate incentive reward for performing a location-based action at the location 115.

In some embodiments, the incentive offer search system can consider personal and demographic information of users of the location to determine an appropriate incentive reward. This can included the name, sex, race, ethnicity, age, income, education, employment status, address, credit information, purchase history, and other personal or demographic information of the users of the location. For example, if user 101 is female, the incentive offer search system may determine that a virtual Barbie doll in Zynga YoVille is an appropriate incentive reward for user 101 based on her sex.

In some embodiments, the incentive offer search system can consider the purchase history of goods and services at the location to determine an appropriate incentive reward. For example, if visitors to location 115 often buy fertilizer, the incentive offer search system may determine that five applications of fertilizer in Zynga FarmVille is an appropriate incentive reward for performing a location-based action at location 115, based on the purchase history there.

In some embodiments, the incentive offer search system can consider the location-based action history of players of one or more online games at the location to determine an appropriate incentive reward. This can include the type of location-based actions, proposed location-based actions, performed location-based actions, and other information regarding location-based actions associated with the location. For example, if some users often fail to perform a certain location-based action when offered an incentive reward of $10,000 in virtual poker chips in Zynga Poker, the incentive offer search system may determine an incentive reward of $30,000 in virtual poker chips is an appropriate incentive reward to incentivize performance of this location-based action.

In some embodiments, the incentive offer search system can consider the geographic information of the location to determine an appropriate incentive reward. This can include the position, elevation, size, orientation, GPS coordinates, relation to other locations, local terrain, weather, and other geographic information of the location. For example, if location 115 is near a beach, the incentive offer search system may determine that a virtual beach towel in Zynga Treasure Isle is an appropriate incentive reward for performing a location-based action at location 115.

In some embodiments, the incentive offer search system may generate an incentive reward that is unique to a location where a user performs a location-based action. For example, the user 101 may only receive an incentive reward for a first in-game asset when performing a location-based action in New England, and the user 101 may only receive an incentive reward for a second in-game asset when performing a location-based action in Wisconsin. Each incentive reward may be unique by country, region (e.g., four corners of the U.S.), state, city, or any area. In this way, the incentive offer search system may create an asymmetry in the availability of particular incentive rewards. In response, users may seek to expand their social networks such that they are able to obtain (e.g., through trading with other users) incentive rewards that would not otherwise be available to the users.

Figure 2B:
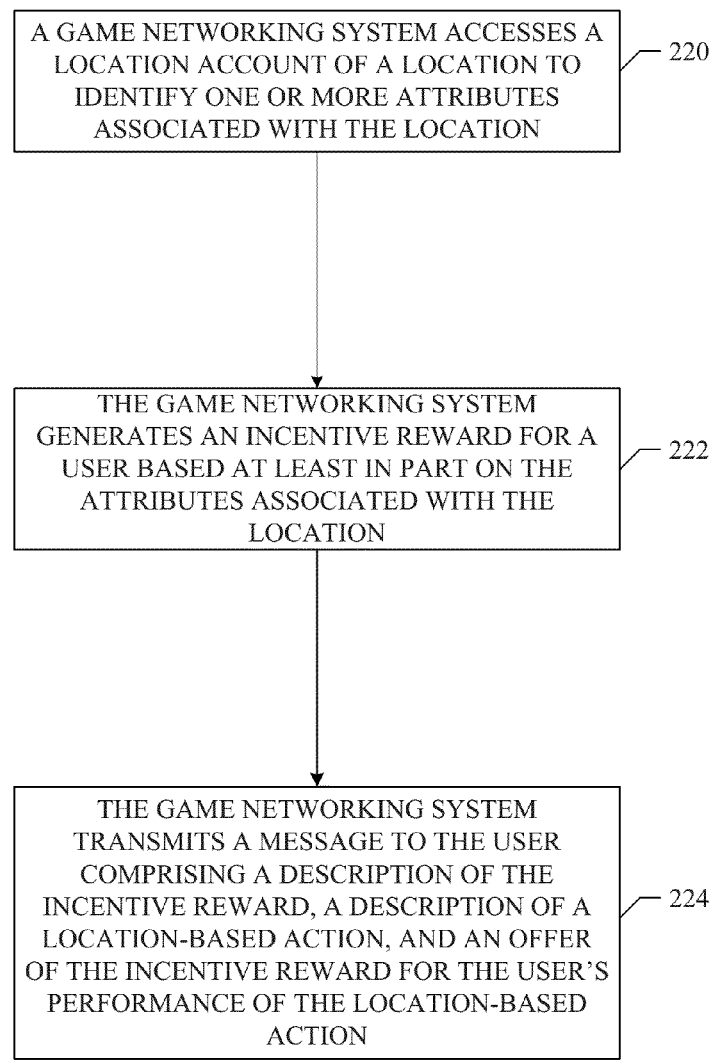
FIG. 2B shows a flowchart illustrating an example method for generating an incentive reward based on location attributes.

FIG. 2B shows a flowchart illustrating an example method 200B for generating an incentive reward based on location attributes. In various embodiments, game networking system 120b accesses a location account of location 115 to identify one or more attributes associated with location 115 at step 220. Game networking system 120b then generates an incentive reward for user 101 based at least in part on the attributes associated with location 115 at step 222. The game networking system 120b then transmits a message to the user 101 comprising a description of the incentive reward, a description of a location-based action, and an offer of the incentive reward for the user 101's performance of the location-based action at step 224. The example method illustrated in FIG. 2B and described above is provided for illustration purposes only and is not meant to be limiting. One of ordinary skill in the art would appreciate that the steps described above can be performed in any reasonable order, and that various steps can be reordered, added, and removed.

Determining Incentive Rewards Based on Other Factors

In various embodiments, the incentive offer search system can determine an appropriate incentive reward based on factors other than game state or location attributes.

In some embodiments, the incentive reward can be determined based in part on the location-based action generated by an action proposal search system (described in more detail below). For example, if the action proposal search system generates a location-based action for user 101 of buying a barbecue from a specific hardware store, the incentive offer search system may determine that a virtual super oven in Zynga Café World is an appropriate incentive reward based on the thematic relationship between the incentive reward and the location-based action. In another example, the incentive reward for purchasing a bottle of Coca-Cola from any location might be a virtual item affixed with a Coca-Cola logo.

In some embodiments, the incentive reward for performing a location-based action can vary over time. The incentive offer search system may generate multiple possible incentive rewards, wherein the actual reward received by the user 101 is based on when the location-based action is completed. For example, an incentive reward for purchasing a lawnmower at location 115 within the next hour may be $20,000 in virtual poker chips, but the incentive reward may decrease to only $10,000 in virtual poker chips if the lawnmower is purchased after the hour has ended. In one embodiment, the incentive reward may only be offered for a limited time. For example, an incentive reward of a virtual sports car might only be offered to the first one hundred users who purchase a toaster from location 115. In a variation of this embodiment, the incentive reward may become less attractive for subsequent purchasers. For example, the first user to purchase a toaster from location 115 will get a virtual Porsche 911, while later users will be offered virtual Ford Pintos. The incentive offer search system may present offers such that it is not apparent to the user of the gaming system whether he will get the better item or not. For example, user 101 might be presented with an offer that states, "Limited time offer! The first person to buy a toaster today will receive a virtual Porsche 911 in Zynga YoVille (subsequent buyers will receive a virtual Ford Pinto)." In this case, the user 101, viewing this offer, may not know whether he will be the first purchaser and may only find out after the item is purchased (e.g., when handed the receipt for the purchase).

In some embodiments, the incentive offer search system may generate an incentive reward that represents a number of times or a frequency with which a user completes a location-based action. For example, users may be offered a selection of in-game coffee cups based on the number of times the users purchase coffee at Starbucks each week (e.g., users with fewer coffee purchases would have a smaller selection of in-game coffee cups to choose from). The incentive reward may also depend on the number of times or a frequency with which the user completes the location-based action relative to the number of times or a frequency with which other users complete the location-based action. For example, a user 101, who purchases more cups of coffee from Starbucks than other users, may be offered an in-game coffee cup having a different visual characteristic (e.g., a different color, size, or shape) than the in-game coffee cups of other users.

In some embodiments, the incentive offer search system may ensure that some incentive rewards are offered more rarely than others. In this way, the incentive offer search system may create a demand for items that are offered more rarely, thereby incentivizing users to expand their social networks to include users who obtain items that are rare relative to other items. In some embodiments, the incentive offer search system may correlate the rarity of an incentive reward with a difficulty level of the location-based action that users must perform in exchange for the incentive reward. In some embodiments, the incentive offer search system may correlate the rarity of an amount of a financial return that an entity associated with the game networking system 120b may receive in exchange for users performing a location-based action that is necessary to receive the incentive reward.

In some embodiments, the incentive offer search system may generate an incentive reward in exchange for a user 101 obtaining a particular set of in-game assets. Each of the in-game assets of the set may, in turn, may be offered to users 101 as incentive rewards for completing location-based actions. Thus, the incentive offer search system may incentivize users 101 to complete a series of tasks to obtain a set of in-game assets.

In some embodiments, the incentive offer search system may generate an incentive reward that is a composite in-game asset, where each of a set of in-game assets corresponds to a component of the composite in-game asset. For example, the incentive reward may be an in-game food item (e.g., an in-game McDonald's Big Mac) and each of the set of in-game assets may be ingredients of the in-game food item (e.g., two all-beef patties, special sauce, lettuce, cheese, pickles, onion, and a sesame seed bun).

In some embodiments, the incentive offer search system may generate an incentive reward that is a limited-edition reward that is available only to users 101 that perform the location-based action during a particular time period or with respect to an event that occurs at the location. For example, the incentive offer search system may generate an incentive reward that is based on a user 101 performing a location-based action at (e.g., attending) a particular live event (e.g., a Grateful Dead or Kiss concert) at a location 115. Or the incentive offer search system may generate an incentive reward that offers the user 101 a percentage chance of receiving a shirt signed by the drummer of Def Leopard, where the percentage increases based on the number of friends the user 101 influences to attend a Def Leopard reunion concert.

In some embodiments, the incentive offer search system may generate an incentive reward that is non-transferrable. For example, the incentive offer search system may generate a non-transferrable reward (e.g., an in-game mountain climbing badge) to each user 101 that climbs a mountain (e.g., Mount Everest). Such non-transferrable rewards may correspond to personal achievements of the user with respect to a location 115.

In some embodiments, the incentive offer search system may generate an incentive reward that is based on a user 101 performing a first location-based action at a first location and a second location-based action at a second location (e.g., within a specific time period). For example, the incentive offer search system may generate an incentive reward based on a user checking in at a location in New York and a location in Los Angeles on the same day. In other words, the incentive offer search system may generate an incentive reward based on the user travelling between multiple locations. The incentive reward may correspond to the travelling between multiple locations (e.g., the incentive reward may be tied to the distance traveled, amount of time spent travelling, etc.). For example, the incentive reward may be in-game jet fuel based on a detection that the user is travelling between locations on an airplane. Or the incentive reward may be related to a path of travel between multiple locations. For example, the incentive reward for flying in an airplane over Chicago may be a virtual kielbasa.

In some embodiments, the incentive offer search system may generate an incentive reward that includes a consumable in-game asset. For example, the incentive offer search system may generate an incentive reward for a virtual orange that is based on the user 101 performing a location-based action (e.g., registering presence) at an orange orchard. The incentive offer search system may generate the incentive reward based on a consuming of a consumable in-game asset by a player character of the user 101. For example, the incentive offer search system may offer a virtual orange to the user 101 based on a player character of the user 101 having consumed a virtual orange or not having a virtual orange in his inventory. Or the incentive offer search system may not offer the virtual orange to the user if the player character has a virtual orange in his inventory that the player character has not yet consumed.

In some embodiments, the incentive offer search system may generate an incentive reward that is based on a positive or negative feeling users 101 have with respect to a location-based action, a type of location-based action, a location, or a type of location. For example, the incentive offer search system may determine levels of negative feelings (e.g., levels of boringness, hassle, or annoyance) associated with types of locations (e.g., a doctor's office, dentist's office, and so on) based on input from users. Then, when a user 101 performs a location-based action (e.g., sitting in a waiting room), the incentive offer search system may provide an incentive reward having a value that is correlated to the level of negative feeling (e.g., a level of boringness) of performing that location-based action. The incentive offer search system may also retrieve the levels of positive or negative feelings from a predetermined table containing correlations of the levels of positive or negative feelings with performing the location-based actions at the locations or types of locations. In this way, the incentive offer search system may generate an award that causes a user 101 to look forward to visiting a location that he may otherwise not be excited to visit.

In some embodiments, the incentive offer search system can generate an incentive reward that is only a percentage chance of receiving an in-game asset. For example, an incentive reward could be a specific percentage chance (e.g., 20%, 40%, 75%) to receive a particular in-game asset (e.g., a virtual Porsche 911). After the user 101 has earned the incentive reward, game networking system 120*b* could then determine if the user 101 actually receives the in-game asset.

In some embodiments, the incentive offer search system may generate an incentive reward for an unknown or undisclosed in-game asset. For example, the incentive offer search system may generate an incentive reward for a "mystery prize" for user 101 and present an offer that states "Purchase this item at location 115 now and receive a mystery prize in Zynga Dragon Wars!" The user 101 may not discover what the "mystery prize" is until the incentive reward is earned by performing an associated location-based action, or possibly even later (e.g., the next time the user 101 logs into game networking system 120*b*). In some embodiments, the incentive offer search system may present an offer that keeps a portion of the prize a mystery to be revealed when the user 101 performs a location-based action. For example, the offer may present a range of values corresponding to the reward, but not the actual value that the user 101 will receive. For example, the incentive offer search system may present an offer that states "Purchase this item at location 115 now and receive up to 100,000 poker chips in Zynga Poker!" Then, when the user 101 performs the location-based action, the incentive offer search system may reveal the value of the reward (e.g., "Congratulations! You received 5,000 poker chips in Zynga Poker! for purchasing this item at location 115!").

In some embodiments, the incentive offer search system may generate an incentive reward that incorporates an element of chance (e.g., a lottery ticket). For example, the incentive offer search system may generate an incentive reward for a 10% chance of receiving a free coffee at Starbucks. The percentage of chance may vary according to various criteria, such as an estimated value of the player's action with respect to an operator of the location. For example, the incentive offer search system may generate an incentive reward for a 20% chance of receiving a free coffee at Starbucks for registering presence at Starbucks and an incentive reward for 90% chance of receiving a free coffee at Starbucks for purchasing a coffee at Starbucks.

In some embodiments, the incentive offer search system may generate an incentive reward for a player or group of players based on a level of influence of the player or group of players. The game networking system 120*b* may determine a level of influence of a player or group of players in a variety of ways, as described below.

Generating Incentive Rewards to Motivate Groups of People

In some embodiments, the incentive offer search system may generate an incentive reward to motivate groups of people. For example, an incentive reward me be offered—either individually or collectively—to a group of people (e.g., two or more players of a computer-implemented game or a player of a computer-implemented game and one or more friends of the player of the computer-implemented game). For example, the incentive offer search system may generate an incentive reward that is to be offered to each of a group of people based on each one (or a particular number or percentage of) the group performing a location-based action.

In some embodiments, the incentive offer search system may generate an incentive reward that that includes counting a player's vote on a matter. The game networking system 120b may determine a matter for which an entity associated with a computer-implemented game (e.g., a sponsor of the computer-implemented game) seeks an opinion of the players in the form of a vote. The game networking system 120b may also receive input as to the possible voting options for the matter. The incentive offer search system may then enable the players to place their votes (e.g., select one of the voting options) on the matter by performing location-based actions. For example, the game networking system 120b may seek to determine whether players of a computer-implemented game prefer Peet's Coffee or Starbuck's Coffee. The incentive offer search system may then generate an incentive reward that includes counting the player's vote on the matter based on the player performing a location-based action (e.g., purchasing coffee) at a Peet's Coffee or Starbuck's establishment. In this way, players may "vote with their feet" on a matter that is relevant or important to the players of a computer-implemented game or an entity associated with the game networking system 120b (e.g., a sponsor of a computer-implemented game).

In some embodiments, the game networking system 120b may only count a player's vote while the player is performing a location-based action or for a specific (e.g., predetermined) time period during or after the player performs a location-based action. Thus, a result of a vote may change (e.g., in a capture-the-flag style) at any given time based on a number of people who are currently performing (or have recently performed) a location-based action. In some embodiments, the game networking system 120b may count the player's vote only while the player is performing a location-based action. In some embodiments, a player's vote may only be counted one time, regardless of how many times the user 101 performs an associated location-based action In some embodiments, a player's vote will be counted each time (or a particular number or percentage of times) a player performs a location-based action. In some embodiments, the game networking system 120b may limit a number of votes a player may place regarding a matter to a maximum number.

In some embodiments, the game networking system 120b may count a lack of performance by a player of a location-based action as an affirmative vote against a voting option corresponding to the location-based action. For example, if a player does not purchase a coffee at Starbuck's within a certain time period, the game networking system 120b may count the player's non-action as a vote against Starbuck's on a matter such as which coffee chain is a favorite of players of a computer-implemented game. Or the game networking system 120b may count a performance by a player of an opposite location-based action as an affirmative vote against a voting option corresponding to the location-based action. For example, if a player can vote in favor of Starbuck's as a favorite coffee establishment by registering presence at Starbuck's, but the player instead registers presence at Peet's Coffee, the game networking system 120b may register the player's action as a vote against Starbuck's on a matter such as a favorite coffee establishment of players of a computer-implemented game.

In some embodiments, the game networking system 120b may use the result of a vote to determine a next event in a computer-implemented game For example, if a vote shows that a majority of players of the computer-implemented game prefer Starbuck's over Peet's Coffee, then player characters of the players may receive virtual items bearing a Starbuck's logo. Or the vote may pertain to a rule of the computer-implemented game and the game networking system 120b may change the rule based on the result of the vote.

In some embodiments, the game networking system 120b may expose its functionality to one or more third parties to, for example, enable a third party to conduct market research. For example, the game networking system 120b may expose its functionality for collecting votes from players such that a third party can conduct market research based on input from the players For example, a third-party market research company may wish to determine whether players of a computer-implemented game prefer a blended coffee product from Starbuck's or a blended coffee product from Peet's Coffee. The game networking system 120b may enable the market research company to access its voting functionality (e.g., via an Application Programming Interface (API)) to specify a matter on which the players are to vote, specify the various voting options, or specify a location-based action that each player is to perform in order to register their votes. The market research company may formulate multiple matters, each with multiple voting options, thus using the game networking system 120b to present a marketing survey to the players. Additionally, the game networking system 120b may enable the market research company to specify various configuration options related to the voting functionality, such as how long players must remain present at the location of the location based action for their votes to count, whether the players can register multiple votes, and whether the players can vote affirmatively against a voting option by performing an additional location-based action (e.g., a location-based action that is opposite to a location-based action that is required for a player to register a vote for a voting option). The game networking system 120b may expose its functionality based on a contract (e.g., a financial contract) between an entity operating the game networking system 120b and the third-party market research company.

In some embodiments, the incentive offer search system may generate an incentive reward based on levels of influence. For example, the incentive offer search system may generate an incentive reward for a player of a computer-implemented game based on how much influence the player has over his in-game or out-of-game friends. Or the incentive offer search system may generate an incentive reward for a player based on the player's effectiveness at exercising influence over his friends to perform a location-based action For example, the incentive offer search system may offer an incentive reward that varies based on how many of the player's friends perform a location-based action at the player's request.

In some embodiments, the incentive offer search system may generate an incentive reward based on the types of people a player influences. For example, the incentive offer search system may generate an incentive reward for a player that is to be provided to the player based on the player influencing people having a certain level of attractiveness to register presence at a location (e.g., a bar or night club). The game networking system 120b may determine a level of attractiveness of the people that the player influences in various ways. For example, the game networking system 120b may receive input from other players present at the location regarding the level of attractiveness of the people that the player was able to influence to register their presence at the location. Or the game networking system 120b may perform a real-time validation of the attractiveness of the people (e.g., via a crowd-sourcing platform). As another example, the incentive offer search system may generate an incentive reward for a player that is to be provided to the player based on the player influencing people having a particular gender or a particular level of style to perform a location-based action.

The game networking system 120b may rank input received from other players based on reliability of past inputs by the other players For example, if a player's input has been particularly unreliable in the past (e.g., based on feedback received from other players), the player's input may be given a lower weighting relative to players who have given more reliable input. This weighting of input from players may be applied to all forms of input received from the players (e.g., votes, feedback, etc.). For example, if a player provides input to the game networking system 120b regarding the attractiveness of people that an additional player influences to perform a location-based action, the game networking system 120b may give the player's input a weighting corresponding the estimated reliability of the player's input. The game networking system 120b may estimate the attractiveness of the people based on an aggregation of weighted inputs received from multiple players.

The incentive offer search system may generate an incentive reward for a player based on the player influencing a number of friends to perform a location-based action. For example, the incentive offer search system may identify that an operator of a location is offering an incentive reward in exchange for a player influencing five friends to register their presence at the location. The incentive offer search system may also generate incentive rewards for each of the people that the player influences. In this way, the incentive offer search system may generate rewards cascading down to multiple people, encouraging flash sales at a location. Each of the incentive rewards may be unique to the person to whom it is offered (e.g., based on profile information retrieved about the person from a social networking system 120c). Or some of the incentive rewards may be the same as other incentive rewards offered to other people. For example, the player influencing his friends may receive a different incentive reward than the friends he influences; or, particular sets of friends of the player (e.g., the first set of friends to be influenced by the player) may receive different incentive rewards than other sets of friends. In some embodiments, the incentive reward may generate an incentive reward for a group (or cohort) of people based on the cohort influencing any combination of individual people or other cohorts of people to perform the location-based action. Individuals or cohorts may be related to a game executing on the game networking system 120b (e.g., players of the game) or unrelated to the game (e.g., a church group). The incentive reward may include a first sub-reward to be provided to a player or cohort based on the player or cohort asking an additional player or an additional cohort to perform the location-based action and a second sub-reward to be provided to the player or the cohort based on the number of completions of the location-based action by the additional player or additional cohort.

The incentive offer search system may generate an incentive reward for a player based on the player influencing a number of other people to perform a location-based action at a particular location based on input from an operator of the particular location. For example, if Starbucks is experiencing a slow-down in sales at particular physical Starbucks locations in the mid-western United States, an operator of the Starbucks may interface with the incentive offer search system to request generation of an incentive reward that rewards players or groups of players for influencing people to perform a location-based action at physical Starbucks locations in the mid-western United States.

The incentive offer search system may generate an incentive reward that is time constrained. For example, an incentive offer search system may generate an incentive reward that offers a player a 30% discount on items sold at a location based on the player attracting a particular number of friends to the location. The 30% discount may be offered in a first hour. In a second hour, the 30% discount may be reduced to a 20% discount. In future hours, the discount may either be reduced further or increased (e.g., based on the player influencing an additional number of people to perform a location-based action within an additional time period).

In some embodiments, the incentive offer search system may generate an incentive reward based on information collected from a social networking system about players to whom the incentive reward is to be offered. For example, the incentive offer search system may generate an incentive reward that is to be offered to players that have more than a threshold number of friends on the social networking system. Or the incentive offer search system may generate an incentive reward that has a value that corresponds to the number of friends of the player on the social networking system 120c. For example, the incentive offer search system may offer an incentive reward of X virtual gold coins, where X is equal to the number of friends the player has on Facebook.

In some embodiments, the incentive offer search system may generate an incentive reward based on input received from an operator at the location 115 or based on an identification of an incentive reward offered by the operator made independently of any input received from the operator.

Reflecting a Location-Based Action in a Game Independently of an Offer of an Incentive Reward In some embodiments, a location-based action may be reflected in a computer-implemented game independently of an offer of an incentive reward. For example, a real-world blending system may automatically change an attribute of an in-game item (e.g., a color of a coffee cup) based on the number of times or a frequency with which a user 101 completes a location-based action (e.g., purchases coffee at Starbucks). Or the real-world blending system may enable a feature of a computer-implemented game based on a performance of a location-based action by the user 101. For example, the real-world blending system may enable or disable trading of in-game assets between a first user and a second user based on a performance of a location-based action by the first user or the second user. Or the real-world blending system may enable communication between multiple players of a computer-implemented game (e.g., enabling a first player to convey a hint to a second player regarding how the second player may advance within the game) based on the multiple players performing a location-based action at a location. Or the real-world blending system may enable multiple players to advance within the game based on each of the multiple players performing one or more location-based actions (e.g., registering presence at a logical Starbucks location within a specific time frame and then successively purchasing a cup of coffee). Or the real-world blending system may automatically provide a user 101 with an in-game coffee cup having a Starbucks logo based on a detecting that the user 101 performed the location-based action of making a purchase at Starbucks.

The real-world blending system may associate a location-based action with an in-game action. For example, the real-world blending system may detect that user 101 has come into physical proximity of or handled a real-world item at a location 115 (e.g., based on a scanning of a product code, such as a Universal Product Code (UPC) by the user 101). The real-world blending system may then reflect the action of the user 101 in the computer-implemented game by providing a player character of the user 101 with an in-game item corresponding to the scanned real-world item. Or the real-world blending system may represent the action of the scanning of the item by the user 101 by using the player character of the user 101 to shoplift an in-game item from an in-game store corresponding to the location 115 at which the user 101 scanned the item. In other words, the real-world blending system may correlate location-based actions with in-game actions by player characters. Such in-game actions may be analogous or representative of the location-based action.

In some embodiments, the incentive offer search system may generate an incentive reward that relates to an activity that is performed at the location 115 or is otherwise related to a location or type of location. For example, the incentive reward may include unlocking health points within a computer-implemented game based on user 101 performing a location-based action at a doctor's office. Or the incentive reward may include repairing an in-game asset based on the user 101 performing a location-based action at a repair shop. In this way, the incentive offer search system may generate rewards that make user 101's mundane tasks meaningful within a computer-implemented game (and thus more fun).

The real-world blending system may perform operations independently of whether the user 101 has been offered an incentive reward for performing a location-based action.

Location-Based Actions

A location-based action is a type of action that can be performed at location 115 by user 101 of an online game hosted by game networking system 120b. The location-based action may be proposed to the user 101 as part of an offer for an incentive reward. A location-based action could be, for example, entering, visiting, using, purchasing, or performing some other action at location 115. Although many of the examples below are described in terms of a single location-based action, it is contemplated that a location-based action may include one or more sub-actions or steps (e.g., a series of sub-action or steps) or may itself be a sub-action or step of a plurality of location-based actions. Thus, a location-based action may be an aggregation of other location-based actions. Each of one or more location-based actions of an aggregation of location-based actions may be associated with an incentive reward. Additionally, a location-based action that is an aggregation of additional location-based actions may itself be associated with an incentive reward.

Action Proposal Search Systems

In various embodiments, game networking system 120b can include an action proposal search system, which is a network-addressable computing system that is operative to generate and/or select a location-based action in response to a request from another computing system, such as location networking system 120a, game networking system 120b, or client system 130. The action proposal search system may be a central system accessible to one or more systems over a wide area network, or a local system accessible to a single domain. The present disclosure assumes the action proposal search system is a subsystem of game networking system 120b; however, it is possible that the action proposal search system is part of location networking system 120a or even an independent remote system.

In one embodiment, the action proposal search system includes one or more physical servers and an action proposal data store. The action proposal data store can store content information containing action proposal creative content and URLs or identifiers to content or other resources hosted by game networking system 120b or location networking system 120a. The content may be stored in association with game account information or location account information on game networking system 120b.

In various embodiments, the action proposal search system determines an appropriate location-based action to propose to user 101 in exchange for one or more incentive rewards. The location-based action can be determined by a variety of methods (e.g., statically, randomly, dynamically, etc.).

In some embodiments, the location-based action can be determined statically, such that the location-based action offered is the same for all users. For example, the action proposal search system may propose that user 101 purchase a cup of coffee at location 115 in exchange for an incentive reward of $100 in virtual cash, and this same location-based action would be proposed to all other users.

In some embodiments, the location-based action can be determined dynamically, such that the location-based action proposed may vary based on a variety of factors. For example, the location-based action can be determined based on location attributes, game state, or other parameters.

Determining Location-Based Actions Based on Game State

In various embodiments, the action proposal search system can determine an appropriate location-based action based on game state data on game networking system 120b. The action proposal search system can access the user 101's game account to retrieve various game state data (e.g., the games played by the user 101, the user 101's player character state) and then identify a location-based action appropriate for user 101 based on that data.

In some embodiments, the action proposal search system can consider thematic, topical, or categorical relationships between a possible location-based action and a game state variable to determine an appropriate location-based action. For example, the action proposal search system may query game networking system 120b to determine that user 101 is a player in Zynga FarmVille and that user 101's player character has a virtual barn. The action proposal search system may then determine that visiting a particular barn at the Sonoma County Fair is an appropriate location-based action for the user 101 based on the thematic relationship between user 101's virtual barn and the proposed location.

In some embodiments, the action proposal search system can consider player character state, such as in-game assets and other attributes of a player character, to determine an appropriate location-based action. For example, if user 101 has $25,000 in virtual poker chips in Zynga Poker, the action proposal search system may determine that playing a hand of real poker in Las Vegas at a $10 limit table is appropriate, but if user 101 has $100,000 in virtual poker chips, playing five hands of real poker at a $50 limit table may be determined appropriate based on user 101's current in-game assets. In another example, if user 101 has a virtual barn with no virtual chickens in it in Zynga FarmVille, the action proposal search system may determine that visiting the chicken coop at the Sonoma County Fair is an appropriate location-based action for user 101 based on his current in-game assets.

In some embodiments, where user 101 plays more than one game hosted by game networking system 120b, the action proposal search system can generate location-based actions corresponding to one or more of the games. Game networking system 120b can host a plurality of online games, and user 101 may play one or more of these games and control one or more player characters in each game. If the user 101 plays more than one game on game networking system 120b, the action proposal search system may generate a location-based action corresponding to one or more of these games. The action proposal search system can determine which games to generate location-based actions for by examining the user 101's game account information with respect to each game and analyzing a variety of factors (e.g., the user 101's frequency of play, duration of play, play preferences, social network information). For example, the action proposal search system may determine that buying a cup of coffee from a specific café is an appropriate location-based action to receive an incentive reward in Zynga Café World. In another example, the action proposal search system may determine that donating $10 to an animal cruelty charity is an appropriate location-based action to receive an incentive reward in Zynga FarmVille.

In an example embodiment, the action proposal search system may generate location-based actions corresponding to a game, such as a game in which players have a goal of attacking and defending turf (e.g., a location (e.g., location 115) or set of locations) by performing location-based actions. For example, players may start turf wars to become the boss of a location (e.g., a business establishment). To win a turf war, players may need to enlist their in-game or out-of-game friends (e.g., "mob," "mafia," or group), encouraging them to perform additional location-based actions. Based on their ability to influence other players in group, or based on their performance of location-based actions to assist other players in their group, players may expand their turf collectively or individually. A turf may include multiple locations or one or more regions, such as a street, block, city, state, and so on. An example embodiment of a game in which players attack and defend turf is the Turf Wars game, which is described in more detail with respect to FIGS. 6A-6L.

Figure 2C:
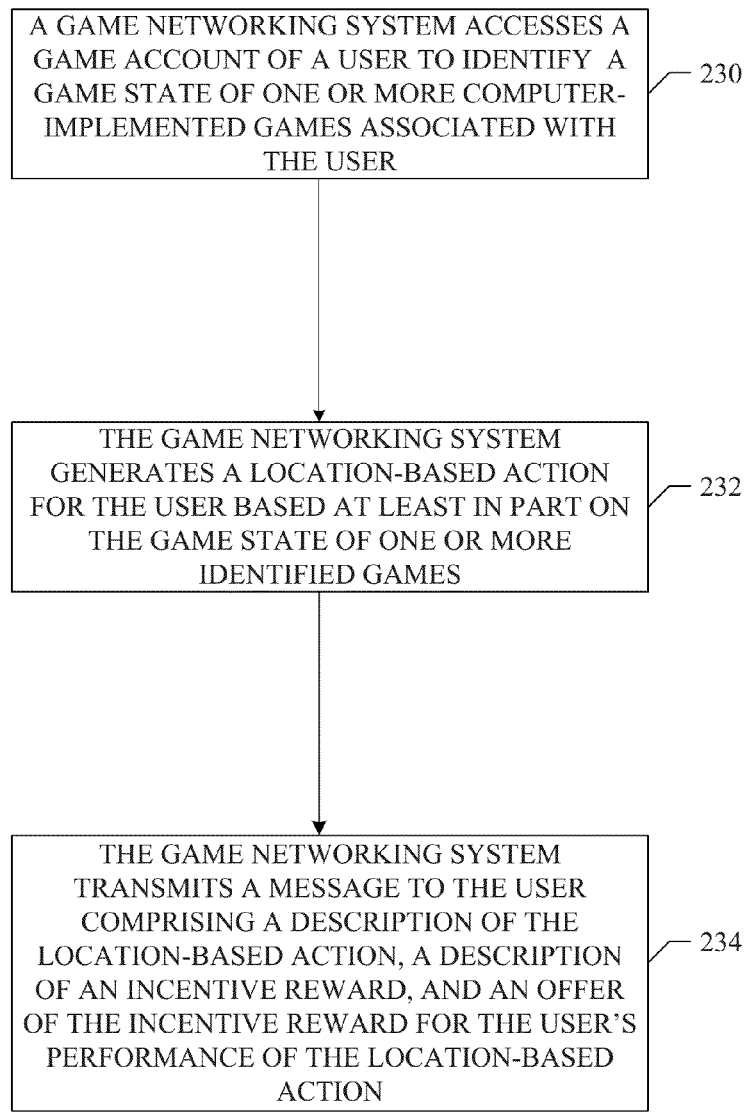
FIG. 2C shows a flowchart illustrating an example method for generating a location-based action based on game state.

FIG. 2C shows a flowchart illustrating an example method 200C for generating a location-based action based on a game state. In various embodiments, game networking system 120b accesses a game account of user 101 to identify one or more computer-implemented games associated with the user 101 at step 230. Game networking system 120b then generates a location-based action for the user 101 based at least in part on the game state of the one or more identified games at step 232. Game networking system 120b then transmits a message to the user 101 comprising a description of the location-based action, a description of an incentive reward, and an offer of the incentive reward for the user 101's performance of the location-based action at step 234.

Determining Location-Based Actions Based on Location Attributes

In various embodiments, the action proposal search system can determine an appropriate location-based action based on location attribute data. The location attributes of location 115 can be stored in a location account, which can be stored and accessed on any suitable computing system, including location networking system 120a, game networking system 120b, a third-party system, a distributed computing system, or any combination of two or more of the above. The action proposal search system can access location 115's location account to retrieve various location attribute data (e.g., the goods and services available at the location 115, personal and demographic information of users of the location 115, etc.) and then identify a location-based action appropriate for user 101 based on that data.

In some embodiments, the action proposal search system can consider thematic, topical, or categorical relationships between a possible location-based action and a location attribute to determine an appropriate location-based action. For example, the action proposal search system may query the location account associated with location 115 to determine that location 115 is a grocery store with organic strawberries on sale. The incentive offer search system may then determine that buying a basket of organic strawberries is an appropriate location-based action to perform at location 115 based on the categorical relationship between the goods available at location 115 and the location-based action.

In some embodiments, the action proposal search system can consider details of the goods or services available at the location to determine an appropriate location-based action. This can include the type, price, quantity, quality, brand, size, description, and other details of the goods and services available at the location. For example, if location 115 is an amusement park, the action proposal search system may determine that riding a specific roller coaster is an appropriate location-based action based on the type of services available there. In particular embodiments, the action proposal search system can generate a location-based action to incentivize the purchase of particular goods or services, such as buying items that are on sale or items the location operator wants to clear from inventory. The location operator can provide preferences for the items that it wants associated with location-based offers, or the action proposal search system can query the location account and analyze the location's current inventory to dynamically determine an appropriate item. For example, if location 115 is an ice cream shop with an over-supply of vanilla ice cream, the action proposal search system may determine that purchasing a scoop of vanilla ice cream at location 115 is an appropriate location-based action based on the inventory of goods available there.

In some embodiments, the action proposal search system can consider any brands, trademarks, logos, and other corporate or intellectual property information associated with the location to determine an appropriate location-based action. For example, if the operator of location 115 has a patent on a certain method, the action proposal search system may determine that performing that patented method is an appropriate location-based action.

In some embodiments, the action proposal search system can consider personal and demographic information of users of the location to determine an appropriate location-based action. This can include the name, sex, race, ethnicity, age, income, education, employment status, address, credit information, purchase history, and other personal or demographic information of the users of the location. For example, if a user 101 of location 115 is a mechanical engineer, the action proposal search system may determine that purchasing a textbook on thermodynamics at location 115 is an appropriate location-based action based on the user 101's employment information. In another example, if user 101 has never purchased a sandwich from location 115, the action proposal search system may determine that purchasing a sandwich from location 115 is an appropriate location-based action for user 101 based on his purchase history. In yet another example, if user 101 is 18-years old, the action proposal search system may propose to the user 101 to purchase a can of soda, but if user 101 is 22-years old, the action proposal search system may propose to the user 101 to purchase a bottle of scotch.

In some embodiments, the action proposal search system can consider the purchase history of goods and services at the location to determine an appropriate location-based action. For example, if visitors to location 115 rarely buy a particular item, the action proposal search system may determine that purchasing that item at location 115 is an appropriate location-based action based on the purchase history of that item, wherein the location-based action is selected to incentivize purchase of that item.

In some embodiments, the action proposal search system can consider the location-based action history of players of one or more online games at the location to determine an appropriate location-based action. This can include the type of location-based actions, proposed location-based actions, performed location-based actions, and other information regarding location-based actions associated with the location. For example, if a small fraction of users perform a certain location-based action, such as playing at a high-stakes poker table at a particular casino, the action proposal search system may determine that an easier version of that location-based action is an appropriate location-based action, such as playing at a lower-stakes poker table. In another example, if user 101 has never visited Bozo's Amusement Park, the action proposal search system can propose that user 101 purchase a summer pass. If user 101 has already visited Bozo's Amusement Park, and it had already been proposed to user 101 to purchase a summer pass, the action proposal search system can propose that user 101 purchase cotton candy inside the park. In a particular embodiment, the action proposal search system can determine a location-based action based on any previous actions that have been proposed to the user 101 based on locations besides the one that is currently specified. For example, if the action proposal search system had previously proposed that the user 101 buy a grill at a general store, the action proposal search system could then propose that the user 101 purchase steaks or hotdogs at a supermarket.

In some embodiments, the action proposal search system can consider the geographic information of the location to determine an appropriate location-based action. This can include the position, elevation, size, orientation, GPS coordinates, relation to other locations, local terrain, weather, and other geographic information of the location. For example, if location 115 is a store that sells bread and the store is near a duck pond, the action proposal search system may determine that purchasing bread and feeding the ducks is an appropriate location-based action based on the geographic information of location 115. In one embodiment, the action proposal search system can determine a location-based action based on the local terrain. For example, if location 115 is near a beach, the action proposal search system may determine that purchasing a swimsuit from location 115 is an appropriate location-based action based on the proximity of the location 115 to the beach. In another embodiment, the action proposal search system can consider the current weather at the location 115. For example, if the current temperature at an amusement park is 90° F., the action proposal search system may determine that riding a water slide at the park is an appropriate location-based action based on the current weather there. In yet another embodiment, the action proposal search system can consider the historical weather at the location 115. For example, if the daytime temperature outside location 115 is typically 50 OF in the winter, the action proposal search system may determine that purchasing a sweatshirt at location 115 in the winter is an appropriate location-based action based on the historical weather there.

Figure 2D:
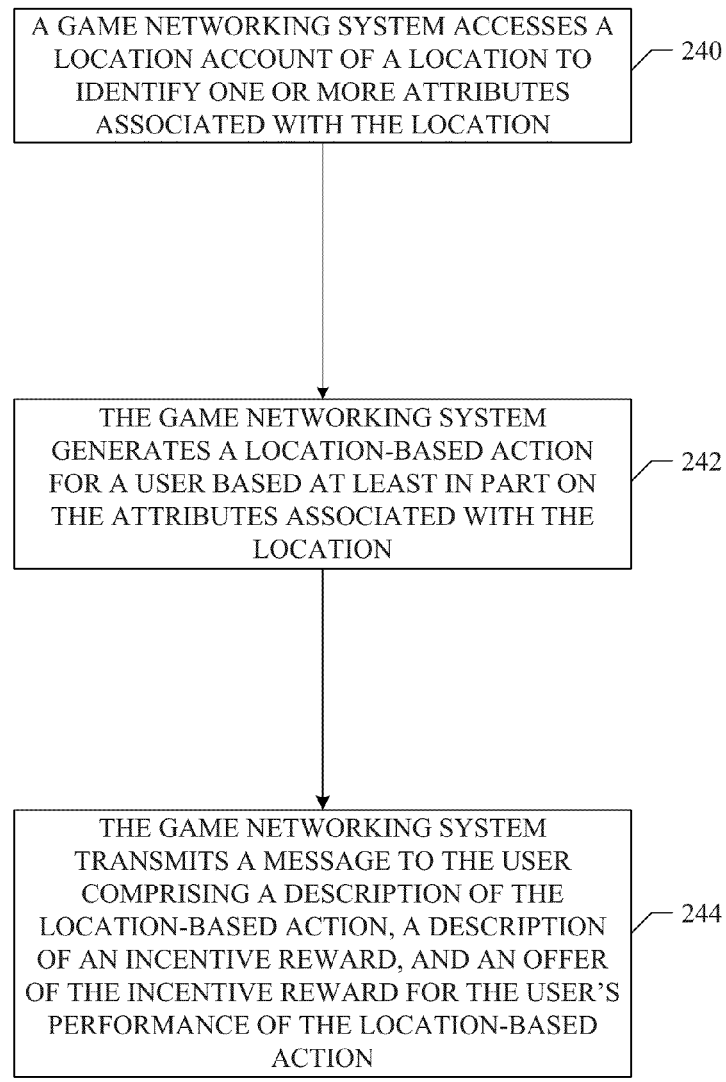
FIG. 2D shows a flowchart illustrating an example method for generating a location-based action based on location attributes.

FIG. 2D shows a flowchart illustrating an example method 200D for generating a location-based action based on location attributes. In various embodiments, game networking system 120*b* accesses a location account of location 115 to identify one or more attributes associated with location 115 at step 240. Game networking system 120*b* then generates a location-based action for a user 101 based at least in part on the attributes associated with location 115 at step 242. Game networking system 120*b* then transmits a message to the user 101 comprising a description of the location-based action, a description of an incentive reward, and an offer of the incentive reward for the user 101's performance of the location-based action at step 244. The example method illustrated in FIG. 2D and described above is provided for illustration purposes only and is not meant to be limiting. One of ordinary skill in the art would appreciate that the steps described above can be performed in any reasonable order, and that various steps can be reordered, added, and removed.

Determining Location-Based Actions Based on Other Factors

In various embodiments, the action proposal search system can determine an appropriate location-based action based on factors other than game state or location attributes.

In some embodiments, the location-based action can be determined based in part on the incentive reward generated by the incentive offer search system. For example, if the incentive offer search system generates a virtual ice cream machine as an incentive reward for user 101, the action proposal search system may determine that buying a quart of premium ice cream from a specific grocery store is an appropriate location-based action based on the thematic relationship between the incentive reward and the location-based action.

In some embodiments, the incentive reward for performing a location-based action can vary over time. The action proposal search system may generate multiple possible location-based actions, wherein the location-based action the user 101 has to perform to receive an incentive reward is based on when the location-based action is completed. For example, the action proposal search system may determine that swimming 10 laps at a particular swimming pool is an appropriate location-based action in the summer, but may determine that visiting an ice rink is an appropriate location-based action in the winter. In another example, the difficulty of the location-based action may vary over time. User 101 may have to swim 10 laps in a swimming pool if the location-based action is performed within two hours of being generated by the action proposal search system, but after two hours, user 101 may have to swim 50 laps.

In some embodiments, the incentive reward may be based in part on participation (e.g., an attendance) of a user 101 at an event (e.g., a concert, like a Grateful Dead or Kiss concert) that is held at a location. For example, the action-proposal search system may generate multiple location-based actions corresponding to events the action-based proposal search system determines are scheduled to occur at a certain venue over a period of time.

In some embodiments, the action-proposal search system may determine a location-based action based on achievements associated with a location. For example, the action-proposal search system may determine that an achievement associated with the Himalayas is climbing Mount Everest. Thus, the user 101 may be offered an incentive reward (e.g., a non-transferrable in-game mountain climbing badge) for climbing Mount Everest. Or the action proposal search system may determine that an achievement associated with "Big Burger" restaurant is eating a five-pound burger. Thus, the user 101 may be offered an incentive reward for eating the five-pound burger at Big Burger.

In some embodiments, the action proposal search system may consider user state, such as out-of-game assets and other attributes of user 101, to determine an appropriate location-based action. For example, the action proposal search system may consider whether the user 101 owns or has in his possession a real-world item that is associated with a virtual item of a computer-implemented game. For example, if the game networking system 120*b* detects that the user 101 has in his possession a real-world item that corresponds to a virtual item of a virtual world of a computer-implemented game (e.g., an arrow that corresponds to a virtual arrow provided to a player character of the user 101), the action proposal search system may determine that an appropriate location-based action is to bring the virtual item into physical proximity (e.g., within a few feet) of an additional real-world item at the location that corresponds to an additional virtual item (e.g., a bow that corresponds to a virtual bow provided to a player character of an additional user of the game).

The action proposal search system may generate location-based actions involving any combination of users, virtual items, or locations. Thus, the action-proposal system may generate location-based actions for each of multiple users to bring any of a set of multiple items to five Starbucks and three record stores in four particular cities.

The game networking system 120b may be configured to detect the location of real-world items in various ways. For example, to detect a location of a real world-item, the game networking system 120b may be configured to detect a presence of the real-world item on a network. For example, a real-world item may be integrated with a lithium polymer battery having an embedded Bluetooth chip, such that the real-world item is uniquely serialized and detectable on the network. Such automatically-detectable real-world items may be offered as incentive rewards to users. For example, the incentive offer search system may determine that an appropriate incentive reward for user 101 performing a location-based action is to provide the user 101 with a real-world plastic ring that represents a virtual ring of a player character of the user 101. As another example, the game networking system 120b may detect the presence of a real-world item at a location based on input from one or more users present at the location.

Features of a real-world item with respect to a computer-implemented game may be locked and unlocked in a secure manner (e.g., using a password communicated to the user over an out-of-band communication channel, such as a foil or scratch-off serial number on a card provided with the real-world item) such that only authorized users may activate or use the real-world item with respect to the game. For example, by using the password, a user of the real-world item may bind the real-world item to a device (e.g., an iPhone or a computer), such that the features of the real-world item are enabled with respect to the game only when the user is accessing the device to which the real-world item is bound. Thus, if a player binds a set of playing cards (that are linked to the computer-implemented game via a wireless device) to his iPhone, and those playing cards are later stolen, the thief of those playing cards will be unable to use them with respect to the game unless he also has access to the user's iPhone.

The locking or unlocking of a real-world item with respect to a computer-implemented game may also enable a user to give, trade, or sell the real-world item in a marketplace. For example, upon acquiring a real-world item that is linked to a computer-implemented game, the provider of the real-world item may provide the receiver of the real-world item with a password necessary to unlock the features of the real-world item with respect to the computer-implemented game. The game networking system 120b may then perform verification of the sale (e.g., prompt the provider to confirm that he did in fact intend to provide the real-world item to the receiver). The game networking system 120b may also charge a fee (e.g., to the provider, receiver, or both) to unlock the features of the virtual item with respect to the game after the real-world item is exchanged. In this way, the game networking system 120b may control or prevent gray- or black-market exchanging of real-world items that are linked to a computer-implemented game.

The exchanging of real-world items linked to a computer-implemented game may include leasing, lending, temporary trading, or temporary swapping of virtual items.

A device (e.g., a wireless Bluetooth or radio-frequency identification (RFID) device) integrated into the real-world item may communicate a unique identifier (e.g., its Media Access Control (MAC) address or service set identifier (SSID)) such that the real-world item is uniquely identifiable to the game networking system 120b.

A device may be integrated into the real-world item that includes sensors for motion detection, motion tracking, motion acceleration, elevation, magnetic fields, and so on, such that the game networking system 120b is able to obtain from the device (e.g., via communication with the device) information in addition to GPS information regarding the location of the real-world item For example, the device may have a capability to determine its position relative to an ad hoc collection of other items containing similar devices at a location. Thus, in various embodiments, the game networking system 120b may obtain finer-grained information about the movement of a virtual item at a location than it may obtain from a GPS device integrated into the item. For example, the game networking system 120b may be able to determine from an accelerometer or similar device integrated into a real-world item a velocity or degree of force used by a player when moving the item. The game networking system 120b may communicate with one or more devices integrated into real-world items at a location to obtain information collected by the various devices and then communicate that information back to the devices such that players at a location may be informed (e.g., via a client user interface executing on the device) of other real-world items that are nearby or relevant to a computer-implemented game. The game networking system 120b may incorporate information about the real-world items into its systems, such as the action proposal system (e.g., to propose location-based actions involving multiple real-world items at a location).

An item association system may associate a real-world item (e.g., a client device, such as an iPhone, that is in the user's possession) with a virtual item, such that the real-world item becomes representative of the virtual item. For example, the item association system may associate a user 101's iPhone with a virtual sword of a player character of the user 101. The user 101 may request such an association or the item association system may establish such an association as part of the gameplay of a computer-implemented game. The incentive offer search system may determine that an appropriate incentive reward is to offer an association between a virtual item and a real-world item. For example, the incentive offer search system may determine that an appropriate reward for performing a location-based action is to associate the iPhone with a sword of a player character of the user 101. Or the action proposal search system may use such associations to determine appropriate location-based actions.

For example, if the user 101 has a real-world item representing a virtual sword, the action proposal search system may determine that an appropriate location-based action is to swing the real-world item toward another user present at the location 115. The game networking system 120b may, based on a detecting of the performing of the location-based action by the player, reflect the performing of the location-based action within a virtual world of a computer-implemented game. For example, if the game networking system 120b detects that user 101 performed a swinging of a real-world item representing a virtual sword of a player character of the user 101 toward an additional user at the same location 115, the game networking system 120b may weaken a player character of the additional user within a virtual world of a computer-implemented game.

As another example, if a real-world item representing a virtual item is capable of giving a player character of user 101 a special ability or power within a computer-implemented game (e.g., if the real-world item represents a virtual ring that prevents crops of the player character from withering within the computer-implemented game), the action proposal system may determine that an appropriate location-based action is for the user 101 to come within a certain physical distance (e.g., within a few feet) of the virtual item. Additionally, the incentive offer search system may determine that an appropriate reward for performing a location-based action is to provide the player character of the user 101 with the special ability or power of the virtual item. The incentive offer search system may provide the player character of the user 101 with the special ability or power while the user 101 is within a predetermined physical distance. The incentive offer search system may provide the player character of the user 101 with the special ability or power for a predetermined amount of time after the user 101 has come within the predetermined physical distance. In various embodiments, for virtual items that are unique within a game, the corresponding real-world item may be assigned a unique identifier (e.g., a code or logo) to establish a corresponding uniqueness of the real-world item.

As another example, if the real-world items represent virtual items that are combinable within a virtual world of a computer-implemented game (e.g., a real-world item that represents a weapon and a real-world item that represents ammunition for the weapon), the action proposal search system may determine that an appropriate location-based action is to bring the virtual items within a certain physical proximity of one another (e.g., within a few feet or inches), perform a "bumping" of the items or to scan one item with the other (e.g., via infrared scanning).

The incentive offer search system may select incentive rewards based on particular areas within a location that an operator of the location wants users to visit. For example, if an operator of a supermarket wants users to visit particular areas within the supermarket (e.g., places where special deals are being offered), the operator may request that the item association system establishes associations between real-world items (e.g., products) at specified areas of the supermarket and virtual items that bestow special abilities or powers on player characters of users who come within a predetermined distance of the real-world items. Thus, users will have an incentive to visit the particular areas within the location 115.

Furthermore, the incentive offer search system may select incentive rewards based on users' social networks. For example, if the game networking system 120*b* detects that multiple users of a computer-implemented game at a location have real-world items in their possession that represent virtual items that are combinable within a virtual world of a computer-implemented game, the action proposal search system may determine that an appropriate location-based action is for the users to come within a certain distance of each other at the location. Or the incentive offer search system may determine that an incentive reward for the users for coming within a certain distance of each other at the location is an in-game asset or other benefit relating to the combination of the virtual items represented by the real world items. For example, if each user has a real-world item corresponding to an ingredient of a virtual potion, the incentive offer search system may determine that an appropriate reward for users performing the location-based action of bringing the real-world items into close physical proximity to one another is to provide each of the player characters of the users with an instance of the virtual potion. Thus, the incentive offer search system may encourage users to expand their social networks by engaging with other users (e.g., users that are present at the same location at the same time) in location-based actions.

Or the action proposal search system may determine that an appropriate location-based action is for the users to introduce themselves to one another in the real-world based on detecting that the users are players of a computer-implemented game. Such a location-based action may be independent of any real-world items that the users own or possess. In some embodiments, the action proposal search system may determine that an appropriate location-based action is for a player to add other players (e.g., other players who are present at the same location as the player (e.g., within a predetermined time frame)) as friends with respect to his in-game or out-of-game social network. In this way, the action proposal search system may encourage players to increase the size of their social networks, which, in turn, may increase the players' level of influence over other people.

The game networking system 120*b* may determine an appropriate location-based action is for the user to influence other people (e.g., at the location or an additional location) to perform a location-based action (e.g., based on the player's level of influence over other people). The game networking system 120*b* may determine a players' level of influence based on various factors, including the number of in-game or out-of-game connections of the player (e.g., in-game friends of the player with respect to a computer-implemented game executing on the game networking system 120*b* or out-of-game connections of the player with respect to the social networking system 120*c*), how successful the player has been at influencing people (e.g., his in-game or out-of-game connections) to perform location-based actions, how well the player has performed within the computer-implemented game (e.g., a number or magnitude of experience points, levels, high scores, or other achievements awarded to the player or a player character of the player), a popularity of the player (e.g., a number or activity level of fans of the player), a number of publications (e.g., blogs, news articles, etc.) mentioning the player, and so on. Similarly, the game networking system 120*b* may determine a level of influence of a group of players (e.g., based on an aggregation of the levels of influence of the members of the group or separate data pertaining to the group itself, such as how successful the group has been at influencing other people to perform location-based actions).

The item association system may detect a purchasing, selling, or trading of a real-world item that is associated with a virtual item. For example, the item association system may detect that a first user and a second user have completed a location-based action that includes a trading of a first real-world item and a second real-world item. The detecting of the trading may be based on input received from the first user, the second user, or a third user (e.g., a user present at the location that witnesses the trade). The item association module may then reflect the trading of the real-world items with respect to the virtual items to which they correspond. For example, the item association module may exchange a first virtual item of a player character of the first user with a second virtual item of a player character of the second user, where the first virtual item corresponds to the first real-world item that was included in a real-world trade and the second virtual item corresponds to the second real-world item that was included in a real-world trade. Thus, the real-world trade may be reflected by a trading of virtual items by player characters within the computer-implemented game. Similarly, the item association module may detect real-world buying and selling of real-items by users and reflect the real-world buying and selling of the real-world items by, for example, exchanging virtual items between player characters of a computer-implemented game.

The item association system may charge a transaction fee (e.g., to a game account of a user) to enable the exchanging of real-world items to affect a virtual world of a computer-implemented game. For example, if the item association system detects that a first user has sold a real-world item to a second user, the item association system may charge a transaction fee to the second user to reflect the transaction within the game (e.g., to enable a player character of the second user to receive a virtual item corresponding to the real-world item).

Presenting Incentive Reward Offers to Users

A variety of methods can be used to determine and present incentive reward offers to a user. In one embodiment, user 101 can access, via the user 101's client system 130, an online game hosted by game networking system 120b. The user 101's browser client can load and render the content of the webpage. Game networking system 120b may also access the user 101's game account information and/or the location account of one or more locations. This account information may be accessed in a variety of ways. For example, game networking system 120b could access data stored in a cookie on client system 130 that is appended to messages transmitted from client system 130 to game networking system 120b. This allows game networking system 120b to identify user 101 and access the appropriate game account information. To access location account information, game networking system 120b may directly query location networking system 120a. Alternatively, the online game webpage may include code (e.g., HTML, etc.) instructing the client system 130 to call location networking system 120a to retrieve HTML code and/or script. For example, the online game webpage provided by game networking system 120b may be implemented in an iframe with a "src" tag identifying the URL of location networking system 120a. When client system 130 consumes the HTML or other code of the page, client system 130 transmits a request to location networking system 120a. In one embodiment, the request includes a browser cookie or other state object appended thereto that allows location networking system 120a to resolve the identity of user 101 (and possibly all or a subset of game state information associated with that user 101). If a script is used (e.g., JavaScript), the script when downloaded and executed might be operative to scan various attributes of webpages hosted by location networking system 120a to identify the one or more location attributes and transmit this location attribute data to game networking system 120b. For example, the webpage hosted by location networking system 120a may include semantic tags that identify elements of the page that correspond to the types and prices of items available for sale at location 115. Game networking system 120b may use this information to consider what type of incentive reward to offer user 101. As mentioned above, in response to the call from client system 130, game networking system 120b may access data stored in the cookie corresponding to the game networking system 120b, thereby allowing the game networking system 120b to identify user 101. If game networking system 120b is able to successfully identify user 101 as a player in one or more online games hosted by game networking system 120b, it can then trigger the incentive offer search system and the action proposal search system.

In some embodiments, even if user 101 is not a user 101 of game networking system 120b, the method may include offering an alternative type of incentive reward to user 101, such as an in-game benefit or asset that is not normally provided to new players. This might be done, for example, to encourage user 101 to establish a user account on game networking system 120b. For example, if user 101 is not a user of any game hosted by game networking system 120b, user 101 might be presented with an incentive reward offer of $100,000 in virtual poker chips if he performs a certain location-based action at location 115 and joins Zynga Poker, where a typical new poker player only receives $20,000 in virtual poker chips in that game.

The incentive offer search system and action proposal search system can determine an appropriate incentive reward and location-based action to present to user 101. An appropriate incentive reward and location-based action can be determined in a variety of ways. Once an appropriate incentive reward and location-based action have been determined, game networking system 120b can respond to the call from client system 130 with content that includes details of the incentive reward and the location-based action to be displayed on the browser client of client system 130. The incentive reward offer may be rendered, for example, in a discrete section of the online game interface viewed by user 101. The offer can include a variety of information about the incentive reward and location-based action, including a description of the in-game reward, an image, a description of the location 115 and the action to be performed, and other details, as instructed by the script and other content transmitted in the response received from game networking system 120b.

In one embodiment, game networking system 120b may generate a unique offer identifier that is associated with the offer transmitted to client system 130. The offer identifier can be included in the HTML code that becomes part of a Document Object Model (DOM) of the webpage as maintained by the browser client or other client application. If user 101 performed the location-based action, game networking system 120b and/or location networking system 120a may record the unique offer identifier in association with the offer. After user 101 performs the location-based action, location networking system 120a may transmit data to game networking system 120b indicating that the location-based action has been performed. This can be done in a variety of ways. Once game networking system 120b has confirmed that user 101 has completed the location-based action, game networking system 120b can then provide the incentive reward to user 101 or his player character. For example, game networking system 120b may update user 101's account to add the in-game reward to his in-game asset list, which will be presented or available to the user 101 the next time he accesses the game. The entities associated with the game networking system 120b and location networking system 120a, to the extent they are separate, can contract to achieve a variety of revenue exchange or sharing paradigms that arise out of the incentive offers described herein. For example, the entity associated with game networking system 120b may receive a payment for each performed location-based action. In another embodiment, the entity associated with game networking system 120b may receive a payment when user 101 redeems the award.

Other methods are possible for determining and presenting an incentive reward offer and location-based action to a user 101. For example, a variety of method steps and data flows are possible. The methods and data flows described above, as well as alternatives, are described in more detail below.

Figure 2E:
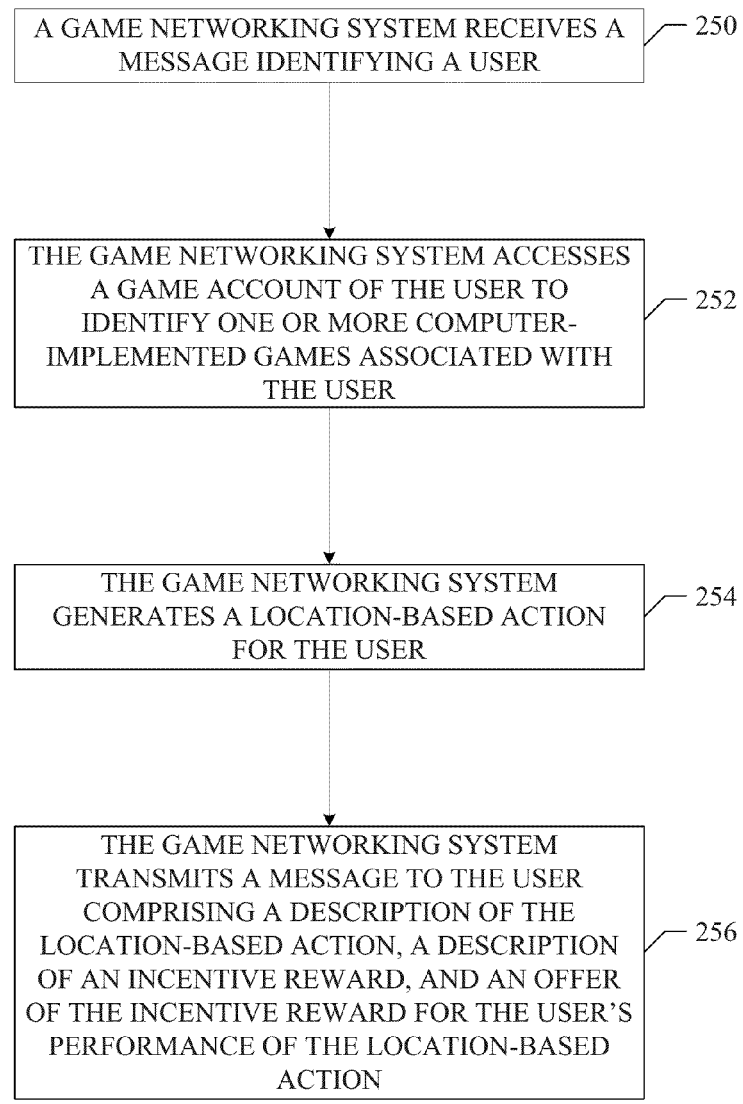
FIG. 2E shows a flowchart illustrating an example method for proposing a location-based action to a user.

FIG. 2E shows a flowchart illustrating an example method 200E for proposing a location-based action to a user, such as user 101. In various embodiments, game networking system 120b receives a message identifying a user 101 at step 250. Game networking system 120b then accesses a game account of the user 101 to identify one or more computer-implemented games associated with the user 101 at step 252. Game networking system 120*b* then generates a location-based action for the user 101 at step 254. Game networking system 120*b* then transmits a message to the user 101 comprising a description of the location-based action, a description of an incentive reward, and an offer of the incentive reward for the user 101's performance of the location-based action at step 256.

Figure 2F:
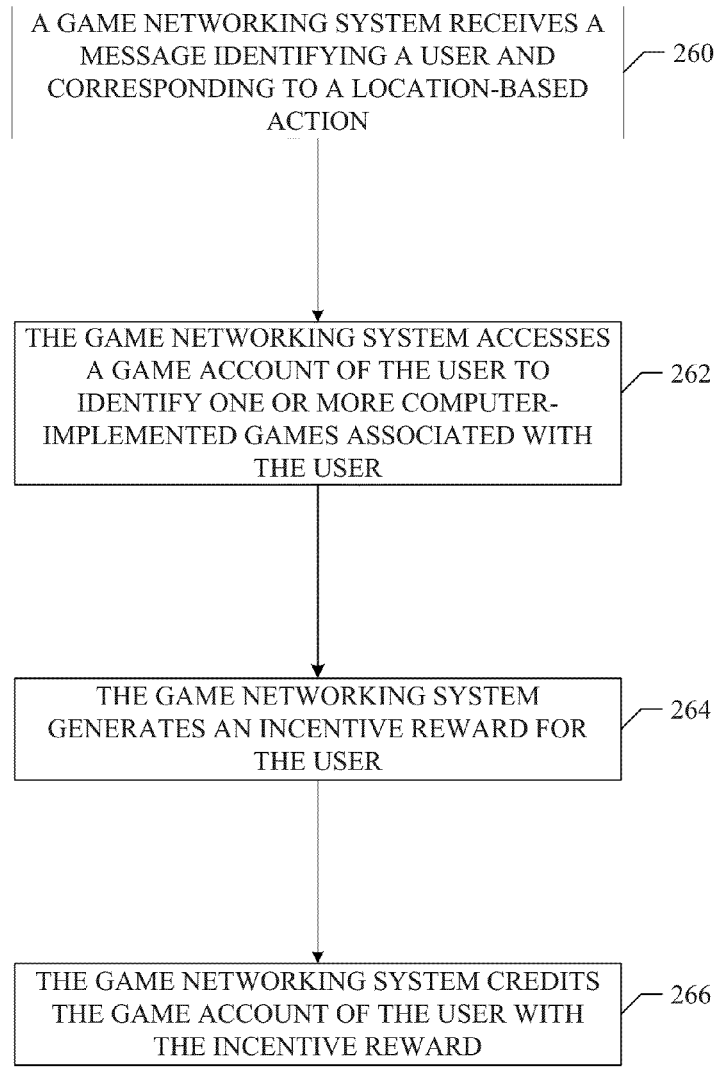
FIG. 2F shows a flowchart illustrating an example method for transferring an incentive reward to a user for performing a location-based action.

FIG. 2F shows a flowchart illustrating an example method 200F for transferring an incentive reward to a user 101 for performing a location-based action. In various embodiments, a game networking system 120*b* receives a message identifying a user 101 and corresponding to a location-based action at step 260. The game networking system 120*b* then accesses a game account of the user 101 to identify one or more computer-implemented games associated with the user 101 at step 262. The game networking system 120*b* then generates an incentive reward for the user 101 at step 264. The game networking system 120*b* then credits the game account of the user 101 with the incentive reward at step 266.

Figure 2G:
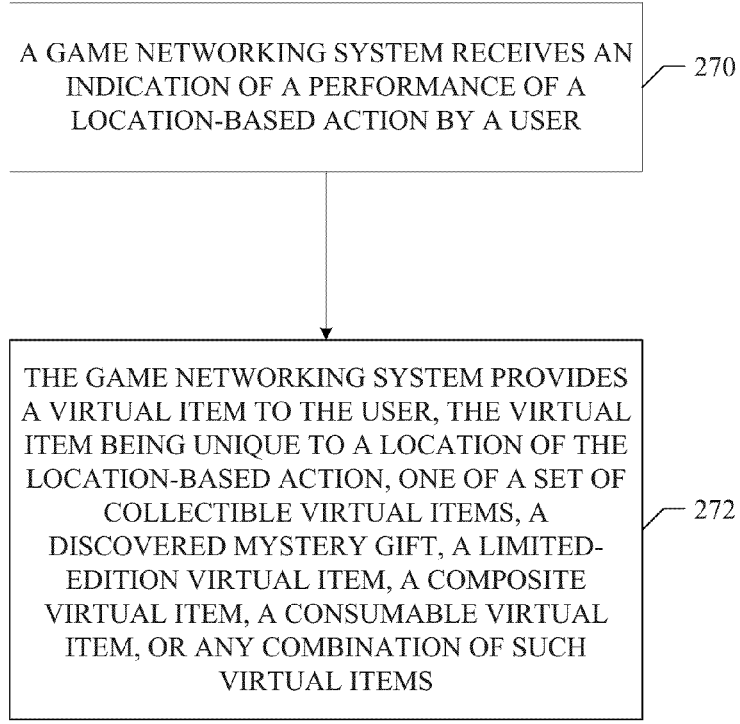
FIG. 2G shows a flowchart illustrating an example method of providing a virtual item to a user for performing a location-based action.

FIG. 2G shows a flowchart illustrating an example method 200G of providing a virtual item to a user such as user 101 for performing a location-based action. At operation 270, a game networking system 120*b* receives an indication of a performance of a location-based action by the user 101. At operation 272, the game networking system 120*b* provides a virtual item to the user 101 (e.g., via a game account of the user 101). The virtual item may be a virtual item that is unique to a location 115 of the location-based action. For example, the virtual item may be an in-game cheese item that is available only to users who perform a location-based action in Wisconsin. Or the virtual item may be one of a set of virtual items that the user 101 may collect to obtain an additional incentive reward. That is, the virtual item may be a collectible virtual item. Or the virtual item may be a discovered mystery gift, a limited-edition virtual item, a composite virtual item, or a consumable virtual item, as described above with respect to FIG. 2B. Or the virtual item may be any combination of these types of virtual items (e.g., an item that is unique to a location and an item that is collectible as part of a set of virtual items). The game networking system 120*b* may determine which of these types of virtual items to offer the user 101 (e.g., based on a generation of an incentive reward by the incentive offer search system discussed above). Sets of collectible virtual items may be organized into of a hierarchy or a mega collection of sets of collectible virtual items. In various embodiments, users or groups may be enabled to collect particular sets of collectible virtual items (e.g., those that are higher in the hierarchy) based on having completed collections of additional particular sets of collectible virtual items. As an example, an in-game feature may be offered as an incentive reward to all users at a location (e.g., a geographic area, such as Brooklyn, N.Y.) based on all of the users at the location performing the necessary location-based actions to collect all of the virtual items in a set of collectible virtual items.

Figure 2H:
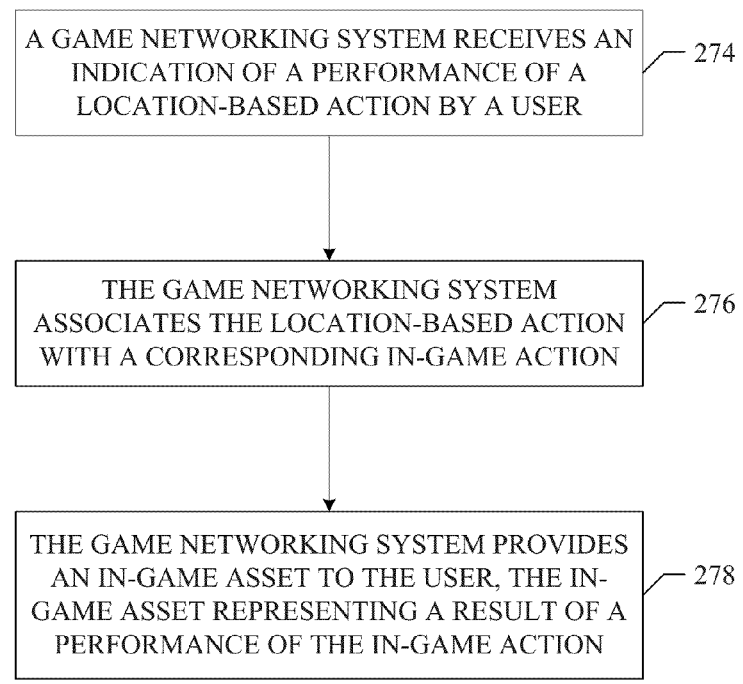
FIG. 2H shows a flowchart illustrating an example method of providing an in-game asset to the user based on an association between a location-based action and an in-game action.
Figure 21:
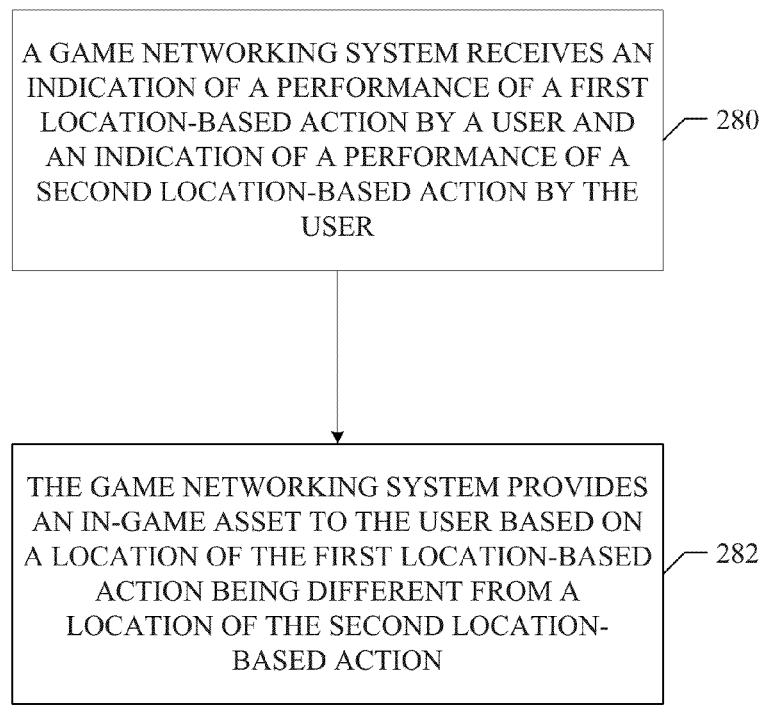

FIG. 2H shows a flowchart illustrating an example method 200H of providing an in-game asset to the user 101 based on association between a location-based action and an in-game action. At operation 274, the game networking system 120*b* receives an indication of a performance of a location-based action by user 101. At operation 276, the game networking system 120*b* associates the location-based action with an in-game action. For example, if the location-based action is a scanning of a UPC of a product at a grocery store, the corresponding in-game action may be a shoplifting of a corresponding virtual item from an in-game store.

At operation 278, the game networking system 120*b* provides an in-game asset to the user 101, the in-game asset representing a result of a performance of the in-game action. For example, the result of an in-game shoplifting of a virtual item (e.g., the in-game action determined by the game networking system 120*b* to correspond to an out-of-game scanning of a real-world item) may be an obtaining of an in-game asset corresponding to the type of the real-world item that was scanned. Thus, if the user 101 scans a UPC of a six-pack of beer, the game networking system 120*b* may provide the user 101 with an in-game asset related to beer.

FIG. 2I shows a flowchart illustrating an example method 200I of providing an in-game asset to a user 101 based on a detection that the user 101 performed a location-based action at a first location and a location-based action at a second location. At operation 280, the game networking system 120*b* receives an indication of a performance of a first location-based action by a user 101 and an indication of a second location-based action by the user 101.

At operation 282, the game networking system 120*b* provides an in-game asset to the user 101 based on a location of the first location-based action being different than a location of the second location-based action. The providing of the in-game asset may be based on the user 101 performing the first location-based action and the second location-based action within a particular time period. For example, the game networking system 120*b* may provide an in-game asset to the user 101 based on the user 101 registering presence at a location on the East coast and a location on the West coast on the same day. The providing of the in-game asset may be related to travelling by the user 101 between the location of the first-location based action and the location of the second location-based action. For example, the game networking system 120*b* may provide an in-game asset to the user 101 based on distance between the location of the first location-based action or the second location-based action. The in-game asset may be selected or generated based on travelling between locations. For example, based on a detecting that the user 101 flew on an airplane between two locations, the game networking system 120*b* may provide the user 101 with an in-game asset related to air travel (e.g., jet fuel).

The first location-based action and the second location-based action (as well as additional location-based actions) may be derived or received from an entity interested in incentivizing travel through a location. For example, a government interested in promoting tourism through a city or town may interface with the game networking system 120*b* to establish incentives for people to travel to various tourist locations (perhaps in a sequential order). As another example, a theme park may interface with the game networking system 120*b* to establish incentives for people to visit key parts of the theme park.

Figure 2J:
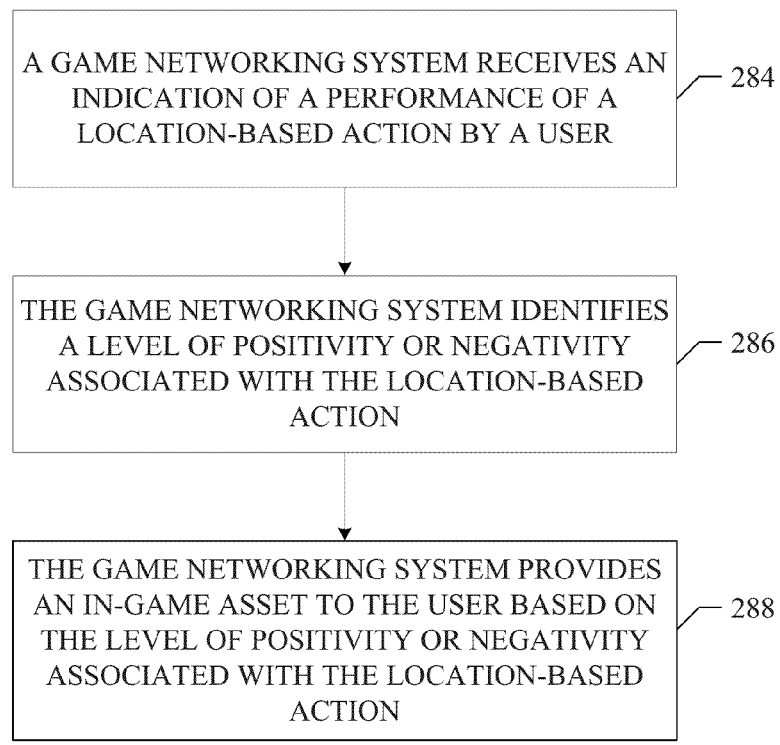
FIG. 2J shows a flowchart illustrating an example method of providing an in-game asset based on a level of positivity or negativity associated with a location-based action.

FIG. 2J shows a flowchart illustrating an example method 200J of providing an in-game asset based on a level of positivity or negativity associated with a location-based action. At operation 284, the game networking system 120*b* receives an indication of a performance of a location-based action by a user 101. At operation 286, the game networking system 120*b* identifies a level of positivity or negativity associated with the location-based action. The game networking system 120*b* may determine the level of positivity or negativity associated with the location-based action based on input from users who have performed the location-based action. Or the game networking system 120*b* may determine the level of positivity or negativity associated with the location-based action based on predetermined values (e.g., provided by an administrator of the game networking system 120*b*). For example, the game networking system 120*b* may determine that the location-based activity of sitting in a waiting room (e.g., at the doctor's office or a dentist's office) is viewed negatively by users.

At operation 288, the game networking system 120*b* provides an in-game asset to the user 101 based on the level of positivity or negativity associated with the location-based action. For example, the game networking system 120*b* may provide a first in-game asset to a user 101 that performs a location-based action that is viewed negatively by other users and a second in-game asset to an additional user that performs a location-based action that is viewed positively by other users, where the first in-game asset is more valuable than the second in-game asset. In this way, the game networking system 120*b* may entertain users by providing them with relatively valuable in-game assets when they perform location-based actions that are viewed negatively relative to other location-based actions.

Figure 2K:
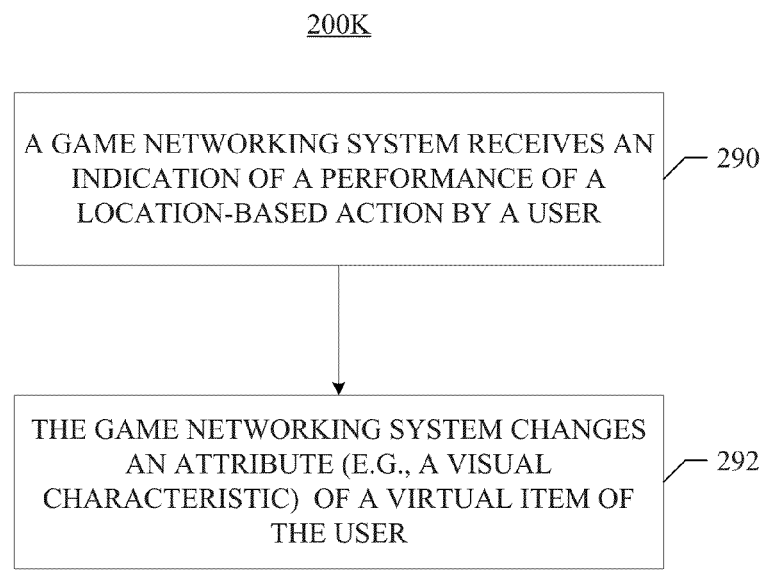
FIG. 2K shows a flowchart illustrating an example method of changing a property of a virtual item based on a performance of a location-based action by a user.

FIG. 2K shows a flowchart illustrating an example method 200K of changing a property of a virtual item based on a performance of a location-based action by a user such as user 101. At operation 290, the game networking system 120*b* receives an indication of a performance of a location-based action by the user 101. At operation 292, the game networking system 120*b* changes an attribute of a virtual item of the user 101 based on the game networking system 120*b* receiving the indication of the performance of the location-based action of the user 101. The changing of the virtual item may reflect a number of performances by the user 101 of a location-based action. For example, the game networking system 120*b* may change a visual characteristic (e.g., a color) of a virtual item of the user 101 based on the number of times user 101 performs a location-based action (e.g., purchases a real-world item at a location). The changing of an attribute of the virtual item may include adding or changing a branding message (e.g., a logo) associated with the virtual item. As another example, the game networking system 120*b* may change an attribute (e.g., a style or color) of an in-game virtual coffee cup of the user 101 based on the user 101 purchasing a particular number of cups of coffee at Starbucks. As another example, the game networking system 120*b* may change a level of power of the virtual item with respect to the computer-implemented game. For example, if the user 101 has a weapon in a fighting game, a level of power of the weapon may increase based on the number of times the user 101 performs the location-based action.

Figure 2L:
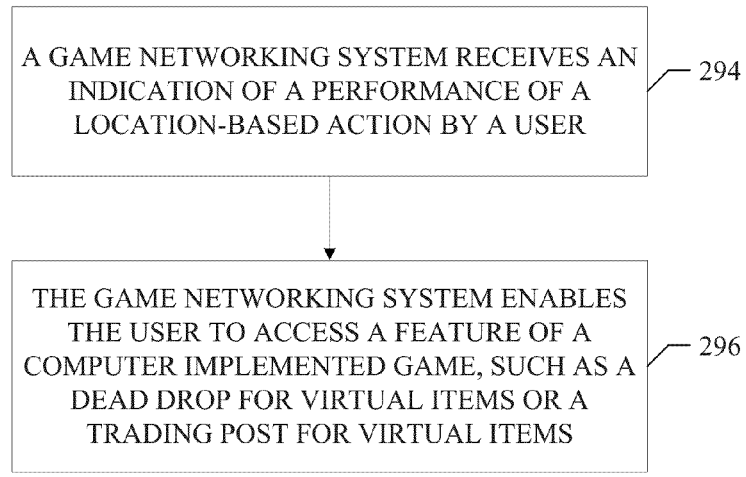
FIG. 2L shows a flowchart illustrating an example method of enabling a user to access a feature of a computer-implemented game based on an indication of a performance of a location-based action by the user.

FIG. 2L shows a flowchart illustrating an example method 200L of enabling a user such as user 101 to access a feature of a computer-implemented game based on an indication of a performance of a location-based action by the user 101. At operation 294, the game networking system 120*b* receives an indication of a performance of a location-based action by the user 101. At operation 296, the game networking system 120*b* enables the user 101 to access a feature of a computer-implemented game. For example, the computer-implemented game may enable a dead drop for virtual items. The dead drop may enable user 101 to drop off a virtual item with respect to a location. The dead drop may also enable an additional user to pick up the virtual item with respect to the location (based, for example, on the additional user performing a location-based action at the location). As another example, the computer-implemented game may enable a trading post for virtual items. The trading post may enable user 101 to trade virtual items with other users (e.g., based on the other users performing a location-based action at the same location as the location-based action performed by the user 101). In some embodiments, when user 101 registers presence at a location (e.g., location 115), the game networking system 120*b* may enable the user 101 to trade virtual items with other users who have registered presence at the location (e.g., within a specific time frame, such as an hour, day, or week). As another example, the computer-implemented game may enable the user to request assistance from additional people (e.g., players of a game or people present at the location) in completing a location-based action. For example, to complete a quest to obtain an in-game virtual item, the user may need to perform a location-based action involving one or more in-game assets (e.g., virtual items or energy) that a player character of the user does not currently possess. The computer-implemented game may enable the user to request that users present at the location provide one or more in-game assets that the user needs. The computer gaming system 120*b* may then provide the user with the incentive reward for completing the quest. The computer gaming system 120*b* may also provide the people who helped the user complete the quest with an incentive reward related to the completion of the quest by the user. For example, the computer gaming system 120*b* may provide the user with an incentive reward of a Sword of Doom based on the user acquiring 100 energy points from people present at the location. Based on the people present at the location providing the necessary energy points, the user may be provided with the Sword of Doom, and the player characters of the people who assisted the user in completing his quest may each receive 10 additional hit points.

Figure 2M:
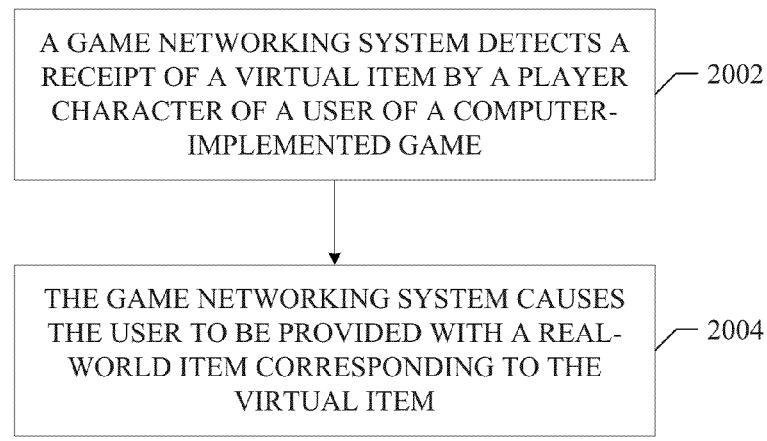
FIG. 2M shows a flowchart illustrating an example method of associating a real-world item with a computer-implemented game.

FIG. 2M shows a flowchart illustrating an example method 200M of associating a real-world item with a computer-implemented game. At operation 2002, the game networking system 120*b* detects a receipt of a virtual item by a player character of a user, such as user 101, of a computer-implemented game. For example, the game networking system 120*b* may detect that a player has received a virtual item as an incentive reward for performing a location-based action. At operation 2004, the game networking system 120*b* indicate (e.g., to an additional system) that the user 101 is to be provided with a real-world item corresponding to the virtual item. For example, if the user 101 receives a virtual ring, the computer-implemented game 120*b* may send a message to a real-world item provisioning (or shipping) system that the user 101 is to be provided with a plastic ring corresponding to the virtual ring. The real-world item provisioning system may then handle the providing of the a real-world ring corresponding to a virtual ring within a computer-implemented game.

Figure 2N:
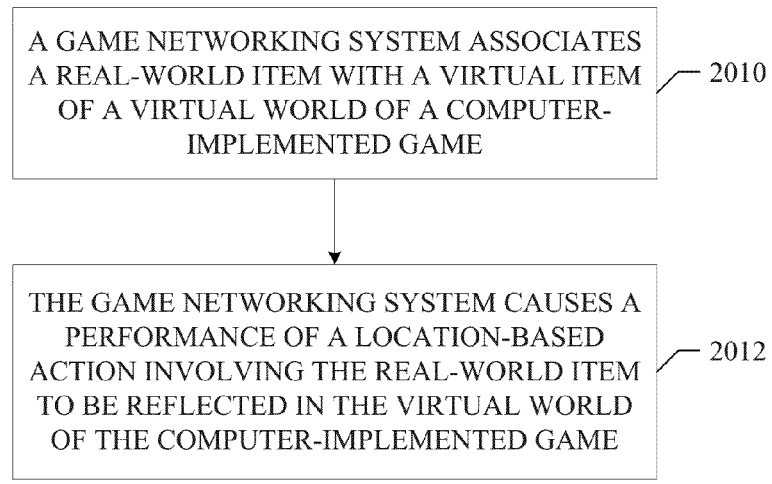
FIG. 2N shows a flowchart illustrating an example method of associating a real-world item with a computer-implemented game.
Figure 20:
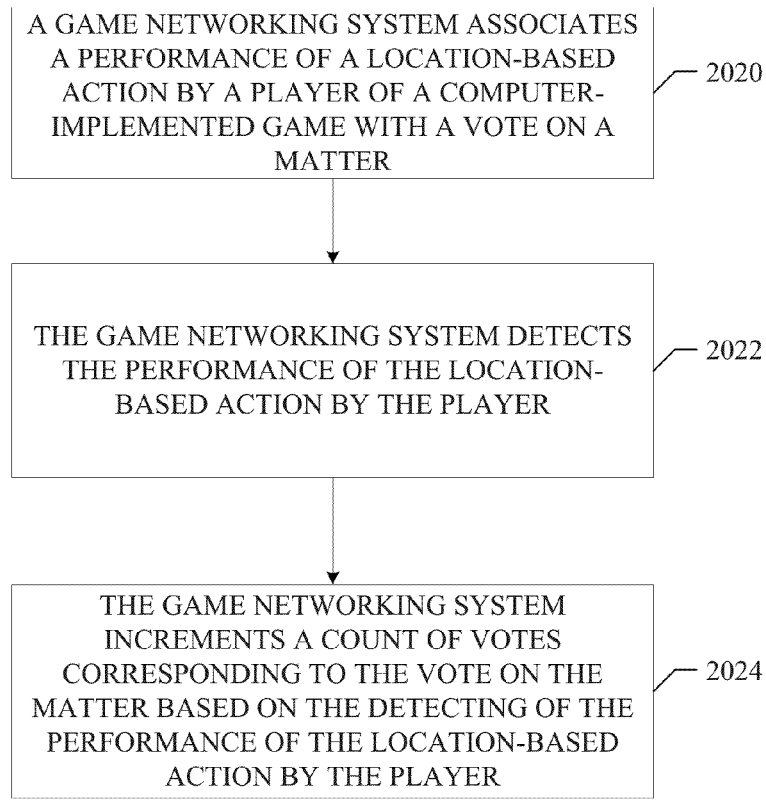

FIG. 2N shows a flowchart illustrating an example method 200N of associating a real-world item with a computer-implemented game. At operation 2010, the game networking system 120*b* associates a real-world item with a virtual item of a virtual world of a computer-implemented game. For example, the game networking system 120*b* may associate a user's, such as user 101, iPhone with a weapon being wielded by a player character of the user 101 within the virtual world of the computer-implemented game. At operation 2012, the game networking system 120*b* reflects a performance of a location-based action involving the real-world item in the virtual world of the computer-implemented game. For example, the game networking system 120*b* may detect a swinging of the user 101's iPhone toward an additional user of the computer-implemented game. The game networking system 120*b* may then reflect the performance of this location-based action in the virtual world of the computer-implemented game by weakening the player character of the additional user to show that the player character of the additional user was struck by the weapon. Or the game networking system 120*b* may detect that the user has performed an action with the real-world item that includes recharging the item (e.g., connecting a rechargeable battery of the item to a power source). In response, the game networking system 120b may recharge the virtual item (e.g., energy points), enable additional properties or capabilities of the virtual item, and so on.

FIG. 2O shows a flowchart illustrating an example method 200O of associating location-based actions with votes on a matter. At operation 2020, the game networking system 120b associates a performance of a location-based action by a player (e.g., user 101) of a computer-implemented game with a vote on a matter. For example, the game networking system 120b associates a purchasing of a Starbuck's coffee at a Starbucks by a player with a vote on a matter pertaining to which coffee establishment players of the computer-implemented game prefer. At operation 2022, the game networking system 120b detects the performance of the location-based action by the player. For example, the game networking system 120b detects that the player has purchased coffee at Starbucks. At operation 2024, the game networking system 120b increments a count of votes corresponding to the vote on the matter based on the detecting of the performance of the location-based action by the player. For example, the game networking system 120b increments a count of votes in favor of Starbucks as the coffee establishment preferred by the players of the computer-implemented game based on a detecting that the player purchased coffee at Starbucks. Or the game networking system 120b increments a count of votes in favor of Peet's Coffee as the coffee establishment preferred by the players of the computer-implemented game based on a detecting that the player purchased coffee at Peet's Coffee.

Figure 2P:
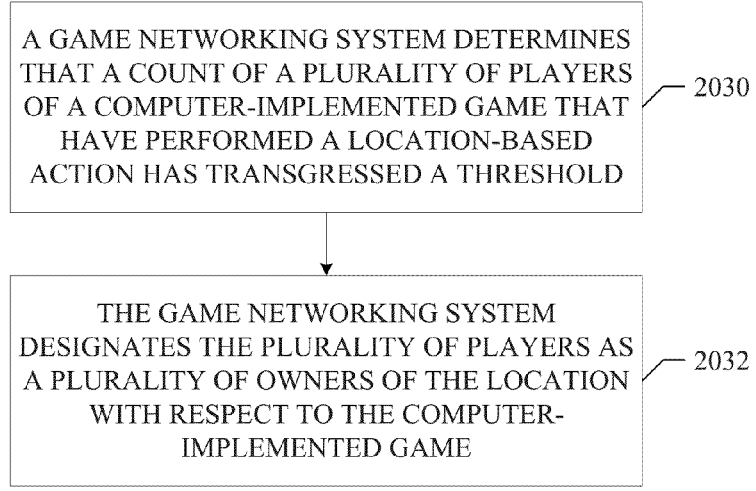
FIG. 2P shows a flowchart illustrating an example method of designating a plurality of players of a computer-implemented game as a plurality of owners of a location with respect to the game.

FIG. 2P shows a flowchart illustrating an example method 200P of designating a plurality of players of a computer-implemented game as a plurality of owners of a location (e.g., location 115) with respect to the game. At operation 2030, the game networking system 120b determines that a count of a plurality of players of a computer-implemented game that have performed a location-based action has transgressed a threshold. For example, the game networking system 120b determines that 25 members of a group of players have registered presence at a location. At operation 2032, the game networking system 120b designates the plurality of players as a plurality of owners of the location with respect to the computer-implemented game. For example, the game networking system 120b designates the 25 members of the group as bosses of the location. Or the game networking system 120b designates one of the 25 members of the group as a boss of the location (see, for example, the Turf Wars game described below).

Figure 2Q:
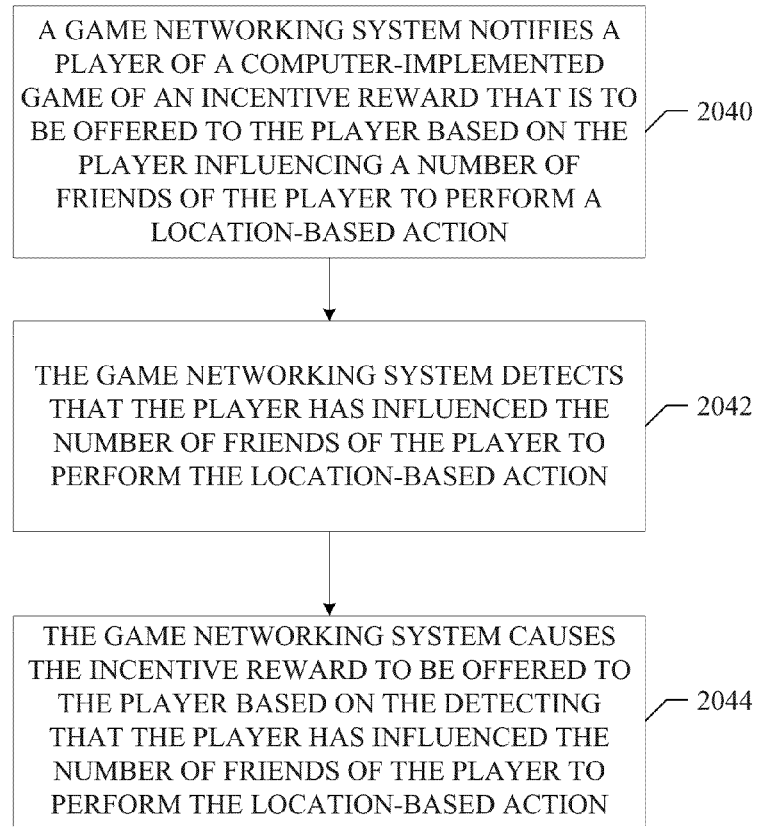
FIG. 2Q shows a flowchart illustrating an example method of providing incentive rewards to a player based on the player's ability to influence his friends to perform a location-based action.

FIG. 2Q shows a flowchart illustrating an example method 200Q of providing incentive rewards to a player based on the player's ability to influence his friends to perform a location-based action. At operation 2040, the game networking system 120b notifies a player of a computer-implemented game of an incentive reward that is to be offered to the player based on the player influencing a number of friends of the player to perform a location-based action. At operation 2042, the game networking system 120b detects that the player has influenced the number of friends to perform the location-based action. At operation 2044, the game networking system 120b system offers the incentive reward to the player based on the detecting that the player has influenced the number of friends of the player to perform the location-based action.

Figure 2R:
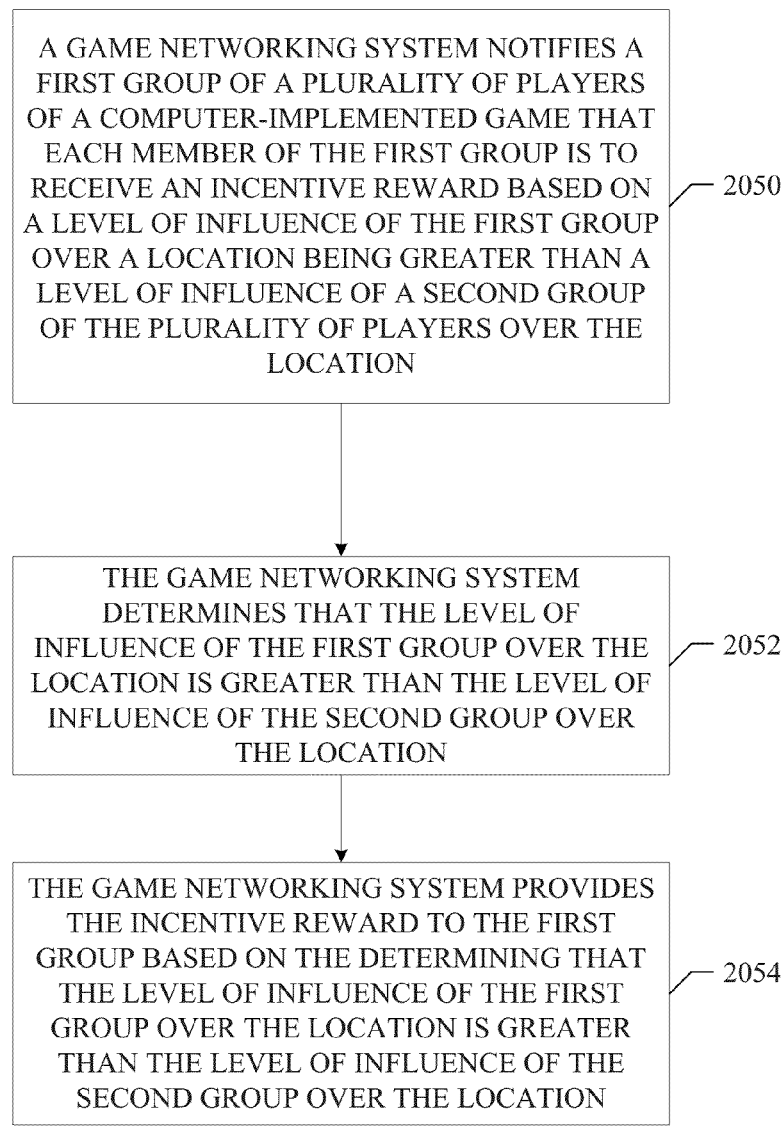
FIG. 2R shows a flowchart illustrating an example method of providing an incentive reward to a first group of players based on the first group of players having a level of influence over a location that is greater than a second group of players over the location.

FIG. 2R shows a flowchart illustrating an example method 200R of providing an incentive reward to a first group of players based on the first group of players having a level of influence over a location (e.g., location 115) that is greater than level of influence of a second group of players over the location. At operation 2050, the game networking system 120b notifies a first group of a plurality of players of a computer-implemented game that each member of the first group is to receive an incentive reward based on a level of influence of the first group over a location being greater than a level of influence of a second group of the plurality of players over the location. At operation 2052, the game networking system 120b determines that the level of the influence of the first group over the location is greater than the level of the influence of the second group over the location. For example, the game networking system 120b determines that the first group has spent more money at the location than the second group. Or the game networking system 120b determines that more people of the first group have registered presence at the location than people of the second group. At operation 2054, the game networking system 120b provides the incentive reward to the first group based on the determining that the level of influence of the first group over the location is greater than the level of influence of the second group over the location.

Figure 2S:
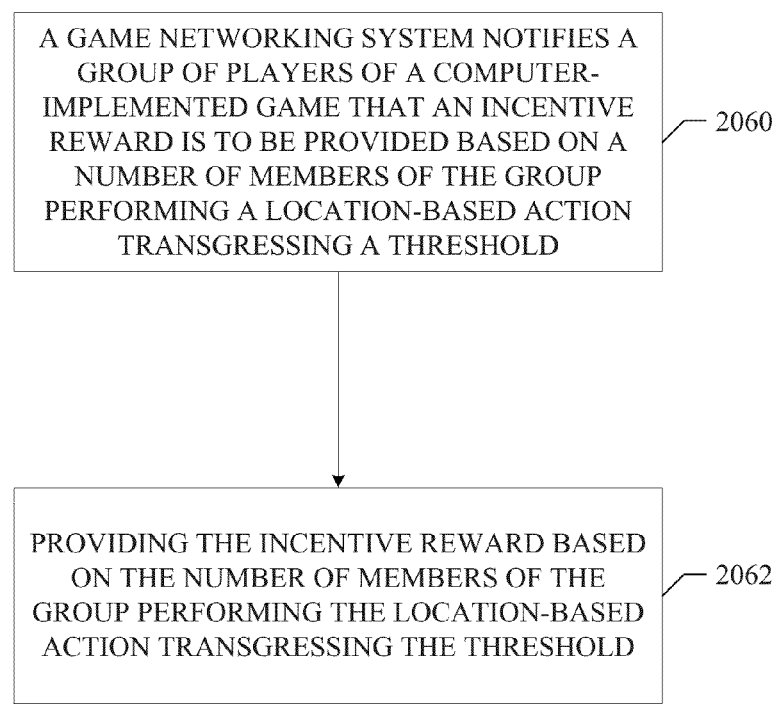
FIG. 2S shows a flowchart illustrating an example method of providing an incentive reward based on a number of members of a group of players of a computer-implemented game performing a location-based action.

FIG. 2S shows a flowchart illustrating an example method of providing an incentive reward based on a number of members of a group of players of a computer-implemented game (or users of a game networking system) performing a location-based action. At operation 2060, the game networking system 120b notifies a group of players of a computer-implemented game (or users of a game networking system) that an incentive reward is to be provided based on a number of members of the group performing a location-based action transgressing a threshold. For example, the game networking system 120b notifies a group of players that each member of the group will receive 10% off their next purchase at Starbucks if at least 10 people register presence at Starbucks within an hour. At operation 2062, the game networking system 120b provides the incentive reward based on the number of members of the group performing the location-based action transgressing the threshold. For example, the game networking system 120b provides each member of the group with a coupon that enables the each member to receive 10% off of their next purchase at Starbucks based on 10 people of the group having checked in at Starbucks within an hour.

Figure 2T:
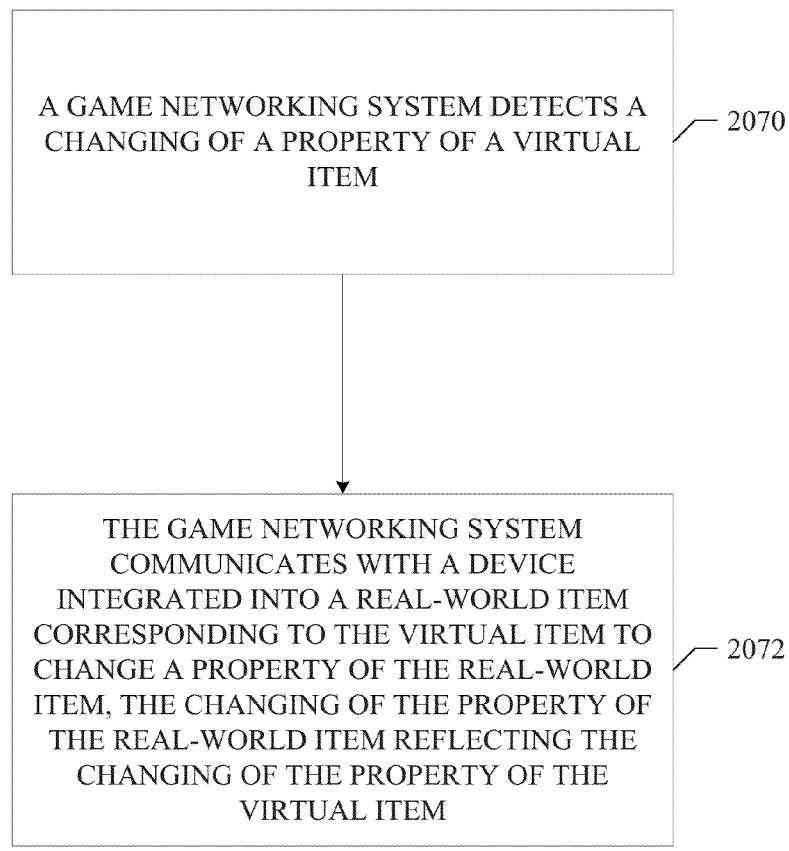
FIG. 2T shows a flowchart illustrating an example method of changing a property of a real-world item to reflect a changing of a property of a virtual item corresponding to the real-world item.

FIG. 2T shows a flowchart illustrating an example method of changing a property of a real-world item to reflect a changing of a property of a virtual item corresponding to the real-world item. At operation 2070, the game networking system 120b detects a changing of a property of a virtual item. For example, the game networking system 120b detects that a virtual item has changed color, gotten heavier or lighter, or made a sound. The changing of the property of the virtual item may be a result of an in-game action of a player (e.g., the owner of the virtual item) with respect to the virtual item. For example, a virtual sword may make a sound upon being used in virtual combat. At operation 2072, the game networking system 120b communicates a message to a device integrated into the real-world item to change a property of a real-world item corresponding to the virtual item. For example, the real-world item may include an integrated device (e.g., a MEMs device) capable of producing sounds, displaying images, producing vibrations, making the real-world item feel heavier or lighter, and so on. For example, the real-world item may be a plastic sword having integrated MEMs device capable of making sounds, changing color (e.g., shows streaks of blood), displaying visual patterns, or vibrating. Thus, the game networking system 120b may communicate with one or more devices integrated into the real-world item to configure the real-world item to reflect changes to a virtual item as they occur within a computer-implemented game.

FIG. 2U shows a flowchart illustrating an example method of offering a targeted advertising opportunity for sale. At operation 2080, the game networking system 120b identifies a targeted advertising opportunity based on a tracking of information pertaining to in-game actions, location-based actions, or other data (e.g., preference, profile, or social networking system data) associated with a player. For example, the game networking system 120*b* determines that a player of a computer-implemented game has repeatedly performed a location-based action involving a real-world item (e.g., the player has repeatedly scanned a product code of a real-world item to perform a shoplifting of a corresponding virtual item within the computer-implemented game). Based on the real-world item that the player selects for inclusion in the action, the game networking system 120*b* may identify an opportunity for sellers of the real-world item to target the player with advertising related to the item. At operation 2082, the game networking system 120*b* offers the targeted opportunity for sale to one or more operators or one or more locations. For example, if the player registers presence at a grocery store that sells the real-world item, the game networking system 120*b* may offer the operator of the grocery store an option to purchase a targeted advertisement to the player regarding the real-world item (e.g., a coupon for 10% off of the item if the player purchases the item at the grocery store). Or the game networking system 120*b* may offer the targeted advertising opportunity for sale to multiple operators (e.g., in an auction-style sale) of multiple locations (e.g., based on a history of locations that the user has visited), and provide the targeted advertising opportunity to the highest bidder. In various embodiments, the game networking system 120*b* may enable an operator of a location to access the tracked information pertaining to in-game actions, location-based action, or other data pertaining to a player based on a business agreement (e.g., a winning bid in an auction-style sale of the information or portion of the information). The game networking system 120*b* may also enable the operator to send in-game reminders, notification, promotions, or advertisements to the player that are customized for the player based on the information that the operator receives from the game networking system 120*b* regarding the player.

One of ordinary skill in the art would appreciate that the steps and operations described above can be performed in any reasonable order, and that various steps can be reordered, added, and removed. Additionally, any of the steps and operations described above may be combined in various ways.

For example, the examples described herein may be adapted to any combination of individual people or groups of people (e.g., individual players associated with a game, groups of players associated with a game, individual people not associated with a game, or groups of people not associated with a game). For example, the example method 200R is described with respect to groups of players having a level of influence over a location; however, the example method 200 may also be adapted to individual players. For example, the example method 200R may be adapted to provide an incentive reward to a first player based on the first player having a level of influence over a location that is greater than a level of influence of a second player over the location. Similarly, example methods that are described with respect to individual players may be adapted to groups of players. As another example, the examples described herein may be adapted to any type or combination of types of incentive rewards. Thus, an example that describes providing an in-game asset may be adapted to enable an in-game feature or provide another type of incentive reward.

Verification of Location-Based Actions

In various embodiments, location 115 can have one or more verification systems 118 that can verify when a user 101 has performed one or more location-based actions. Verification system 118 can verify performance of a location-based action using a variety of methods. Verification system 118 can generate, store, and transmit action verification data, which is data comprising information on one or more users and one or more location-based actions associated with the users. Action verification data can be transmitted to location networking system 120*a*, game networking system 120*b*, or client system 130, either directly or via network 160. In some embodiments, the action verification data can be generated by another system, such as client system 130, game networking system 120*b*, or location networking system 120*a*. This disclosure assumes that the action verification data is generated by verification system 118 and transmitted to location networking system 120*a*; however, this is not intended to be limiting. Action verification data can include a variety of information regarding a location-based action, including information indicating: the user 101; the location-based action; if the action was performed by the user 101; when the location-based action was performed; where the location-based action was performed; how the location-based action was performed; and other information related to the location-based action. The methods described below are not intended to be limiting, and one of ordinary skill in the art would recognize that other methods can be used to verify performance of a location-based action.

In some embodiments, if the location-based action is purchasing an item at location 115, verification system 118 can verify the purchase using a variety of methods. When user 101 purchases an item at location 115, location networking system 120*a* may collect purchase information from the user 101, including the user 101's name, credit card number, billing address, shipping address, email address, etc. For example, if user 101 visits a store and purchases an item with a credit card, location networking system 120*a* could use the information contained on the credit card to identify the user 101.

In some embodiments, if the location-based action is verifying the presence of user 101 at location 115, verification system 118 can verify the user 101's presence at the location 115 using a variety of methods. For example, verification system 118 can verify user 101's presence based on some form of identification presented at location 115, based on the user 101's proximity to location 115; when the user 101 provides an indication of the user 101's presence at location 115; and by using other location-verification methods.

In some embodiments, verification system 118 may verify that the user 101 was present at the location 115 during the time at which a particular event was scheduled to occur. For example, to verify that the user 101 was present at a Grateful Dead concert, the verification system 118 may verify that the user 101 was present at the venue of the Grateful Dead concert during the date and time the Grateful Dead concert occurred (or was scheduled to occur).

Data Flow

Figure 3:
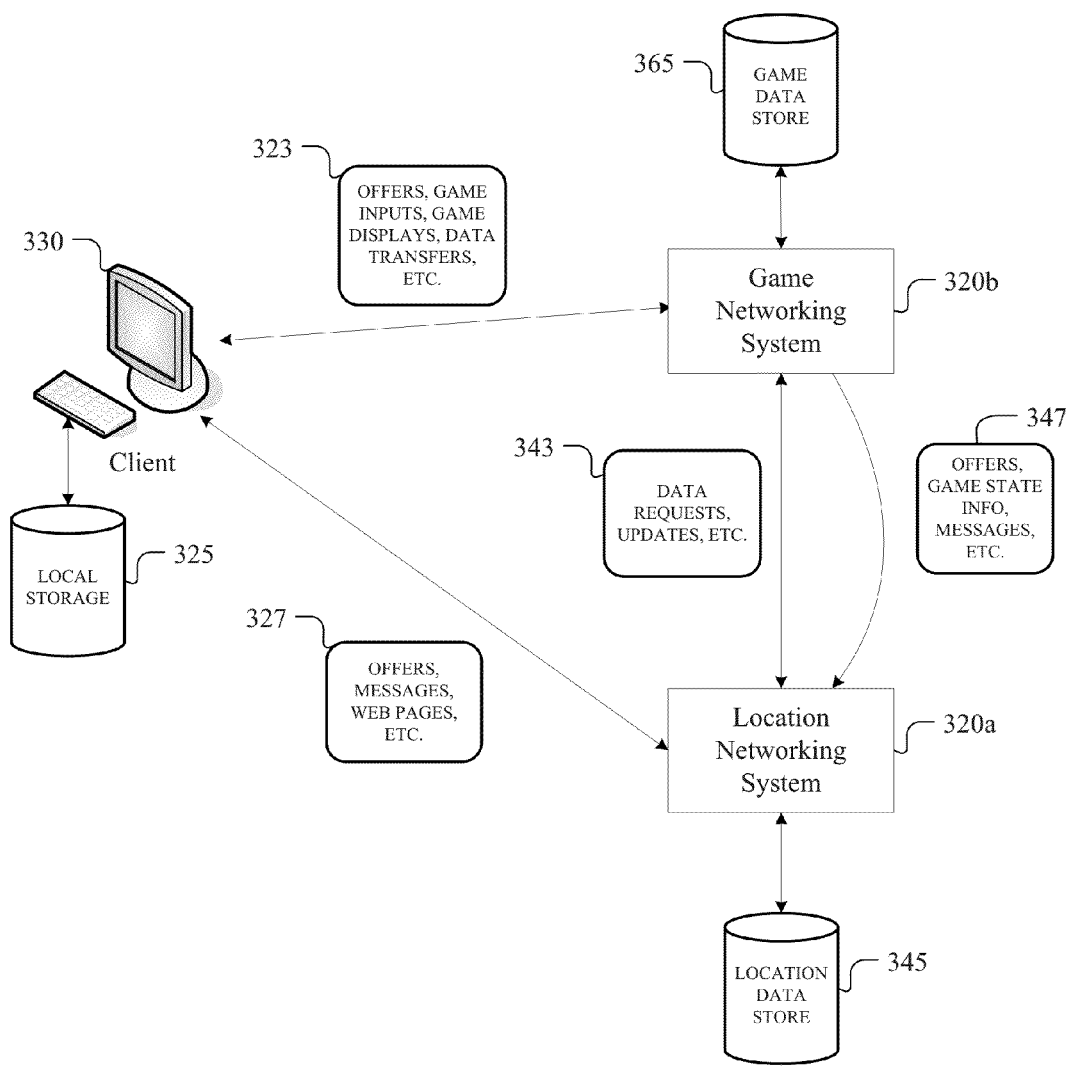
FIG. 3 shows a block diagram illustrating a schematic of a system and data flow.

FIG. 3 depicts a schematic of system 300 and data flow between the components of system 300. System 300 can include client system 330, location networking system 320*a*, and game networking system 320*b*. Client system 330, location networking system 320*a*, and game networking system 320*b* can each have a corresponding data store such as local storage medium 325, location data storage medium 345, and game data storage medium 365, respectively. Client system 330 can communicate with location networking system 320*a* to receive messages, location information, etc. Additionally, client system 330 can transmit data to and receive data 323 (e.g., game inputs, incentive offer information, data transfers) from game networking system 320*b*. In a similar fashion, game networking system 320*b* and location networking system 320*a* can communicate HTTP packets 343 including data requests, transaction information, updates, etc. At some other time, or at the same time, game networking system 320*b* can communicate data 347 (e.g., game state information, game system account information, page info, messages, and so on) with location networking system 320*a*. Additionally, client system 330 can transmit data (e.g., offers, messages, web pages, and so on) 327 to and receive data 327 from game networking system 320*b*.

Communication between client system 330, location networking system 320*a*, and game networking system 320*b* can occur over any appropriate electronic communication medium or network using any suitable communications protocols. For example, client system 330, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher-layer communications protocols, including client-server (or request-response) protocols, such as the HyperText Transfer Protocol (HTTP) and other communications protocols, such as HTTP-S, FTP, SNMP, TELNET. In addition, a server in one interaction context may be a client in another interaction context. Still further, in particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In one embodiment, for example, a client request may cause a server to respond with a first data object, such as an HTML page, which itself refers to other data objects. A client application, such as a browser, will request these additional data objects as it parses or otherwise processes the first data object.

The example data flows in this section are presented with respect to data flow between location networking system 320*a* and game networking system 320*b*. One skilled in the art would appreciate that these are presented merely as an example of a data flow between two types of online systems. However, the present disclosure is intended to encompass data flows between a game networking system and a variety of other online systems, such as online merchant systems, online media systems, online reviewing systems, online search engines, and online advertising systems. The example data flows described herein function analogously with these online systems as with location networking systems.

In various embodiments, location networking system 320*a* or game networking system 320*b* can receive messages identifying a user 101 (shown in FIG. 1). For example, game networking system 320*b* can receive a digital message through a network, wherein the message contains information about the identity of the user 101. This message can be sent using any suitable communications protocol.

In one embodiment, messages with identifying information received by location networking system 320*a* or game networking system 320*b* will have been sent from the user 101. For example, the user 101 could actively use a digital communication device (e.g., a computer or a smart phone) to send a message to game networking system 320*b*. In another example, the user 101 could passively use a digital communication device (e.g., a computer or smart phone) to send a message to game networking system 320*b* by instructing the digital communication device to send a message to game networking system 320*b* if the device comes within a specified proximity of location 115 (FIG. 1). The user 101's proximity can be determined by a variety of methods (e.g., through the use of a Global Positioning System (GPS)).

In another embodiment, messages with identifying information received by game networking system 320*b* will have been sent from location 115 or location networking system 320*a*. For example, location 115 could use a computing system to send a message to game networking system 320*b*.

In various embodiments, user 101 can receive messages identifying both a location-based action and an offer for an incentive reward. For example, user 101 could receive from game networking system 320*b* a message describing a location-based action and an incentive reward through client system 330. In another example, user 101 could receive a similar message from location networking system 320*a*. In another example, user 101 could receive a message directly from location 115 (e.g., through the use of a physical receipt or through the use of a computer at the location 115).

In various embodiments, location networking system 320*a* or game networking system 320*b* can receive a message verifying that user 101 performed a proposed location-based action. For example, game networking system 320*b* can receive the message in a digital form transmitted over a network. In some embodiments, the message verifying that user 101 performed a location-based action could have been transmitted by location 115 or location networking system 320*a* to game networking system 320*b* through the use of verification system 118.

In various embodiments, location networking system 320*a* or game networking system 320*b* can verify the presence of user 101 relative to location 115. For example, the user 101 could directly inform game networking system 320*b* that he is present at location 115 (e.g., by contacting the game networking system 320*b* directly through the use of a digital communications device owned by the user 101). In another example, the user 101 could indirectly inform game networking system 320*b* that he is present at location 115 (e.g., by permitting the game networking system 320*b* to track his location through the use of Global Positioning Service (GPS) positioning based on a communications device owned by the user 101).

In one embodiment, game networking system 320*b* can verify the presence of user 101 at location 115 through the use of a Global Positioning Service (GPS) device. For example, the user 101 could own a mobile client system 330 (e.g., a cell phone, pager, laptop, or tablet) that is in communication with a GPS system and game networking system 320*b* through a network. Game networking system 320*b* could then track the physical presence of the user 101 relative to one or more locations 115. In another example, the mobile client system 330 could be in communication with a GPS system and location networking system 320*a* through a network. Location networking system 320*a* could then track the physical presence of the user 101 relative to one or more locations 115. Location networking system 320*a* could then inform game networking system 320*b* of the physical presence of the user 101 relative to the location 115.

In another embodiment, game networking system 320*b* can verify the presence of user 101 at location 115 through the use of a third-party application, such as a social networking site (e.g., Facebook, Twitter), a location tracking site (e.g., Foursquare, Google Latitude), a location reservation site (e.g., OpenTable, Expedia), etc. For example, the application could notify game networking system 320*b* of the physical position of the user 101 relative to location 115 based on data received from the site. In another example, the application could notify location networking system 320*a* of the physical position of the user 101 relative to the location 115 based on data received from the site. Location networking system 320*a* could inform game networking system 320*b* of the physical position of the user 101 relative to the location 115.

In yet another embodiment, game networking system 320*b* can verify the presence of user 101 at location 115 through the use of codes (e.g., numerical codes, QR Codes, bar codes). For example, game networking system 320*b* could provide the user 101 with a code that the user 101 can take to location 115 and that the user 101 can input into a computing system (e.g., a cash register, computer), which can be transmitted to location networking system 320*a* and/or game networking system 320*b* to indicate the location 115 of the user 101. In another example, the location operator can provide the user 101 with a code that the user 101 can input into his client system 330, which will transfer an indication of the user 101's location 115 to location networking system 320*a* and/or game networking system 320*b*.

Systems and Methods

In various example embodiments, one or more described webpages may be associated with a networking system or networking service. However, alternate embodiments may have application to the retrieval and rendering of structured documents hosted by any type of network-addressable resource or web site. Additionally, as used herein, a "user" may be an individual, a group, or an entity (such as a business or third party application).

Figure 4:
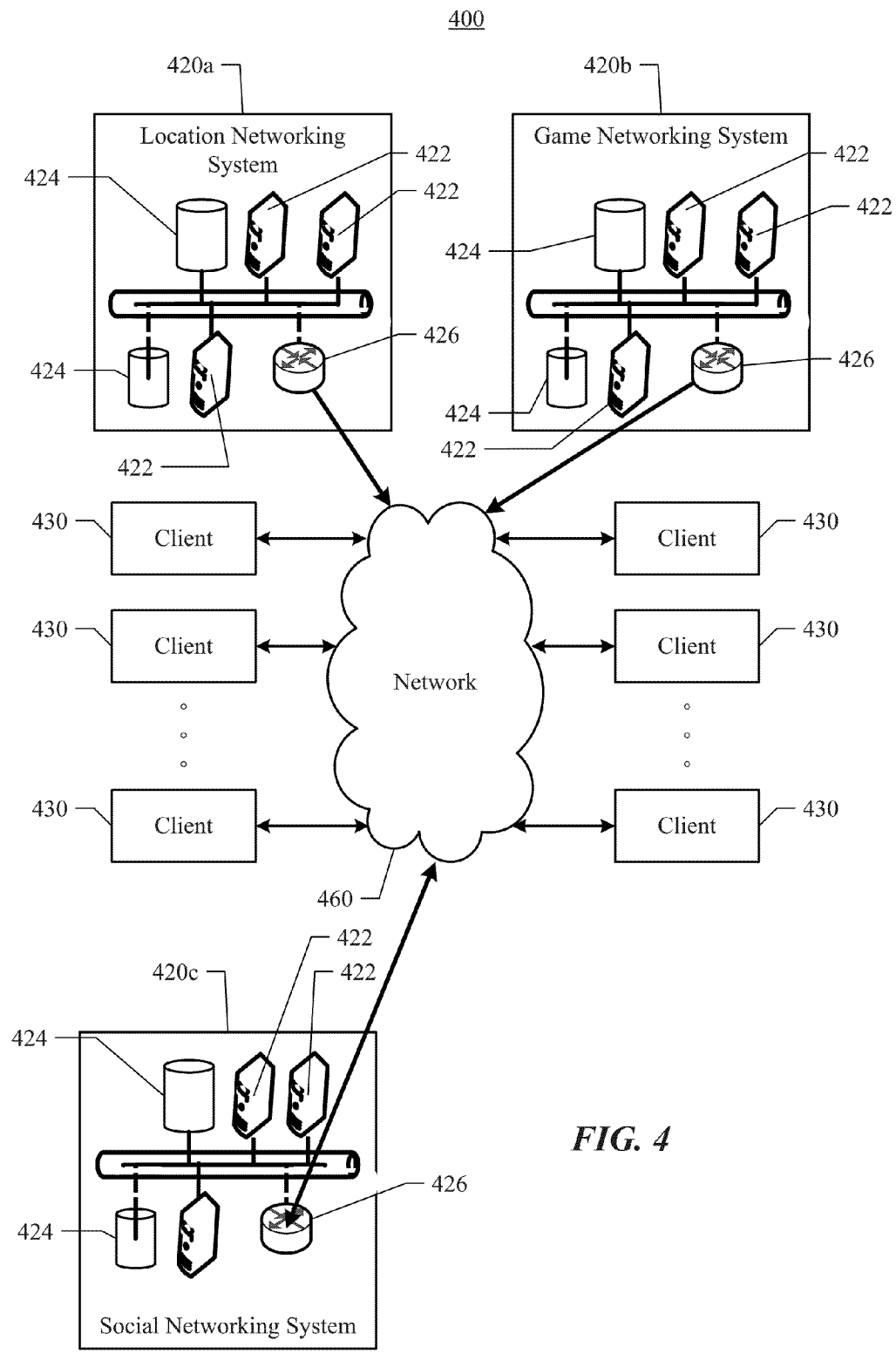
FIG. 4 shows a block diagram illustrating an example network environment.

Particular embodiments may operate in a wide area network environment, such as the Internet, including multiple network addressable systems. FIG. 4 illustrates an example network environment in which various example embodiments may operate. Network cloud 460 generally represents one or more interconnected networks, over which the systems and hosts described herein can communicate. Network cloud 460 may include packet-based wide area networks (such as the Internet), private networks, wireless networks, satellite networks, cellular networks, paging networks, and the like. As FIG. 4 illustrates, particular embodiments may operate in a network environment comprising one or more networking systems, such as location networking system 420*a*, game networking system 420*b*, social networking system 120*c*, and one or more client devices 430. The components of location networking system 420*a*, game networking system 420*b*, and social networking system 120*c* may operate analogously; as such, hereinafter they may be referred to simply as networking system 420. Client devices 430 are operably connected to the network environment via a network service provider, a wireless carrier, or any other suitable means.

Networking system 420 is a network-addressable system that, in various example embodiments, comprises one or more physical server(s) 422 and data store(s) 424. The one or more physical server(s) 422 are operably connected to network cloud 460 via, by way of example, a set of routers and/or networking switches 426. In an example embodiment, the functionality hosted by the one or more physical server(s) 422 may include web or HTTP servers, FTP servers, as well as, without limitation, webpages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical server(s) 422 may host functionality directed to the operations of networking system 420. Hereinafter server(s) 422 may be referred to as server 422, although server 422 may include numerous servers hosting, for example, networking system 420, as well as other content distribution servers, data stores, and databases. Data store(s) 424 may store content and data relating to, and enabling, operation of networking system 420 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store(s) 424 corresponds to one or more of a variety of separate and integrated databases, such as relational databases and object-oriented databases, that maintain information as an integrated collection of logically related records or files stored on one or more physical systems. Structurally, data store(s) 424 may generally include one or more of a large class of data storage and management systems. In particular embodiments, data store(s) 424 may be implemented by any suitable physical system(s) including components such as one or more database servers, mass storage media, media library systems, storage area networks, data storage clouds, and the like. In one example embodiment, data store(s) 424 includes one or more servers, databases (e.g., MySQL), and/or data warehouses. Data store(s) 424 may include data associated with different networking system 420 users and/or client devices 430.

Client device 430 is generally a computer or computing device including functionality for communicating (e.g., remotely) over a computer network. Client device 430 may be a desktop computer, laptop computer, personal digital assistant (PDA), in- or out-of-car navigation system, smart phone or other cellular or mobile phone, or mobile gaming device, among other suitable computing devices. Client device 430 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client device 430 to enter addresses of specific network resources to be retrieved, such as resources hosted by networking system 420. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client device 430 desires to view a particular webpage (hereinafter also referred to as target structured document) hosted by networking system 420, the user's web browser, or other document rendering engine or suitable client application, formulates and transmits a request to networking system 420. The request generally includes a URL or other document identifier as well as metadata or other information. By way of example, the request may include information identifying the user, such as a user ID, as well as information identifying or characterizing the web browser or operating system running on the user's client device 430. The request may also include location information identifying a geographic location of the user's client device 430 or a logical network location of the user's client device 430. The request may also include a timestamp identifying when the request was transmitted.

The example network environment described above and in FIG. 4 is presented with respect to location networking systems and game networking systems. One skilled in the art would appreciate that these are presented merely as an example of a network environment between two types of online systems. However, the present disclosure is intended to encompass network environments that include a game networking system and a variety of other online systems, such as online media systems, online reviewing systems, online search engines, and online advertising systems. The example network environment described above performs analogously with these other online systems as with location networking systems.

Figure 5:
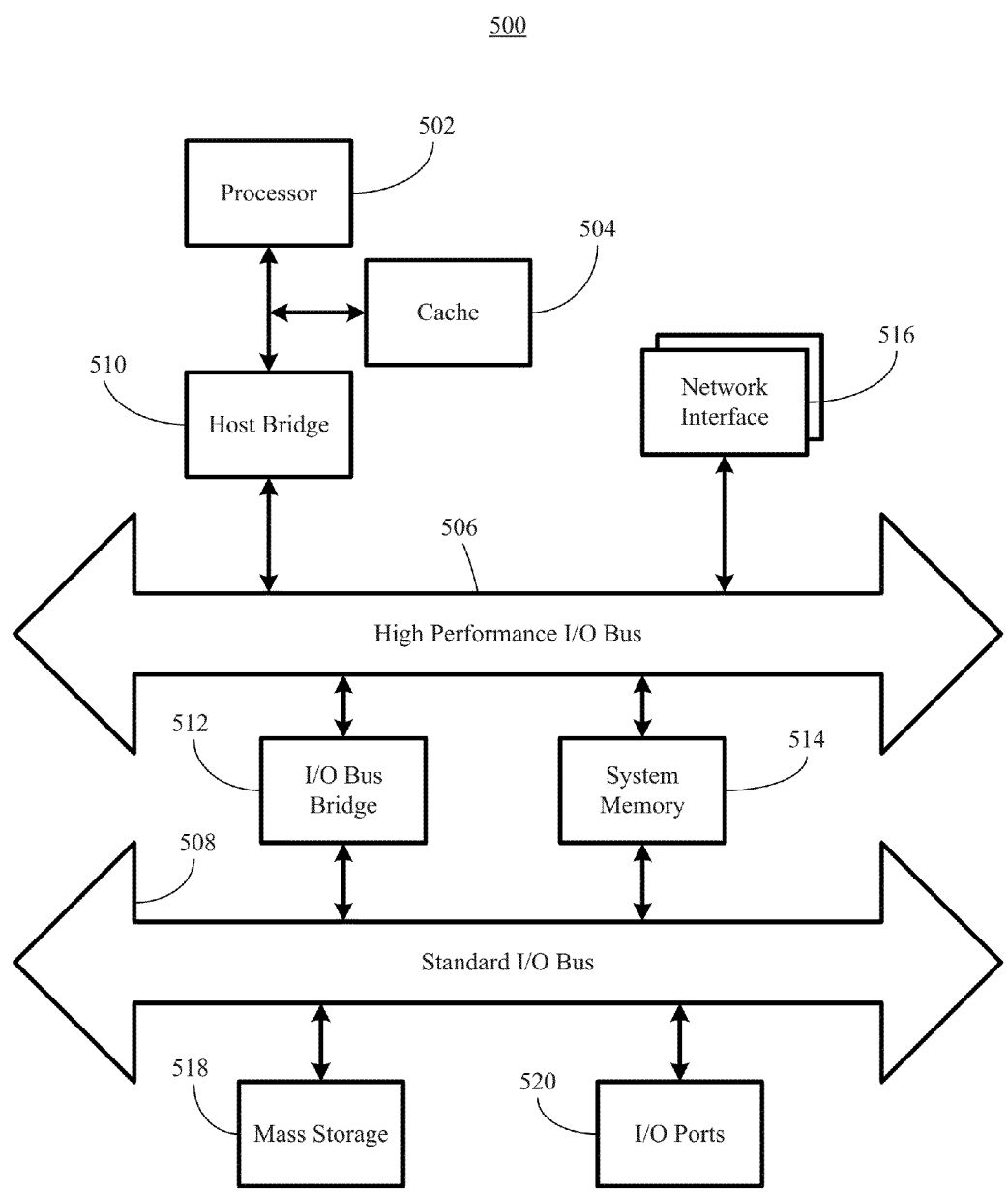
FIG. 5 shows a block diagram illustrating an example computer system architecture.

FIG. 5 illustrates an example computing system architecture, which may be used to implement the server 422 or client device 430 shown in FIG. 4. In one embodiment, hardware system 500 comprises a processor 502, a cache memory 504, and one or more executable modules and drivers, stored on a tangible computer readable medium, directed to the functions described herein. Additionally, hardware system 500 may include a high performance input/output (I/O) bus 506 and a standard I/O bus 508. A host bridge 510 may couple processor 502 to high performance I/O bus 506, whereas I/O bus bridge 512 couples the two buses 506 and 508 to each other. A system memory 514 and one or more network/communication interfaces 516 may couple to bus 506. Hardware system 500 may further include video memory (not shown) and a display device coupled to the video memory. Mass storage 518 and I/O ports 520 may couple to bus 508. Hardware system 500 may optionally include a keyboard, a pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in servers 422, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures, and various components of hardware system 500 may be rearranged. For example, cache memory 504 may be on-chip with processor 502. Alternatively, cache memory 504 and processor 502 may be packed together as a "processor module," with processor 502 being referred to as the "processor core." Furthermore, certain embodiments of the present disclosure may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Turf Wars Game

Figure 6A:
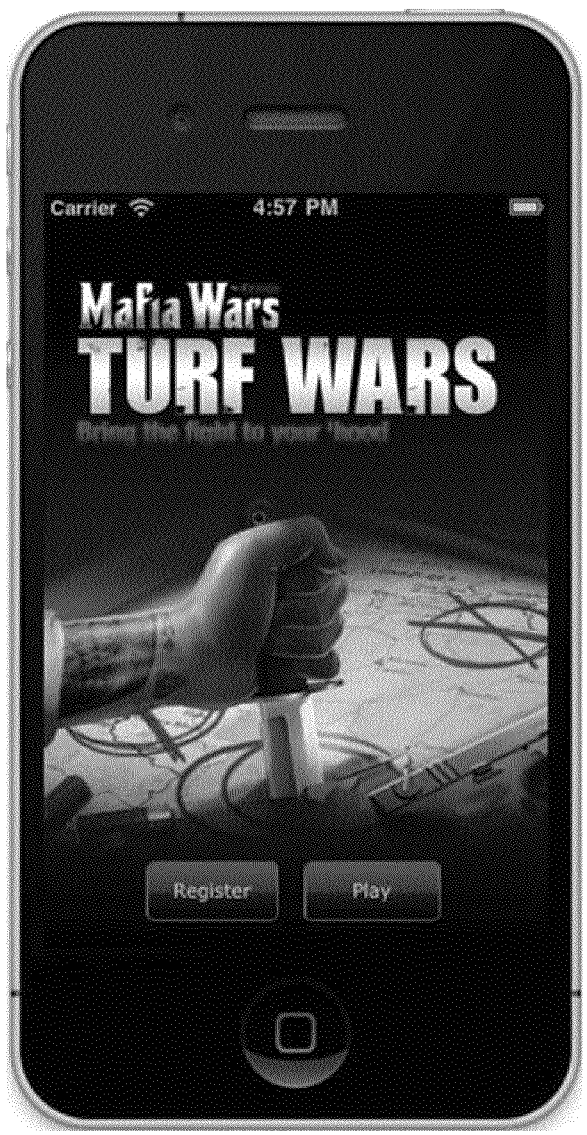
FIG. 6A illustrates an example user interface of a login screen of a Turf Wars game.

FIG. 6A illustrates an example user interface 600A of a login screen of the Turf Wars game described above. The game networking system 120b may present the example user interface 600A on a client 130 (e.g., an iPhone). The login screen includes buttons for playing the game or registering to play the game. The user interface 600A is integrated into the user interface of the client 130.

Figure 6B:
FIG. 6B illustrates an example user interface of a message service registration screen of the Turf Wars game.

FIG. 6B illustrates an example user interface 600B of a message service (e.g., a Short Message Service (SMS)) registration screen of the Turf Wars game. The example user interface 600B includes boxes for registering a phone number through which the player (e.g., user 101) may authenticate his Turf Wars account. The example user interface 600B includes a send button for sending the phone number to the game networking system 120b. The game networking system 120b then sends a message to the phone number for authentication purposes.

Figure 6C:
FIG. 6C illustrates an example user interface of a home screen of the Turf Wars game.

FIG. 6C illustrates an example user interface 600C of a home screen of the Turf Wars game. The example user interface 600C includes a status bar. The status bar includes a thumbnail photo of the currently logged-in player. The game networking system 120b may retrieve the photo from a profile of the player on social networking system 120c (e.g., Facebook). The status bar also includes information pertaining to the player's activities on the game networking system 120b, such as the player's award points, experience points, and so on. The status bar also includes information pertaining to a player's in-game mailbox (e.g., a notification of a number of unread or new messages in the player's inbox). The home screen includes buttons for performing location-based actions, such as a "GO FIGHT!) button for participating in a turf war or a "DO JOBS!" button for performing location-based actions proposed by another player. The home screen also includes buttons for the player to configure the game (e.g., update a profile, view or modify game properties, or manage a game-related inventory). For example, a player may click the inventory button to view game-related virtual items in possession of a player character of the player. For example, an inventory may include weapons retrieved for the player character based on the player performing location-based actions. The weapons in the inventory may be usable by a player character in conjunction with engaging in turf wars and doing jobs. For example, a player engaging in a turf war may be more likely to prevail in the turf war if he has more powerful weapons in his inventory than opposing players participating in the turf war.

Figure 6D:
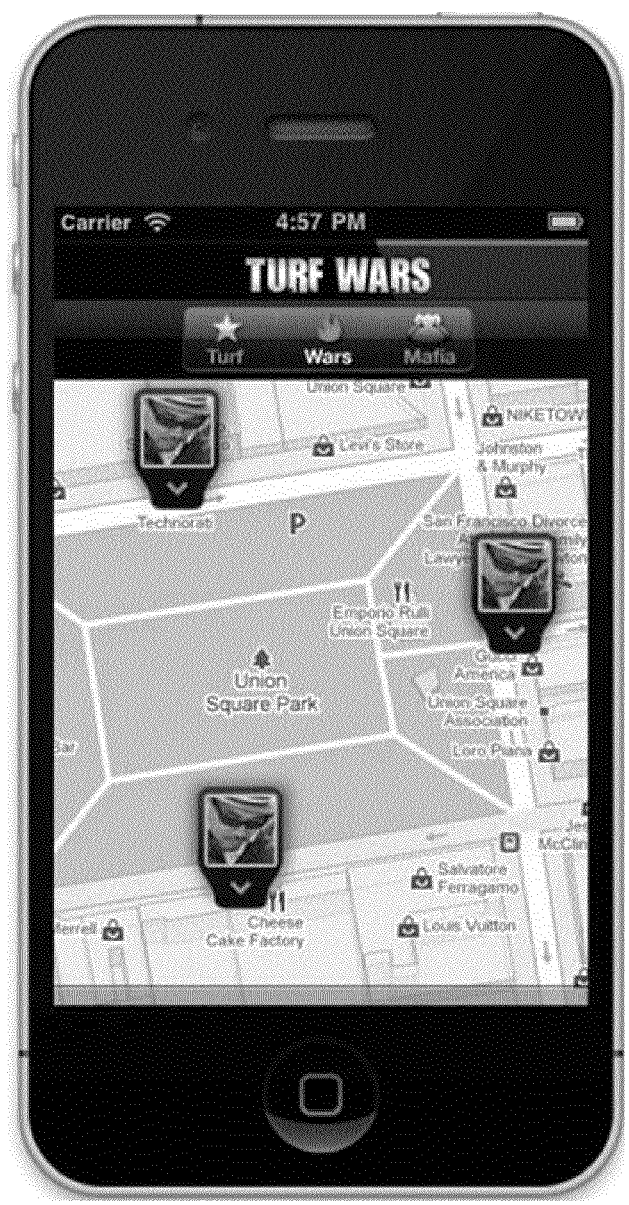
FIG. 6D illustrates an example user interface of a map screen of the Turf Wars game.

FIG. 6D illustrates an example user interface 600D of a map screen of the Turf Wars game. The example user interface 600D includes a map showing the player's current location and nearby locations. The user interface 600D also includes an overlay of game data on the map. For example, if a player is in Union Square in San Francisco, the user interface 600D may display images of "bosses" (e.g., players who have won turf wars at a location) over nearby locations, such as the Cheese Cake Factory, Gucci America, or Technorati. The player's current location may be based on global positioning satellite (GPS) data. The user interface 600D may designate the player's current location relative to the nearby locations by displaying a red dot on the map. The user interface 600D may enable the player (e.g., by clicking on the map or visual representations of game data overlaid on the map) to view information about a location, a boss of the location, or a mob (or group of players) with which a boss of a location is affiliated. The user interface 600D may include a navigation bar for accessing different user interfaces of the Turf Wars game. For example, the navigation bar may include buttons for accessing game data related to the turf (e.g., the map screen or location-selection screen), the wars (e.g., a "wars" screen that displays information about wars currently being fought over the turf), or the mafia (e.g., information about the mafias or groups of players who are participating in the game). The navigation bar may also include a user interface element (e.g., a "Back" button) for accessing the screen that was accessed by the player immediately before the current screen.

Figure 6E:
FIG. 6E illustrates an example user interface of a location-selection screen of the Turf Wars game for viewing location data or performing location-based actions.

FIG. 6E illustrates an example user interface 600E of a location-selection screen for viewing location data or performing location-based actions (e.g., performing a job, engaging in a turf war, or performing another location-based action). The user interface 600E may include a first region (e.g., a "Trending Now" region) for accessing information about popular locations (e.g., locations where players have recently performed jobs, turf wars have recently been waged, a large number of jobs have been performed, or a large number of turf wars have been waged). The user interface 600E may also include a second region (e.g., a "My Favorites") region for accessing information about a player's favorite locations (e.g., locations where the player has performed jobs, engaged in a turf wars, registered presence at, or designated as a favorite location). The location-selection screen may also include a navigation bar similar to the navigation bar described with respect to FIG. 6D.

Figure 6F:
FIG. 6F illustrates an example user interface of a turf wars engagement screen of the Turf Wars game.

FIG. 6F illustrates an example user interface 600F of a turf wars engagement screen of the Turf Wars game. The user interface 600F includes a button (e.g., "CHECK IN") for checking in at the selected location (e.g., "WHOLE FOODS"). The user interface 600F includes a first region for displaying information about the boss of the selected location (e.g., a photo of the boss taken from the boss's Facebook profile, the title of the boss (e.g., within his mafia or group), how long the boss has been the boss of the selected location, and how many turf wars the boss has won at the selected location). The user interface 600F also includes a second region for displaying information about activity at the selected location. For example, the second region may display a listing of people who have recently performed jobs or other location-based actions at the location. Each entry of the listing may include a photo of the player who performed the location-based action, information about the location-based action that the player performed, or the length of time since the player performed the location-based action. Examples of location-based actions that may have been performed include obtaining a virtual item (e.g., a weapon usable in a turf war) for purchasing an item at the location. The user interface 600F may also enable a player to start a turf war at the location (e.g., by clicking a "START WAR" button (not shown)).

When a player initiates turf war, the game networking system 120b may notify various players of the Turf Wars game. For example, the boss of the location, the boss's mafia, or the initiator's mafia may be notified that the initiator has started a turf war at the selected location. The notification may indicate the rules of the turf war. Examples of rules may be that the initiator will win the turf war (e.g., become the boss of the location) if the number of the initiator's mafia that registers presence at the location within a time frame (e.g., one hour) exceeds the number of the boss's mafia that registers presence at the location within the time frame. Or the rules may specify that the initiator of the turf war will become the boss of the location if the initiator's mafia spends more money at the location within a predetermined time period than the current boss's mafia. Or the rules may specify that the initiator will win the turf war if a particular number (e.g., five) members of the initiator's mafia each perform a location-based action at the location before a particular number (e.g., five) of the current boss's mafia each perform a location-based action at the location. The rules may also take into account virtual items in the inventories of player characters of the players. For example, if the initiator's mafia has more powerful weapons than the current boss's mafia, it may be easier for the initiator's mafia to win the turf war (e.g., the initiator's mafia may not need to register as much presence at the location or spend as much money at the location to win the turf war). The user interface 600F may also include the navigation bar described above.

Figure 6G:
FIG. 6G illustrates an example user interface of a turf war status screen of the Turf Wars game.

FIG. 6G illustrates an example user interface 600G of a turf war status screen of the Turf Wars game. The user interface 600G includes information about the location where the turf war is being waged, how much time is left in the turf war, and information about who is currently active in the turf war. For example, the user interface 600G includes a first column for the initiator's mafia that lists the name of the initiator as well as the names of the initiator's mafia. The names of the initiator's mafia may be highlighted based on their participation in the current turf war (e.g., with a green bullet (e.g., to signify participation) or a red bullet (e.g., to signify lack of participation)). The user interface 600G includes a second column for the boss's mafia that lists the name of the current boss as well as the names of the current boss's mafia. The names of the members of the boss's mafia may be highlighted (e.g., with a green bullet or a red bullet) based on their participation in the current turf war. The user interface 600G may also include the navigation bar described above.

Figure 6H:
FIG. 6H illustrates an example user interface of a congratulations screen of the Turf Wars game.

FIG. 6H illustrates an example user interface 600H of a congratulations screen of the Turf Wars game. The user interface 600H may include a message indicating that the player (either the initiator of a turf war or the current boss of a location of the turf war) is the winner of the turf war. The notification may indicate that the winner of the turf war is now the current boss of the location. As the current boss of the location, the player's photo may be overlaid on the map screen of the Turf War game (e.g., when players are nearby to the location). Additionally, the game networking system 120b may update the profile of the winner to, for example, increment a number of turf wars won by the player. The user interface 600H may also include the navigation bar described above.

Figure 6I:
FIG. 6I illustrates an example user interface of a failure screen of the Turf Wars game.

FIG. 6I illustrates an example user interface 600I of a failure screen of the Turf Wars game. The user interface 600I may include a message indicating that a player lost a turf war. The user interface 600I may also include a depiction of the reason why the player lost the turf war. For example, the user interface 600I may include information about the number of members of a rival mafia that performed a location-based action at the location within a predetermined time period. The user interface 600I may also indicate how long the losing player must wait before he (or a member of his mafia) may engage in a turf war at the location in order to attempt to reclaim the location. The user interface 600I may also include the navigation bar described above.

Figure 6J:
FIG. 6J illustrates an example user interface of a mafia management screen of the Turf Wars Game.

FIG. 6J illustrates an example user interface 600J of a mafia management screen of the Turf Wars Game. The user interface 600J may include a user interface element (e.g., an "Add Mafia" button) by which a player may invite his friends (e.g., in-game friends or out-of-game friends) to join his mafia. The user interface 600J may also include a user interface element (not shown) by which a player may remove a member of his mafia. The user interface 600J may also include the navigation bar described above. The user interface 600J may also include a sub-navigation bar (for, e.g., toggling between a mafia messaging screen and the mafia management screen (described below)). The user interface 600J may include a listing of all of the player's mafia members. The user interface 600J may enable the player to view information about a mafia member by clicking on the mafia member. The information about each mafia member may include locations at which the member has performed jobs or engaged in turf wars, as well as other information (e.g., information about the member's player character inventory or information retrieved about the member from the social networking system 120c).

Figure 6K:
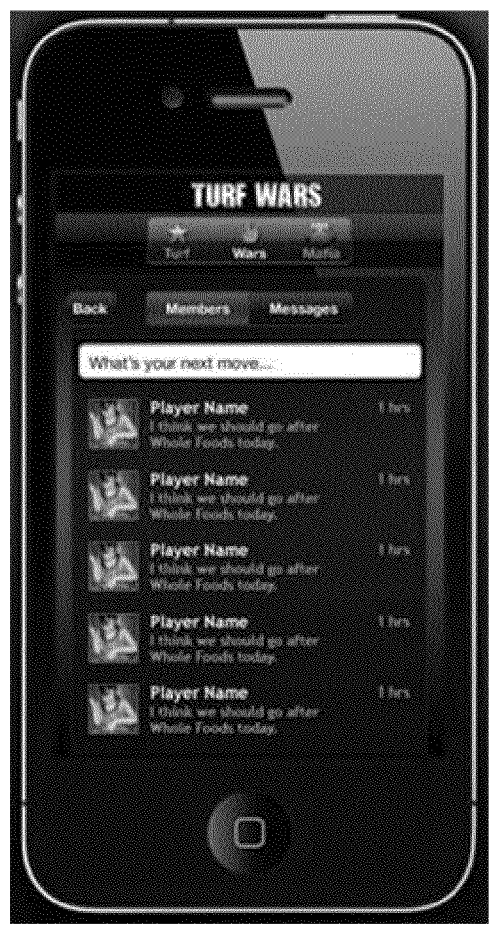
FIG. 6K illustrates an example user interface of a mafia messaging screen of the Turf Wars game.

FIG. 6K illustrates an example user interface 600K of a mafia messaging screen of the Turf Wars game. The user interface 600K may include a user interface element (e.g., a text box) into which a player may type a message. The user interface 600K may also include a user interface element (not shown) to send the message to all or selected members of the player's mafia. When the player first navigates to the messaging screen, the user interface 600K may overlay a message on the text window suggesting a topic of the message (e.g., "What's your next move . . ."). The player may then overwrite the overlaid message by typing text into the text window. The user interface 600K may also include the navigation bar described above.

Shoplifting Game

As described above, an aspect of a computer-implemented game may include a shoplifting gaming mechanic in which a player of the computer-implemented game is able to shoplift or otherwise obtain a virtual item by performing a location-based action such as scanning a product code of a corresponding real-world item. The shoplifting gaming mechanic may enable players to steal virtual items from one another or groups of players to steal virtual items from other groups of players. The shoplifting gaming mechanic may include an aspect of enabling a player or group of players to set an alarm (e.g., by performing a location-based action), thus protecting a real-world item that is the subject of a location-based action that is to represent a shoplifting of a virtual item. When the alarm is set off (e.g., by a player attempting to perform a location-based action that is required to steal the item), the player(s) who set the alarm may be notified and be presented with various options in response to the setting off of the alarm. For example, the player or group of players who set the alarm may be given an option to perform a location-based action to steal the item back from player(s) who performed the location-base action to steal the item. Or the player or group of players who set the alarm may be given the option to punish a player character of the thieving player within the computer-implemented game (e.g., decreasing the mana of a player character or imprisoning the player character). Additionally, the shoplifting gaming mechanic may include a notification element for notifying an additional player, group of players, or an operator of a location of a shoplifting action by a player independently of whether an alarm is set. Thus, rival groups (or clans) may be notified of a shoplifting action of a player and be given various options to counter the shoplifting action by the player. Or the shoplifting action may be reported to an operator of the location where a shoplifting action occurs such that the operator may adapt to the popularity of particular shoplifting actions (e.g., by distributing popular items strategically within the location).

The game networking system 120b may be configured to determine a first value associated with a shoplifting of a virtual item by performing a location-based action (e.g., through brand impressions disseminated through a social network of the player who shoplifts the item) and a second value associated with an actual purchasing of the real-world item at the location. The game networking system 120b may then adjust the incentive rewards for performing a location-based action based on whether the location-based action is a shoplifting action or an actual purchasing action. Thus, a player who is highly influential (e.g., has many in-game and out-of-game social connections that he has successfully influenced in the past) may receive an offer for performing a location-based action to shoplift an item that is more valuable than an incentive reward that is offered to an additional player who actually purchases the real-world item at the location but is less influential than the player.

Additionally, the game networking system 120b may associate a fungibility attribute of a virtual item corresponding to a real-world item based on whether the virtual item is obtained via a shoplifting action or via a purchasing of the real-world item at a location. Thus, a virtual sword that is obtained by a player character of a player based on the shoplifting gaming mechanic may not be interchangeable with a virtual sword that is obtained by a player character of the player based on the player actually purchasing a real-world sword corresponding to the virtual sword. However, two virtual swords obtained by the same means (e.g., the shoplifting gaming mechanic) may be treated as interchangeable within a computer-implemented game.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
    receiving an indication of a performance of a location-based action by a player of a computer-implemented game executing on a game networking system, the location-based action including an attending of a live entertainment event by the player; and
    providing a virtual item based on the receiving of the indication of the performance of the location-based action by the player of the computer-implemented game, the virtual item comprising one of a set of limited-edition virtual items to be provided exclusively to players of the computer-implemented game attending the live entertainment event, the virtual item being usable within the computer-implemented game, one or more modules incorporated into the game networking system to configure the game networking system to perform the receiving and providing, the one or modules implemented by one or more processors of the game networking system.

2. The method of claim 1, wherein the virtual item is unique to a location of the location-based action.

3. The method of claim 1, the method further comprising providing the player with an incentive reward based on the player collecting each of the set of limited-edition virtual items.

4. The method of claim 3, wherein the virtual item is a composite virtual item and each of the set of limited-edition virtual items corresponds to an element of the composite virtual item.

5. The method of claim 1, further comprising notifying the player that the virtual item is to be provided to the player based on the receiving of the indication of the performance of the location-based action by the player, the notifying including keeping a portion of information about the virtual item from the player and the providing of the virtual item includes revealing the portion of the information about the virtual item to the player.

6. The method of claim 1, wherein the virtual item is of a type that is capable of being consumed within the computer-implemented game and the providing of the virtual item is based on an additional virtual item of the type having been consumed within the computer-implemented game.

7. The method of claim 1, further comprising associating the location-based action with an in-game action and wherein the virtual item relates to a performance of the in-game action.

8. The method of claim 7, wherein:
    the location-based action is scanning a product code of a real-world item; and
    the virtual item corresponds to the real-world item.

9. The method of claim 1, further comprising detecting an additional location-based action by the player and wherein the providing of the virtual item is based on a location of the location-based action and a location of the additional location-based action.

10. The method of claim 9, wherein the virtual item reflects a path of travel between the location and the location of the additional location-based action.

11. The method of claim 1, wherein the live entertainment event is a concert.

12. The method of claim 11, wherein the virtual item represents a combination of the location and performer of the concert.

13. A system comprising:
    one or modules implemented by one or more computer processors of a game networking system, the one or more modules incorporated into the game networking system to configure the game networking system to, at least:
    receive an indication of a performance of a location-based action by a player of a computer-implemented game executing on the game networking system, the location-based action including an attending of a live entertainment event by the player; and
    provide a virtual item based on the receiving of the indication of the performance of the location-based action by the player of the computer-implemented game, the virtual item comprising a limited-edition virtual item provided exclusively to the player attending the live entertainment event, the virtual item being usable within the computer-implemented game.

14. The system of claim 13, wherein the virtual item is unique to a location of the location-based action.

15. The system of claim 13, wherein the virtual item is one of a set of virtual items and the method further comprises providing the player with an incentive reward based on the player collecting each of the set of virtual items.

16. The system of claim 15, wherein the virtual item is a composite virtual item and each of the set of virtual items corresponds to an element of the composite virtual item.

17. A non-transitory computer-readable medium comprising a set of instructions that, when incorporated into a game networking system as one or more modules implemented by at least one processor of the game networking system, cause the at least one processor to perform operations, the operations comprising:
- receiving an indication of a performance of a location-based action by a player of a computer-implemented game executing on the game networking system, the location-based action including an attending of live entertainment event by the player; and
- providing a virtual item based on the receiving of the indication of the performance of the location-based action by the player of the computer-implemented game, the virtual item comprising one of a set of limited-edition virtual items to be provided exclusively to players of the computer-implemented game attending the live entertainment event, the virtual item being usable within the computer-implemented game.

18. The non-transitory computer-readable medium of claim 17, the operations further comprising notifying the player that the virtual item is to be provided to the player based on the receiving of the indication of the performance of the location-based action by the player, the notifying including keeping a portion of information about the virtual item from the player and the providing of the virtual item includes revealing the portion of the information about the virtual item to the player.

19. The non-transitory computer-readable medium of claim 17, wherein the virtual item is virtual item of a type that is capable of being consumed within the computer-implemented game and the providing of the virtual item is based on an additional virtual item of the type having been consumed within the computer-implemented game.

* * * * *